(12) United States Patent
Shtylman et al.

(10) Patent No.: US 10,878,389 B2
(45) Date of Patent: *Dec. 29, 2020

(54) CRYPTOGRAPHIC CURRENCY EXCHANGE

(71) Applicant: Coinbase, Inc., San Francisco, CA (US)

(72) Inventors: Roman Shtylman, New York, NY (US); Samo Drole, Ljubljana (SI)

(73) Assignee: Coinbase, Inc., San Francisco, CA (US)

( * ) Notice: Subject to any disclaimer, the term of this patent is extended or adjusted under 35 U.S.C. 154(b) by 145 days.

This patent is subject to a terminal disclaimer.

(21) Appl. No.: 16/243,688

(22) Filed: Jan. 9, 2019

(65) Prior Publication Data
US 2019/0156303 A1    May 23, 2019

Related U.S. Application Data

(63) Continuation of application No. 14/660,440, filed on Mar. 17, 2015, now Pat. No. 10,229,396.
(Continued)

(51) Int. Cl.
*G06Q 20/06* (2012.01)
*G06Q 20/36* (2012.01)
(Continued)

(52) U.S. Cl.
CPC ....... *G06Q 20/065* (2013.01); *G06Q 20/0658* (2013.01); *G06Q 20/16* (2013.01);
(Continued)

(58) Field of Classification Search
CPC ...... G06Q 20/65; G06Q 20/102; G06Q 20/16; G06Q 20/18; G06Q 20/3223;
(Continued)

(56) References Cited

U.S. PATENT DOCUMENTS 5,884,274 A    3/1999 Walker et al.
6,125,186 A    9/2000 Saito et al.
(Continued)

FOREIGN PATENT DOCUMENTS

EP    2634738    9/2013
JP    2007109002 A    4/2007
(Continued)

OTHER PUBLICATIONS

"Wholesale Payment Systems: Interbank Payment and Messaging System, Fedwire and Clearing House Interbank Payment Systems (CHIPS)" dated Dec. 16, 2005; (Year: 2005).*
(Continued)

*Primary Examiner* — William E Rankins
*Assistant Examiner* — James H Miller
(74) *Attorney, Agent, or Firm* — Jeffrey Schox; Diana Lin

(57) ABSTRACT

A system and method for transacting cryptographic currency is described. An exchange database associated with a number of buyers and sellers is maintained at a host computer system. Cryptographic currency is received from one or more of the sellers at an exchange wallet associated with the exchange database. A match is created within the exchange database, including a buy offer for the cryptographic currency from a buyer and a sell offer for the cryptographic currency from a seller. A cryptographic currency withdrawal request is received from the buyer, and in response, the host computer system determines that a total amount of cryptographic currency represented in the exchange database matches a total amount of the cryptographic currency within the exchange wallet, transfers the cryptographic currency to the buyer's wallet, and updates the exchange database by deducting a first value of the cryptographic currency that is transferred to the buyer's wallet.

20 Claims, 76 Drawing Sheets

Related U.S. Application Data

(60) Provisional application No. 62/099,992, filed on Jan. 5, 2015, provisional application No. 62/042,676, filed on Aug. 27, 2014, provisional application No. 62/056,100, filed on Sep. 26, 2014, provisional application No. 61/954,434, filed on Mar. 17, 2014, provisional application No. 61/990,017, filed on May 7, 2014, provisional application No. 62/086,669, filed on Dec. 2, 2014.

(51) Int. Cl.
 *G06Q 20/38* (2012.01)
 *G06Q 20/16* (2012.01)
 *G06Q 40/04* (2012.01)
 *G06Q 20/40* (2012.01)
 *H04L 12/58* (2006.01)

(52) U.S. Cl.
 CPC ........... *G06Q 20/36* (2013.01); *G06Q 20/363* (2013.01); *G06Q 20/3678* (2013.01); *G06Q 20/381* (2013.01); *G06Q 20/382* (2013.01); *G06Q 20/388* (2013.01); *G06Q 20/3825* (2013.01); *G06Q 20/3829* (2013.01); *G06Q 20/40* (2013.01); *G06Q 20/4014* (2013.01); *G06Q 40/04* (2013.01); *H04L 51/08* (2013.01); *G06Q 2220/00* (2013.01)

(58) Field of Classification Search
 CPC ............. G06Q 20/3276; G06Q 20/363; G06Q 20/367; G06Q 20/3672; G06Q 20/3674; G06Q 20/3676; G06Q 20/3821; G06Q 20/3825; G06Q 20/3829; G06Q 20/384; G06Q 20/386; G06Q 20/388; G06Q 20/401; G06Q 20/4014; G06Q 20/40145; G06Q 20/405; G06Q 20/425; G06Q 30/0201; G06Q 30/0222; G06Q 30/0283; G06Q 30/04; G06Q 30/0601; G06Q 40/10; G06Q 40/12; G06Q 40/123; G06Q 40/125
 USPC ... 705/37, 35, 36 R, 39, 38, 69, 14.23, 26.1, 705/28, 30, 305, 31, 32, 34, 36 T, 40, 705/400, 42, 43, 45, 64, 67, 68, 75, 78
 See application file for complete search history.

(56) References Cited

U.S. PATENT DOCUMENTS

| | | | |
|---|---|---|---|
| 6,952,683 B1 | 10/2005 | Gerhard | |
| 6,959,394 B1 | 10/2005 | Brickell et al. | |
| 7,644,037 B1 | 1/2010 | Ostrovsky | |
| 7,689,500 B2* | 3/2010 | Cottrell | G06Q 40/06 705/37 |
| 7,689,550 B2 | 3/2010 | Lee et al. | |
| 8,055,575 B2* | 11/2011 | Grody | G06Q 40/04 705/37 |
| 8,111,648 B2 | 2/2012 | Gandham | |
| 8,117,648 B2 | 2/2012 | Slaton et al. | |
| 8,606,703 B1 | 12/2013 | Dorsey et al. | |
| 8,839,386 B2 | 9/2014 | Gilboy | |
| 9,135,787 B1 | 9/2015 | Russell et al. | |
| 9,224,262 B2 | 12/2015 | Fine et al. | |
| 9,495,668 B1 | 11/2016 | Juels | |
| 9,892,460 B1* | 2/2018 | Winklevoss | G06Q 40/04 |
| 10,068,228 B1 | 9/2018 | Winklevoss et al. | |
| 10,256,983 B1 | 4/2019 | Bauer et al. | |
| 10,269,009 B1* | 4/2019 | Winklevoss | G06Q 20/065 |
| 10,332,205 B1* | 6/2019 | Russell | G06Q 40/025 |
| 10,469,309 B1 | 11/2019 | Gupta et al. | |
| 2001/0034605 A1 | 10/2001 | Hoffman | |
| 2001/0050990 A1 | 12/2001 | Sudia | |
| 2002/0023053 A1 | 2/2002 | Szoc et al. | |
| 2006/0168663 A1 | 7/2006 | Viljoen et al. | |
| 2008/0091586 A1 | 4/2008 | Cottrell | |
| 2009/0037405 A1 | 2/2009 | Lee et al. | |
| 2009/0144810 A1 | 6/2009 | Gilboy | |
| 2009/0205036 A1 | 8/2009 | Slaton et al. | |
| 2011/0071958 A1 | 3/2011 | Grody et al. | |
| 2011/0087582 A1 | 4/2011 | Pak et al. | |
| 2011/0106675 A1 | 5/2011 | Perlman | |
| 2011/0251941 A1 | 10/2011 | Dunwoody | |
| 2012/0136782 A1 | 5/2012 | Norman et al. | |
| 2012/0150750 A1 | 6/2012 | Law et al. | |
| 2012/0239556 A1 | 9/2012 | Magruder et al. | |
| 2013/0065670 A1 | 3/2013 | Michaelson et al. | |
| 2013/0166455 A1 | 6/2013 | Feigelson | |
| 2013/0290710 A1 | 10/2013 | Broder et al. | |
| 2013/0343546 A1 | 12/2013 | Shibutani et al. | |
| 2014/0025473 A1 | 1/2014 | Cohen | |
| 2014/0052617 A1 | 2/2014 | Chawla et al. | |
| 2014/0057599 A1 | 2/2014 | Hazari | |
| 2014/0082749 A1 | 3/2014 | Holland et al. | |
| 2014/0108223 A1 | 4/2014 | Xiao | |
| 2014/0156512 A1* | 6/2014 | Rahman | G06Q 20/10 705/39 |
| 2014/0172633 A1 | 6/2014 | Dogin et al. | |
| 2014/0229739 A1 | 8/2014 | Roth et al. | |
| 2014/0274327 A1 | 9/2014 | Fine et al. | |
| 2014/0279436 A1 | 9/2014 | Dorsey et al. | |
| 2015/0033301 A1 | 1/2015 | Pianese et al. | |
| 2015/0050987 A1 | 2/2015 | Huang et al. | |
| 2015/0120569 A1 | 4/2015 | Belshe et al. | |
| 2015/0127495 A1 | 5/2015 | Houri | |
| 2015/0170112 A1* | 6/2015 | DeCastro | G06Q 20/381 705/39 |
| 2015/0178693 A1 | 6/2015 | Solis | |
| 2015/0209678 A1 | 7/2015 | Edwards et al. | |
| 2015/0220928 A1* | 8/2015 | Allen | G06O 20/3829 705/67 |
| 2015/0227897 A1 | 8/2015 | Loera | |
| 2015/0262139 A1 | 9/2015 | Shtylman | |
| 2015/0262171 A1 | 9/2015 | Langschaedel et al. | |
| 2015/0262173 A1* | 9/2015 | Durbin | G06Q 20/38215 705/64 |
| 2015/0332256 A1* | 11/2015 | Minor | G06Q 20/381 705/69 |
| 2015/0365283 A1 | 12/2015 | Ronca et al. | |
| 2016/0034896 A1 | 2/2016 | O'Brien et al. | |
| 2016/0085955 A1 | 3/2016 | Lerner | |
| 2016/0086418 A1 | 3/2016 | Smolen et al. | |
| 2016/0171570 A1 | 6/2016 | Dogin et al. | |
| 2016/0203572 A1 | 7/2016 | McConaghy et al. | |
| 2016/0261411 A1 | 9/2016 | Yau et al. | |
| 2016/0277398 A1 | 9/2016 | Gregg et al. | |
| 2016/0321654 A1 | 11/2016 | Lesavich et al. | |
| 2016/0380767 A1 | 12/2016 | Hayashi et al. | |
| 2017/0063531 A1 | 3/2017 | Sullivan | |
| 2017/0161439 A1 | 6/2017 | Raduchel et al. | |
| 2018/0248704 A1 | 8/2018 | Coode et al. | |
| 2018/0367316 A1 | 12/2018 | Cheng et al. | |
| 2019/0236245 A1 | 8/2019 | Desarzens et al. | |

FOREIGN PATENT DOCUMENTS

| | | | | |
|---|---|---|---|---|
| WO | WO-2001084906 A2 * | 11/2001 | ............. | G06Q 20/00 |
| WO | 2014190323 | 11/2014 | | |
| WO | WO-2014190323 A1 * | 11/2014 | ........... | G06T 11/206 |

OTHER PUBLICATIONS

"How to sell Lindens" dated Mar. 6, 2013 (Year: 2013).*
Antonopoulos, Andreas M., and Mastering Bitcoin. "Unlocking digital crypto-currencies." (2014) (Year: 2014).*
Neuman, Nick, "KeySplit-Tackling the hard parts of being your own bank", https://medium.com/©nickneuman/keysplit-private-key-security-for-cryptocurrency-owners-d1653ea9631d, Feb. 24, 2018.
International Search Report and Written Opinion for PCT Application No. PCT/US2019/027857 dated Jul. 15, 2019.

(56) References Cited

OTHER PUBLICATIONS

Ouaddah et al. "FairAccess: a new Blockchain-based access control framework for the 1-20 Internet of Things." In: Security and Communication Networks. Feb. 19, 2017.

Bradbury, Danny, "BitGo Safe Aims to Secure Bitcoin Wallets with Multi-Signature Transactions", CoinDesk, The voice of Digital Currency, http://web.archive.org/web/20140108021304/http://www.coindesk.com/, published Dec. 19, 2013.

"Send Bitcoins to Email Addresses!", Jan. 9, 2012,downloaded from https://web.archive.org/web/20120109084110/http://www.bitcoinmail.com (Year 2012).

"You Can Now Send Bitcoins over Email with Tip Bot", Feb. 26, 2014, downloaded from https://www.coindesk.com/can-now-send-bitcoins-email-tip-bot, (Year 2014).

Send bitcoins to an unknown recipient, Feb. 13, 2011, downloaded from https://bitcointalk.org/index.php?topic=3427.0, (Year: 2011).

"NPL4, Importing Bitcoin from a paper wallet into Electrum", https://thecleverest.com/, dated Mar. 12, 2014.

"Blockchain ("How do off chain transactions work?" downloaded from https://bitcoin.stackexchange.com/questions/123530/how-do-off-chain-transactions-work, year 2013.".

"A plea to exchanges . . . lets do 2 factor right!" Bitcoin Forum, download from https://bitcointalk.org/index.php?topic=109424.0%E2%80%93%20Stephen%20Gomick%20NOV%205%20%2712%20at%2016:56 (posted Sep. 14, 2012), (10 pages).

"BlockchainCreate", http://blockchain.info:80/wallet/faq, dated Jan. 9, 2012, (5 pages).

"Bitcoin Explained Like You're Five Part 3-Cryptography", http://chrispacia.wordpress.com/2013/09/07/bitcoin-cryptography-digital-signatures-explained/,2013, (21 pages).

"Computer Arch", http://www.math.uaa.alaska.edu/-afkjm/cs101/handouts/ComputerArch.pdf, dated Sep. 10, 2009, (16 pages).

"NIST", Archived NIST Technical Series Publication, dated Jul. 2012, sp 800-57_part1_rev3_general.pdf, (148 pages).

"Off-the-chain transactions", downloaded from http://gavintech.blogspot.com/2012/07/off-chain-transactions.html, dated Jul. 3, 2012 (Year: 2012), (4 pages).

"Securing your wallet", download from https://bitcoin.org/en/secure-yourwallet (post from 2013), (4 pages).

"Transaction Fees ("Transaction fees and negative balances"", downloaded from https://bitcointalk.org/index.php?topic=6856.0 dated Apr. 30, 2011-May 1, 2011, (Year:2011), (3 pages).

"Wholesale Payment Systems: Interbank Payment and Messaging System, Fedwire and Clearing House Interbank Payment Systems (CHIPS)", http://www.ffiec.gov/ffiecinfobase/booklets/Wholesale/02.html, Dec. 16, 2005, (3 pages).

Backing Up ("Backing Up Sensitive Data With Secret Sharing", Alex Beal, downloaded from http://www.usrsb.in/secret-sharing-backup.html and attached as PDF file, dated Feb. 23, 2013) (Year: 2013).

Beal, Alex, "Backing Up Sensitive Data With Secret Sharing", downloaded from https:www.usrsb.in/secret-sharing-backup.html, dated Feb. 23, 2013) (Year 2013), (8 pages).

Bitcoin Explained, https://chrispacia.wordpress.com/2013/09/29/bitcoin-explained-like-youre-five-part-4-securing-your-wallet/ Attached as pdf.

"Bitcoin Explained Like You're Five, Part 4-Securing Your Wallet, https://chrispacia.wordpress.com/2013/09/29/bitcoin-explained-like-youre-five-part-4-securing-your-wallet/, dated Sep. 29, 2013) (Year: 2013), (15 pages).", Feb. 9, 2018 00:00:00.0.

Wallace, Benjamin, "The rise and fall of bitcoin", Magazine, WIRED, https://www.wired.com/2011 /11 /mf_bitcoin/all/1., Nov. 23, 2011, pp. 1-17.

Meiklejohn, Sarah et al., "A fistful of bitcoins: Characterizing Payments among men with no names", 2013, (8 pages).

Doguet, Joshua J., "The Nature of the Form: Legal and Regulatory issues surrounding the Bitcoin digital currency system", Louisiana Law Review, vol. 73, No. 1, Summer 2013 pp. 1118-1153.

Dion, Derek A., "I'll gladly trade you two bits on Tuesday for a byte today: Bitcoin, regulating fraud in the e-conomy of Hacker-cash", Journal of Law, Technology & Policy, vol. 2013, 2013, pp. 165-201.

""NIST", Archived NIST Technical Series Publication, dated Jul. 2012, sp 800-57_part1_rev3_general.pdf, (148 pages).", Oct. 20, 2017 00:00:00.0.

""NIST ", Archived NIST Technical Series Publication, dated Jul. 2012, sp 800-57_part1_rev3_general.pdf, (148 pages). ", Feb. 9, 2018 00:00:00.0.

""NIST", Archived NIST Technical Series Publication, dated Jul. 2012, sp 800-57_part1_rev3_general.pdf, (148 pages).", Mar. 1, 2018 00:00:00.0.

""Off the chain transactions", downloaded from http://gavintech.blogspot.com/2012/07/off-chain-transactions.html, dated Jul. 3, 2012 (Year:2012), (4 pages).", Feb. 9, 2018 00:00:00.0.

""Off-the-chain transactions", downloaded from http://gavintech.blogspot.com/2012/07/off-chain-transactions.html, dated Jul. 3, 2012 (Year:2012), (4 pages).", Mar. 1, 2018 00:00:00.0.

""Securing your wallet", downloaded from https://bitcoin.org/en/secure-your-wallet (post from2013), (4 pages).", Feb. 9, 2018 00:00:00.0.

""Securing your wallet", downloaded from https://bitcoin.org/en/secure-your-wallet (post from2013), (4 pages).", Mar. 1, 2018 00:00:00.0.

""Transaction Fees ("Transaction fees and negative balances"", downloaded from https://bitcointalk.org/index.php?topic=6856.0 dated Apr. 30, 2011-May 1, 2011, (Year:2011), (3 pages)", Feb. 9, 2018 00:00:00.0.

""Transaction Fees ("Transaction fees and negative balances"", downloaded from https://bitcointalk.org/index.php?topic=6856.0 dated Apr. 30, 2011-May 1, 2011, (Year:2011), (3 pages).", Mar. 1, 2018 00:00:00.0.

""Wholesale Payment Systems: Interbank Payment and Messaging System, Fedwire and Clearing House Interbank Payment Systems (CHIPS)", https://www.ffiec.gov/ffiecinfobase/booklets/Wholesale/02.html, Dec. 16, 2005, 3 pages).", Oct. 27, 2017 00:00:00.0.

""Wholesale Payment Systems: Interbank Payment and Messaging System, Fedwire and Clearing House Interbank Payment Systems (CHIPS)", https://www.ffiec.gov/ffiecinfobase/booklets/Wholesale/02.html, Dec. 16, 2005, 3 pages).", Feb. 9, 2018 00:00:00.0.

"Beal, Alex, "Backing Up Sensitive Data With Secret Sharing", downloaded from https:www.usrsb.in/secret-sharing-backup.html, dated Feb. 23, 2013) (Year 2013), (8pages).", Feb. 9, 2018 00:00:00.0.

"Dio Derek A., "I'll gladly trade you two bits on Tuesday for a byte today: Bitcoin, regulating fraud in the e-conomy of Hacker-cash", Journal of Law, Technology & Policy, vol. 2013, pp. 165-201.", Feb. 9, 2018 00:00:00.0.

"Dion Derek A., "I'll gladly trade you two bits on Tuesday for a byte today: Bitcoin, regulating fraud in the e-conomy of Hacker-cash", Journal of Law, Technology & Policy, vol. 2013, pp. 165-201.", Oct. 20, 2017 00:00:00.0.

"Douget, Joshua J., "The Nature of the Form:Legal and Regulatory issues surrounding the Bitcoin digital currency system", Louisiana Law Review, vol. 73, No. 1 Summer 2013, pp. 1118-1153.", Oct. 20, 2017 00:00:00.0.

"What is the coin selection algorithm", downloaded from https://web.archive.org/web/20130228073524/https://bitcoin.stackexchange.com/questions/1077/what-is-the-coin-selection-algorithm dated Feb. 27, 2014.

"GitHub for SelectCoin code", https://github.com/trottier/original-bitcoin/blob/master/src/main.cpp, lines 2410-2510, dated Apr. 4, 2013.

"Whose bank account is it anyway?", McMillan LLP, Jun. 24, 2011, downloaded from http://www.lexology.com/library/detail.aspx?g20the%20parties.attached as PDF file (Year: 2011).

\* cited by examiner

FIG. 2

| First Host Computer System 14 | | |
|---|---|---|
| Wallet A | | |
| Email address A; Login Details | | |
| Transfer 1 | Bitcoin address 1 | |
| | | From: First Host |
| | | Amount in bitcoin |
| | | Host Fee: x% |
| Transfer 2 | Bitcoin address 2 | |
| | | From: Network address |
| | | Amount in bitcoin |
| | | Host Fee: 0 bitcoin |

FIG. 3

| First Host Computer System 14 | | | | |
|---|---|---|---|---|
| Wallet A | | | Wallet B | |
| Email address A; Login Details | | | Email address B | |
| Transfer 1 | Bitcoin address 1 | | | |
| | | From: First Host | | |
| | | Amount in bitcoin | | |
| | | Host Fee: x% | | |
| Transfer 2 | Bitcoin address 2 | | | |
| | | From: Network address | | |
| | | Amount in bitcoin | | |
| | | Host Fee: 0 bitcoin | | |
| Transfer 3 | Bitcoin address 2 | | Bitcoin address 3 | |
| | | To: Email address B | | |
| | | Amount in bitcoin | | |
| | | Miner's Fee = 0 bitcoin | | |
| | | Host Fee: 0 bitcoin | | |
| | | | | From: Wallet A |
| | | | | Amount in bitcoin |

🡩 🡪 | https://coinbase.com/... ▼ | 🔍 📁 ▼ | 🏠 ☆ ✕ 🗗 ✕

File  Edit  View  Favorites  Tools  Help

0.00189 BTC ≈ 1.42 USD  Ⓝ John.Smith@gmail.c.... ▼ ⚙

GENERAL
≡ Send/Request
⇅ Buy/Sell
🔄 Recurring Payments
⚙ Account Settings

MERCHANT TOOLS ›
🛒 Orders
👥 Subscribers
✕ Tools
⚙ Merchant Settings

Complete your profile
Next step: verify your phone

Get the Coinbase App
Use Coinbase easily on your
Android phone.

Transactions

Current Balance (hide)
0.00189 BTC ≈ 1.42 USD

Quickstart Guide
1. Buy your first bitcoin by connecting a bank account.
2. Accept bitcoin payments on your website using our merchant tools.
3. Invite friends to give and get $5 of bitcoin when they complete a buy.

| Transaction | Date | Status | Amount |
|---|---|---|---|
| ← You received bitcoin from RepresentativeA | DEC 18, 2013 | Completed | +0.00189 |

| PRODUCT | RESOURCES | FOLLOW US ON |
|---|---|---|
| How To Buy Bitcoin | API | 📰 Our Blog |
| Merchant Services | Documentation | 🐦 Twitter |
| Developer Platform | Status | f Facebook |
| Security | Support | © 2014 Coinbase |

Browser window showing https://coinbase.com/...

0.00189 BTC ≈ 1.42 USD | John.Smith@gmail.c...

GENERAL
- Send/Request
- Buy/Sell
- Recurring Payments
- Account Settings

MERCHANT TOOLS
- Orders
- Subscribers
- Tools
- Merchant Settings

Complete your profile
Next step: verify your phone

Get the Coinbase App
Use Coinbase easily on your Android phone.

🏦 Bank Accounts  Used to buy and sell bitcoins – U.S. only

[ + Add a Bank Account ]

💳 Credit Cards  Used as backup payment method – Visa only

[ + Add a Credit Card ]

🏛 Billing Addresses

[ + Add a Billing Address ]

⚡ Enable Instant Buy
Regular buys take 4 business days – enable Instant Buy and get your coins in seconds 1. Link a bank account
2. Add a Credit Card
3. Verify your identity

Common Questions
- How is my information protected?
- I'm having trouble adding a card

PRODUCT
How To Buy Bitcoin
Merchant Services
Developer Platform
Security

ABOUT
About
Careers
Press
Legal

RESOURCES
API
Documentation
Status
Support

FOLLOW US ON
▶ Our Blog
🐦 Twitter
f Facebook
© 2014 Coinbase

[Browser window showing Coinbase account settings page, rotated 90°]

- File  Edit  View  Favorites  Tools  Help
- https://coinbase.com/...
- 0.00189 BTC ≈ 1.42 USD
- John.Smith@gmail.c...

GENERAL
- Send/Request
- Buy/Sell
- Recurring Payments
- Account Settings

MERCHANT TOOLS >
- Orders
- Subscribers
- Tools
- Merchant Settings

Complete your profile
Next step: verify your phone

Account Settings  Referrals  Bitcoin Addresses  Integrations

Account Settings

Name  [          ]
Email  John.Smith@gmail.com
Local currency  United States, Dollar (USD)
Time zone  (GMT -08:00) Pacific Time (US)
[Save Changes]

Password  Change Password  Forgot Password?
Picture  Change Picture

Phone Numbers  adding a phone enables two-factor authentication on your account. read more
[+ Verify A Phone]

Notifications
Email me when:
☑ I send or receive bitcoin
☑ I buy or sell bitcoin
☑ I receive merchant orders
☐ There are recommended actions for my account
[Save Changes]

Reports
Export my [transaction history ▼] and email it to [John.Smith@gmail.co...]  [Export]

File Edit View Favorites Tools Help https://coinbase.com/...    John.Smith@gmail.c...

0.00189 BTC ≈ 1.42 USD

Account updated!

| Account Settings | Referrals | Bitcoin Addresses | Integrations |

Account Settings

GENERAL
≡ Send/Request
⇅ Buy/Sell
⟲ Recurring Payments
✱ Account Settings

MERCHANT TOOLS ›
🛒 Orders
👥 Subscribers
✱ Tools
✱ Merchant Settings

Complete your profile
Next step: verify your phone

Name          John Smith
Email         John.Smith@gmail.com
Local currency  United States, Dollar (USD) ▽
Time zone     (GMT -08:00) Pacific Time (US) ▽
              [Save Changes]

Password      Change Password
              Forgot Password?
Picture       Change Picture

Phone Numbers  adding a phone enables two-factor authentication on your account. read more
+1 310 234 6789  [VERIFIED]  [PRIMARY PHONE]  [Delete]
You can also Google Authenticator and SMS access

Notifications
Email me when:
☑ I send or receive bitcoin
☑ I buy or sell bitcoin
☑ I receive merchant orders
☑ There are recommended actions for my account
[Save Changes]

Reports
Export my [transaction history ▽] and email it to [John.Smith@gmail.co...]  [Export]

FIG. 27

GENERAL
- Send/Request
- Buy/Sell
- Recurring Payments
- Account Settings

MERCHANT TOOLS ›
- Orders
- Subscribers
- Tools
- Merchant Settings

Complete your profile
Next step: verify your identity

PRODUCT
How To Buy Bitcoin
Merchant Services
Developer Platform
Security https://coinbase.com/...

0.00189 BTC ≈ 1.42 USD

John.Smith@gmail.c...

ID Verification Step 2: Questions
Information pulled from public records

You have 4 minutes to complete

Where was your social security number issued?
- ○ Oregon    ● California
- ○ Arkansas  ○ None of the above
- ○ Kentucky

With which name are you associated?
- ○ ARDONNE  ○ MARQUIS
- ○ HANLEY   ● None of the above
- ○ ILFORD

In which city is LEIGH AVE?
- ○ BETHESDA       ○ SACRAMENTO
- ○ HIGHLAND PARK  ○ None of the above
- ● LOS ANGELES

How long have you been associated with the property at 20011 City View Rd?
- ○ Less than 2 years  ● 4 - 5 years
- ○ 2 - 3 years        ○ Over 5 years
- ○ 3 - 4 years        ○ None of the above

[Submit]

| | | First Host Computer System 14 | |
|---|---|---|---|
| | | Wallet A<br>Email Address A; Login Details | Wallet B<br>Email address B; Login Details |
| Transfer 1 | Bitcoin address 1 | From: First Host<br>Amount in bitcoin<br>Host-Fee: x% | |
| Transfer 2 | Bitcoin address 2 | From: Network address<br>Amount in bitcoin<br>Host-Fee: 0 bitcoin | |
| Transfer 3 | Bitcoin address 2 | To: Email address B<br>Amount in bitcoin<br>Miner's Fee = 0 bitcoin<br>Host-Fee: 0 bitcoin | Bitcoin address 3 |
| Transfer 4 | | | Bitcoin address 4<br>From: Wallet A<br>Amount in bitcoin |
| Transfer 5 | Bitcoin address 5 | From: Wallet B<br>Amount in bitcoin | Bitcoin address 4<br>From: First Host<br>Amount in bitcoin<br>Host-Fee: x% |
| Transfer 6 | Bitcoin address 5 | From: Wallet B<br>Amount in bitcoin | Bitcoin address 4<br>To: Email address A<br>Amount in bitcoin<br>Miner's Fee = 0 bitcoin<br>Host-Fee: 0 bitcoin |
| | | | To: Bitcoin address 5<br>Amount in bitcoin<br>Miner's Fee = 0 bitcoin<br>Host-Fee: 0 bitcoin |

| | First Host Computer System 14 | | | Second Host Computer System 16 | |
|---|---|---|---|---|---|
| | Wallet A | | Wallet B | Wallet C | |
| | Email Address A; Login Details | | Email Address B; Login Details | | |
| Transfer 1 | Bitcoin address 1 | Amount in bitcoin | | | |
| | Bitcoin address 2 | | | | |
| Transfer 2 | | From: Network address | | | |
| | | Amount in bitcoin | | | |
| | | Host Fee: 0 bitcoin | | | |
| Transfer 3 | Bitcoin address 2 | To: Email address B | Bitcoin address 3 | From: Wallet A | |
| | | Amount in bitcoin | | Amount in bitcoin | |
| | | Miner's Fee = 0 bitcoin | | | |
| | | Host Fee: 0 bitcoin | | | |
| Transfer 4 | | | Bitcoin address 4 | From: First Host | |
| | | | | Amount in bitcoin | |
| | | | | Host Fee: x% | |
| Transfer 5 | Bitcoin address 5 | From: Wallet B | Bitcoin address 4 | To: Email address A | |
| | | Amount in bitcoin | | Amount in bitcoin | |
| | | | | Miner's Fee = 0 bitcoin | |
| | | | | Host Fee: 0 bitcoin | |
| Transfer 6 | Bitcoin address 5 | From: Wallet B | Bitcoin address 4 | To: Email address A | |
| | | Amount in bitcoin | | Amount in bitcoin | |
| | | | | Miner's Fee = 0 bitcoin | |
| | | | | Host Fee: 0 bitcoin | |
| Transfer 7 | | | Bitcoin address 4 | To: Bitcoin Address 6 | Bitcoin address 6 |
| | | | | Amount in bitcoin | |
| | | | | Miner's Fee = 001 Bitcoin | |
| | | | | Host Fee: 0 bitcoin | |
| | | | | | From: Wallet B (First Host) |
| | | | | | Amount in bitcoin |

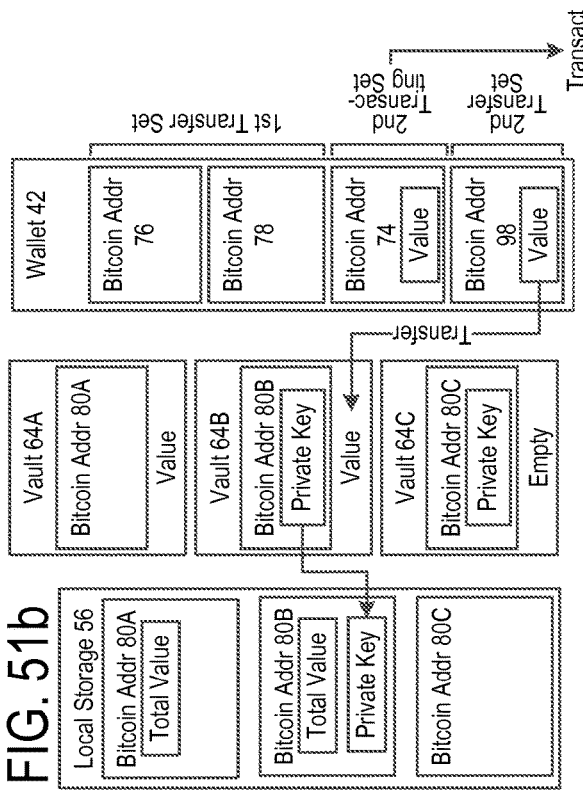
FIG. 51a
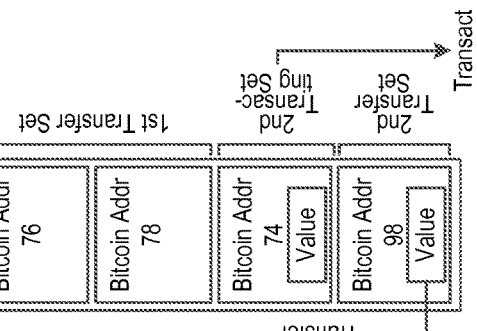
FIG. 51b
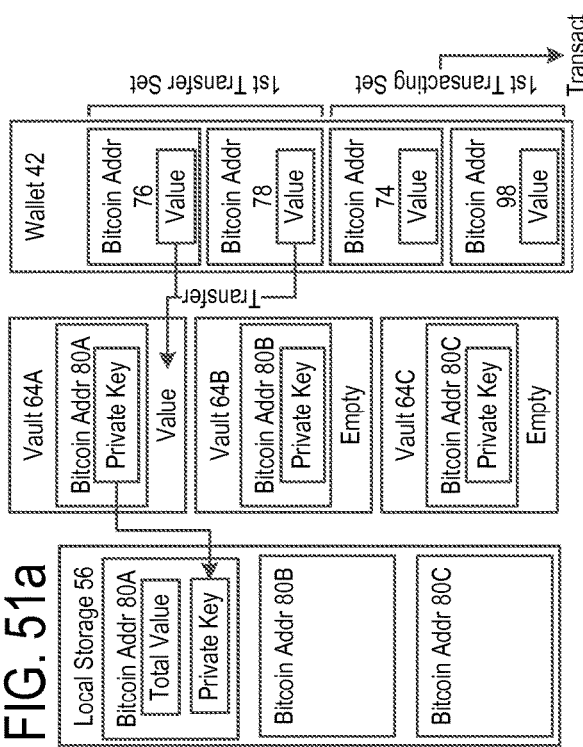
FIG. 51c
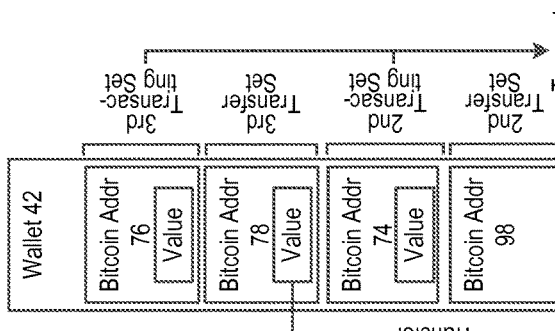
FIG. 51d
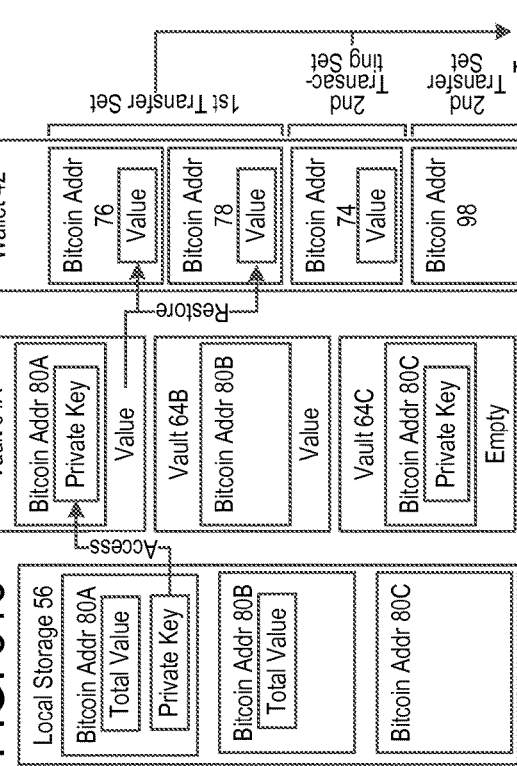

CRYPTOGRAPHIC CURRENCY EXCHANGE

CROSS-REFERENCE TO RELATED APPLICATIONS

This application is a continuation of U.S. patent application Ser. No. 14/660,440, filed Mar. 17, 2015, which claimed priority to U.S. Provisional Application Ser. No. 61/954,434, filed Mar. 17, 2014; U.S. Provisional Application Ser. No. 61/990,017, filed May 7, 2014; U.S. Provisional Patent Application Ser. No. 62/042,676, filed Aug. 27, 2014; U.S. Provisional Patent Application Ser. No. 62/056,100, filed Sep. 26, 2014; U.S. Provisional Patent Application Ser. No. 62/086,669, filed Dec. 2, 2014; and U.S. Provisional Patent Application Ser. No. 62/099,992, filed Jan. 5, 2015, each of which is incorporated herein by reference in its entirety.

BACKGROUND OF THE INVENTION

1. Field of the Invention

This invention relates to a computer system and method for transacting bitcoin.

2. Discussion of Related Art

The Bitcoin network is a peer-to-peer payment system having a plurality of nodes that are connected to one another. Bitcoin exchange computer systems allow for users to exchange local currency into or out of bitcoin. Users send payments by broadcasting digitally signed messages to the Bitcoin network. Users may, for example, send and receive payments using mobile applications on mobile devices, client software or a web browser.

Transactions do not explicitly identify the payor and payee by name or wallet. Instead, a bitcoin transaction transfers ownership to a new address, referred to as a "Bitcoin address". The Bitcoin address is derived from the public portion of one or more cryptographic key pairs. The private portion of a key pair is not disclosed to the public. To send bitcoin sent to an address, a user broadcasts a payment message that is digitally signed with the associated private key.

Participants known as "miners" at miner computer systems verify and timestamp transactions into a shared public database called a "block chain". The miners are rewarded with transaction fees and newly minted bitcoin for their effort. The miner computer systems are specialized computers that append blocks of transactions to the block chain. Solving a cryptographic puzzle required to append a block carries a reward plus fees included in transactions in the block.

Host computer systems reside at various nodes and may host accounts or "wallets" that allow users to make and accept payments using bitcoin. The wallet stores the public key of the Bitcoin address and its associated private key.

The transfer of bitcoin may be an onerous task if the entire public key of the Bitcoin address has to be copied and transmitted.

When a transaction is made between two wallets at the same or different host computer systems, the transaction is broadcast to the Bitcoin network for block chain verification. Such a block chain verification may take a long time to complete. Miner fees are also associated with such a transfer and have to be paid by a host computer system requesting the transfer.

It may be a security concern for users that their Bitcoin addresses may be stolen from their wallets. Existing systems do not provide a solution for maintaining security of Bitcoin addresses while still allowing the users to use Bitcoin addresses within their wallets for transacting with other users.

A merchant computer system often has an online store and a website. A customer at a customer computer system may use a browser to access the online store via the website. Items are displayed for purchase in a local currency. Exchange rate between bitcoin and local currency changes over short periods of time. The price in local currency may thus change between the time that the local currency is displayed to the customer and the time that the customer decides to make the purchase. As a result, the customer or the merchant may incur a loss in local currency. The customer or merchant may then be reluctant to purchase using bitcoin.

In order for a user to access their wallet, the user may log into their account through the website using a user name and password. If the user name and password become compromised then it may be possible for bitcoin to be stolen out of the wallet. Users may therefore be reluctant to store bitcoin in their wallets without any additional security features.

Bitcoin transacting requires the use of a public key and a private key. The private key is used to sign an authorization and the public key is used to verify the signature. Some users may require control over their private keys in order to ensure to such users that bitcoin transacting will not take place without their express authorization.

Content creators often put a lot of time and energy into their blog posts. These efforts are rarely rewarded because efficient technology does not exist for rewarding bloggers for their efforts.

SUMMARY OF THE INVENTION

The invention provides a host computer system for transacting bitcoin including a processor, a network interface device connected to the processor, a computer readable medium connected to the processor, a data store on the computer readable medium and
a set of instructions on the computer readable medium that are executable by the processor. The set of instructions includes a wallet establishment module, a login module, a hosted email module and a wallet management. The wallet establishment module establishes a first wallet in the data store, stores login details for the first wallet and storing a value representative of an amount of bitcoin held by the first wallet. The login module receives login credentials over the network interface device for the first wallet from a first user device, verifies whether the login credentials match the login details for the first wallet, and if the login credentials match the login details then logs the first user device into the first wallet. The hosted email module, if the first user device is logged into the wallet, permits transmission of an email by a user of the first user device to an email address of a second user device. The wallet management module, in response to the transmission of the email, records a transfer in the first wallet for an amount of bitcoin from the first wallet to a second wallet identified by the email address.

The invention also provides a method of transacting bitcoin. A processor establishes a first wallet in a data store connected to the processor. The processor stores login details for the first wallet. The processor stores a value representative of an amount of bitcoin held by the first wallet. The processor receives login credentials for the first wallet from a first user device. The processor verifies whether the login credentials match the login details for the first wallet. The processor, if the login credentials match the login details then, logs the first user device into the first wallet. The processor, if the first user device is logged into the wallet, permits transmission of an email by a user to the first user device to an email address of a second user device and in response to the transmission of the email. The processor records a transfer in the first wallet for an amount of bitcoin from the first wallet to a second wallet identified by the email address.

The invention further provides a non-transitory computer-readable medium having stored thereon a set of instructions that are executable by a processor to carry out a method of transacting bitcoin. The processor establishes a first wallet in a data store connected to the processor. The processor stores login details for the first wallet. The processor stores a value representative of an amount of bitcoin held by the first wallet. The processor receives login credentials for the first wallet from a first user device. The processor verifies whether the login credentials match the login details for the first wallet. The processor, if the login credentials match the login details then, logs the first user device into the first wallet. The processor, if the first user device is logged into the wallet, permits transmission of an email by a user to the first user device to an email address of a second user device and in response to the transmission of the email. The processor records a transfer in the first wallet for an amount of bitcoin from the first wallet to a second wallet identified by the email address.

The invention further provides a first host computer system for transacting bitcoin including a processor at a first node of the Bitcoin network, a network interface device connected to the processor, a computer readable medium connected to the processor, a data store on the computer readable medium and a set of instructions on the computer readable medium that are executable by the processor. The set of instructions includes a wallet establishment module. The wallet establishment module establishes a first and second wallets in the data store and stores a value representative of an amount of bitcoin held by the first wallet. The wallet management module receives, over the network interface device, a first transfer instruction for an amount of bitcoin from the first wallet and an identifier of the second wallet, in response to the first transfer instruction, records a transfer in the first wallet for the amount of bitcoin in the first transfer instruction out of the first wallet and a transfer in the second wallet, identified by the identifier of the second wallet, for the amount of bitcoin in the first transfer instruction into the second wallet without paying a miner's fee for the first transfer. In order to execute a subsequent on-block chain transaction, the wallet management module receives, over the network interface device, a second transfer instruction for an amount of bitcoin from the first wallet and a bitcoin address associated with a second node of the Bitcoin network, and in response to the second transfer instruction, records a transfer in the first wallet for the amount of bitcoin in the second transfer instruction out of the first wallet, broadcasts a message to the Bitcoin network, including to the second node, to record a transfer associated with the bitcoin address associated with the second node, for the amount of bitcoin in the second transfer instruction, and pays a miner's fee for the second transfer.

The invention further provides a method of transacting bitcoin including. A processor of a first host computer system at a first node of the Bitcoin network establishes first and second wallets in a data store connected to the processor. The processor stores a value representative of an amount of bitcoin held by the first wallet. The processor receives a first transfer instruction for an amount of bitcoin from the first wallet and an identifier of the second wallet. The processor, in response to the first transfer instruction, records a transfer in the first wallet for the amount of bitcoin in the first transfer instruction out of the first wallet and a transfer in the second wallet, identified by the identifier of the second wallet, for the amount of bitcoin in the first transfer instruction into the second wallet without paying a miner's fee for the first transfer. The processor receives a second transfer instruction for an amount of bitcoin from the first wallet and a bitcoin address associated with a second node of the bitcoin network. The processor, in response to the second transfer instruction records a transfer in the first wallet for the amount of bitcoin in the second transfer instruction out of the first wallet, broadcasts a message to the Bitcoin network, including to the second node, to record a transfer associated with the bitcoin address associated with the second node, for the amount of bitcoin in the second transfer instruction and pays a miner's fee for the second transfer.

The invention further provides a non-transitory computer-readable medium having stored thereon a set of instructions that are executable by a processor of a first host computer system at a first node of the Bitcoin network to carry out a method of transacting bitcoin. The processor establishes first and second wallets in a data store connected to the processor. The processor stores a value representative of an amount of bitcoin held by the first wallet. The processor receives a first transfer instruction for an amount of bitcoin from the first wallet and an identifier of the second wallet. The processor, in response to the first transfer instruction, records a transfer in the first wallet for the amount of bitcoin in the first transfer instruction out of the first wallet and a transfer in the second wallet, identified by the identifier of the second wallet, for the amount of bitcoin in the first transfer instruction into the second wallet without paying a miner's fee for the first transfer. The processor receives a second transfer instruction for an amount of bitcoin from the first wallet and a bitcoin address associated with a second node of the bitcoin network. The processor, in response to the second transfer instruction records a transfer in the first wallet for the amount of bitcoin in the second transfer instruction out of the first wallet, broadcasts a message to the Bitcoin network, including to the second node, to record a transfer associated with the bitcoin address associated with the second node, for the amount of bitcoin in the second transfer instruction and pays a miner's fee for the second transfer.

The invention also provides a host computer system for transacting bitcoin including a processor, a computer readable medium connected to the processor, a local storage on the computer readable medium and a set of instructions on the computer readable medium that are executable by the processor. The set of instructions includes a register, a Bitcoin address and an associated private key and value stored in the register, a local controller, a splitter, an offline distribution module, at least one restoration interface, and an assembler. The local controller transfers a private key for a Bitcoin address of a vault, to a local storage connected to a processor and transfers the value of the Bitcoin address in the register to the vault. The splitter splits the private key of the Bitcoin address of the vault into a plurality of codes. The offline distribution module distributes the codes to remote distributed storage locations, removes the private key of the Bitcoin address of the vault from the local storage, and removes the value for the Bitcoin address of the register from the Bitcoin address of the register. The restoration interface receives at least some of the codes into which the private key for Bitcoin address of the vault has been split. The assembler assembles the codes that have been received into the private key of the Bitcoin address of the vault. The local controller restores the private key of the Bitcoin address of the vault from the local storage, and restores the value for the Bitcoin address in the register from the vault.

The invention further provides a method of transacting bitcoin. A processor transfers a private key of the Bitcoin address of a vault to a local storage connected to the processor. The processor splits the private key of the Bitcoin address of the vault into a plurality of codes. The processor distributes the codes to remote distributed storage locations. The processor transfers a value of a Bitcoin address in a register to the vault. The processor receives at least some of the codes into which the private key of the Bitcoin address of the vault has been split. The processor assembles the codes that have been received into the private key of the Bitcoin address of the vault. The processor restores the private key of the Bitcoin address of the vault to the vault. The processor restores the value of the Bitcoin address in the register from the vault.

The invention also provides a non-transitory computer-readable medium having stored thereon a set of instructions that are executable by a processor to carry out a method of transacting bitcoin. A processor transfers a private key of the Bitcoin address of a vault to a local storage connected to the processor. The processor splits the private key of the Bitcoin address of the vault into a plurality of codes. The processor distributes the codes to remote distributed storage locations. The processor transfers a value of a Bitcoin address in a register to the vault. The processor receives at least some of the codes into which the private key of the Bitcoin address of the vault has been split. The processor assembles the codes that have been received into the private key of the Bitcoin address of the vault. The processor restores the private key of the Bitcoin address of the vault to the vault. The processor restores the value of the Bitcoin address in the register from the vault.

The invention further provides a host computer system for transacting bitcoin including a processor, a network interface device connected to the processor, a computer readable medium connected to the processor, a local storage on the computer readable medium and a set of instructions on the computer readable medium that are executable by the processor. The set of instructions includes a wallet, a plurality of Bitcoin addresses stored in the wallet, a first vault, and a local controller. The local controller is executable for selecting a first transfer set of the Bitcoin addresses for cold storage in the first vault, transferring at least a portion of each of the Bitcoin addresses of the first transfer set to a first vault while keeping the portions a first transaction set in the register, and restoring at least the portion of the Bitcoin addresses of the first transfer set from the first vault to the wallet and a wallet management module transacting using the Bitcoin addresses of the first transacting set without permitting transacting with the Bitcoin addresses of the first transfer set due to the portions thereof being restored to the first vault, and transacting using the Bitcoin addresses of the first transfer set due to the portions thereof being restored from the first vault to the wallet.

The invention also provides a method of transacting bitcoin. A processor stores a plurality of Bitcoin addresses in a wallet. The processor selects a first transfer set of the Bitcoin addresses for cold storage in a first vault. The processor transfers at least a portion of each of the Bitcoin addresses of the first transfer set to the first vault while keeping the portions a first transaction set in the register. The processor transacts using the Bitcoin addresses of the first transacting set without permitting transacting with the Bitcoin addresses of the first transfer set due to the portions thereof being transferred to the first vault. The processor restores the portion of the Bitcoin addresses of the first transfer set from the first vault to the wallet. The processor transacts using the Bitcoin addresses of the first transfer set due to the portions thereof being restored from the first vault to the wallet.

The invention further provides a non-transitory computer-readable medium having stored thereon a set of instructions that are executable by a processor to carry out a method of transacting. A processor stores a plurality of Bitcoin addresses in a wallet. The processor selects a first transfer set of the Bitcoin addresses for cold storage in a first vault. The processor transfers at least a portion of each of the Bitcoin addresses of the first transfer set to the first vault while keeping the portions a first transaction set in the register. The processor transacts using the Bitcoin addresses of the first transacting set without permitting transacting with the Bitcoin addresses of the first transfer set due to the portions thereof being transferred to the first vault. The processor restores the portion of the Bitcoin addresses of the first transfer set from the first vault to the wallet. The processor transacts using the Bitcoin addresses of the first transfer set due to the portions thereof being restored from the first vault to the wallet.

The invention also provides a method of effecting payment including receiving, by a host computer system, a request for payment from a merchant computer system, including an amount in a currency, determining, by the host computer system, a first exchange rate, wherein the first exchange rate fluctuates and the first exchange rate is determined at a first moment in time, converting, by the host computer system, the amount in the currency to an amount in bitcoin using the first exchange rate at the first moment in time, receiving, by the host computer system, a send instruction from the customer computer system, wherein the send instruction is at a second moment in time later than the first moment in time and the exchange rate at the second moment in time is a second exchange rate that is different than the first exchange rate at the first moment in time, receiving, by the host computer system, payment in bitcoin from the customer in an amount that is based on the amount in bitcoin and transmitting, by the host computer system, in response to receiving the send instruction from the customer computer system, a payment instruction to pay currency to the merchant, wherein the currency paid to the merchant is for an amount that is at least in part based on the amount in the currency that is converted to bitcoin at the first moment in time even though the exchange rate is different at the second moment in time.

The invention further provides a host computer system for effecting payment including a processor, a computer readable medium connected to the processor and a set of instructions on the computer readable medium that are executable by the processor. The set of instructions includes an application programmable interface (API) receiving a request for payment from a merchant computer system, including an amount in a currency, a currency converter determining a first exchange rate, wherein the first exchange rate fluctuates and the first exchange rate is determined at a first moment in time, and converting, by the host computer system, the amount in the currency to an amount in bitcoin using the first exchange rate at the first moment in time, transaction processor receiving a send instruction from the customer computer system, wherein the send instruction is at a second moment in time later than the first moment in time and the exchange rate at the second moment in time is a second exchange rate that is different than the first exchange rate at the first moment in time, and receiving a payment in bitcoin from the customer in an amount that is based on the amount in bitcoin and a bank transfer module transmitting in response to receiving the send instruction from the customer computer system, a payment instruction to pay currency to the merchant, wherein the currency paid to the merchant is for an amount that is at least in part based on the amount in the currency that is converted to bitcoin at the first moment in time even though the exchange rate is different at the second moment in time.

The invention also provides a non-transitory computer-readable medium having stored thereon a set of instructions that are executable by a processor to carry out a method of transacting bitcoin including receiving, by a host computer system, a request for payment from a merchant computer system, including an amount in a currency, determining, by the host computer system, a first exchange rate, wherein the first exchange rate fluctuates and the first exchange rate is determined at a first moment in time, converting, by the host computer system, the amount in the currency to an amount in bitcoin using the first exchange rate at the first moment in time, receiving, by the host computer system, a send instruction from the customer computer system, wherein the send instruction is at a second moment in time later than the first moment in time and the exchange rate at the second moment in time is a second exchange rate that is different than the first exchange rate at the first moment in time, receiving, by the host computer system, payment in bitcoin from the customer in an amount that is based on the amount in bitcoin and transmitting, by the host computer system, in response to receiving the send instruction from the customer computer system, a payment instruction to pay currency to the merchant, wherein the currency paid to the merchant is for an amount that is at least in part based on the amount in the currency that is converted to bitcoin at the first moment in time even though the exchange rate is different at the second moment in time.

The invention further provides a method of managing bitcoin, including establishing, by a host computer system, a vault and storing first and second electronic communication addresses in relation to the vault, storing, by the host computer system, bitcoin in the vault, receiving, by the host computer system, a request to transfer an amount of the bitcoin out of the vault, transmitting, by the host computer system, in response to the request, first and second messages over a network to the first and second addresses, detecting, by the host computer system, whether first and second authorization instructions are received due to one or more users reacting to the first and second messages sent to the first and second addresses and transferring, by the host computer system, the amount of bitcoin out of the vault only if both the first and second authorization instructions are detected.

The invention also provides a non-transitory computer-readable medium having stored thereon a set of instructions which, when executed by a processor, executes a method including establishing, by a host computer system, a vault and storing first and second electronic communication addresses in relation to the vault, storing, by the host computer system, bitcoin in the vault, receiving, by the host computer system, a request to transfer an amount of the bitcoin out of the vault, transmitting, by the host computer system, in response to the request, first and second messages over a network to the first and second addresses, detecting, by the host computer system, whether first and second authorization instructions are received due to one or more users reacting to the first and second messages sent to the first and second addresses and transferring, by the host computer system, the amount of bitcoin out of the vault only if both the first and second authorization instructions are detected.

The invention further provides a bitcoin management system, including a processor, a computer-readable medium connected to the processor and a set of instructions on the computer readable medium that are executable by the processor. The set of instructions includes a vault establishment wizard establishing a vault and storing first and second electronic communication addresses in relation to the vault, transaction processor storing bitcoin in the vault and a vault management module receiving a request to transfer an amount of the bitcoin out of the vault, transmitting, in response to the request, first and second messages over a network to the first and second addresses, detecting whether first and second authorization instructions are received due to one or more users reacting to the first and second messages sent to the first and second addresses, and instructing the transaction processor to transfer the amount of bitcoin out of the vault only if both the first and second authorization instructions are detected.

The invention also provides a method of transacting bitcoin including storing, by a host computer system, a public key, receiving, by the host computer system, a request from a user computer system to transact using a bitcoin address, transmitting, by the host computer system, a verification script to the user computer system, the verification script including an authorization and a signature algorithm that is executable on the user computer system to sign the authorization with a private key to obtain a signed authorization that includes the signature and transmit the signed authorization to the host computer system, receiving, by the host computer system, the signed authorization including the signature from the user computer system, verifying, by the host computer system, the signature of the signed authorization received from the user computer system using a public key; and
transacting, by the host computer system, with the bitcoin address, the transacting being permitted due to a successful verification of the signature but not upon an unsuccessful verification of the signature.

The invention further provides a host computer system including a processor, a set of data and instructions on the computer-readable medium that are executable by the processor that are executable by the processor, a public key, a transaction processor receiving a request from a user computer system to transact using a bitcoin address, a verification script that is transmitted to the user computer system, the verification script including an authorization and a signature algorithm that is executable on the user computer system to sign the authorization with a private key to obtain a signed authorization that includes the signature and transmit the signed authorization to the host computer system, the host computer system receiving the signed authorization including the signature from the user computer system, and a verification module verifying the signature of the signed authorization received from the user computer system using a public key, the transaction processor transacting with the bitcoin address, the transacting being permitted due to a successful verification of the signature but not upon an unsuccessful verification of the signature.

The invention also provides a host computer system including a processor, a network interface device connected to the processor, a computer readable medium connected to the processor and a set of instructions on the computer readable medium that are readable and executable by the processor. The set of instructions include an embedded code generator generating an embedded code for inclusion within a website of a partner computer system, the embedded code including a startup caller causing transmission of a startup call from the sender computer system to the host computer system, a startup call responder receiving the startup call from the sender computer system and transmitting, in response to the startup call, a tip button and a session script to the sender computer system, the session script being executable by the sender computer system to transmit a session call to the host computer system and a session responder transmitting, in response to the session call, at least one payment button and a payment script to the sender computer system, the payment button being selectable by the user of the sender computer system to execute the payment script, the payment script transmitting an instruction to a transaction processor to transfer funds from a sender account to a receiver account.

The invention further provides a method of transferring funds including generating, by a host computer system, an embedded code for inclusion within a website of a partner computer system, the embedded code including a startup caller causing transmission of a startup call from the sender computer system to the host computer system, receiving, by the host computer system, the startup call from the sender computer system, transmitting, by the host computer system in response to the startup call, a tip button and a session script to the sender computer system, the session script being executable by the sender computer system to transmit a session call to the host computer system and transmitting, by the host computer system in response to the session call, at least one payment selection and a payment script to the sender computer system, the payment selection being selectable by the user of the sender computer system to execute the payment script, the payment script transmitting an instruction to a transaction processor to transfer funds from a sender account to a receiver account.

The invention also provides a method of transacting bitcoin including executing, by a host computer system, a trading algorithm, including receiving sell offers for bitcoin from a sellers, receiving a buy offers for bitcoin from a buyers, creating respective matches wherein each match includes one of the buy offers and one of the sell offers, broadcasting each respective match over a multicast pipeline, receiving each respective match with a clearing module and clearing the respective match by updating an exchange database to reflect the respective match by transferring a representation of bitcoin from the seller to the buyer and transferring a representation of currency from the buyer to the seller.

The invention further provides a system for transacting bitcoin including an order gateway receiving sell offers for bitcoin from a sellers and receiving a buy offers for bitcoin from a buyers, a matching engine creating respective matches wherein each match includes one of the buy offers and one of the sell offers, a multicast pipeline, the matching engine broadcasting each respective match over the multicast pipeline, an exchange database; and a clearing module receiving each respective and clearing the respective match by updating the exchange database to reflect the respective match by transferring a representation of bitcoin from the seller to the buyer and transferring a representation of currency from the buyer to the seller, thereby executing a trading algorithm.

BRIEF DESCRIPTION OF THE DRAWINGS

The invention is further described by way of example with reference to the accompanying drawings, wherein:

FIG. 2 is diagrammatic view of a first wallet that is held within a first host computer system in FIG. 1;

FIG. 3 is a view similar to FIG. 2, further illustrating a second wallet that has been established within the first host computer system;

FIGS. 6 to 30 are views similar to FIG. 5 that step a user of the second user device through a wallet set up;

Figure 32:
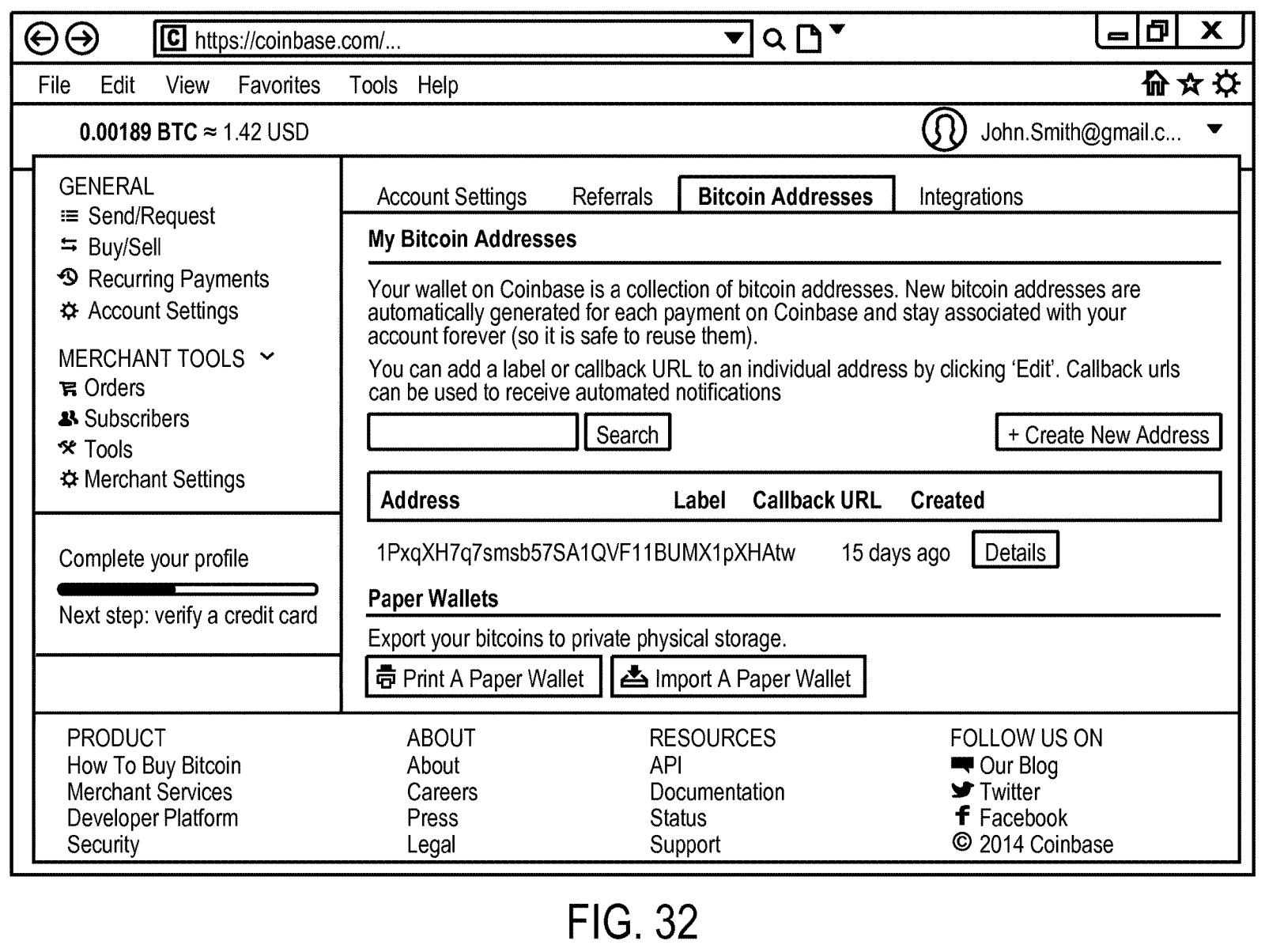
Figure 33:
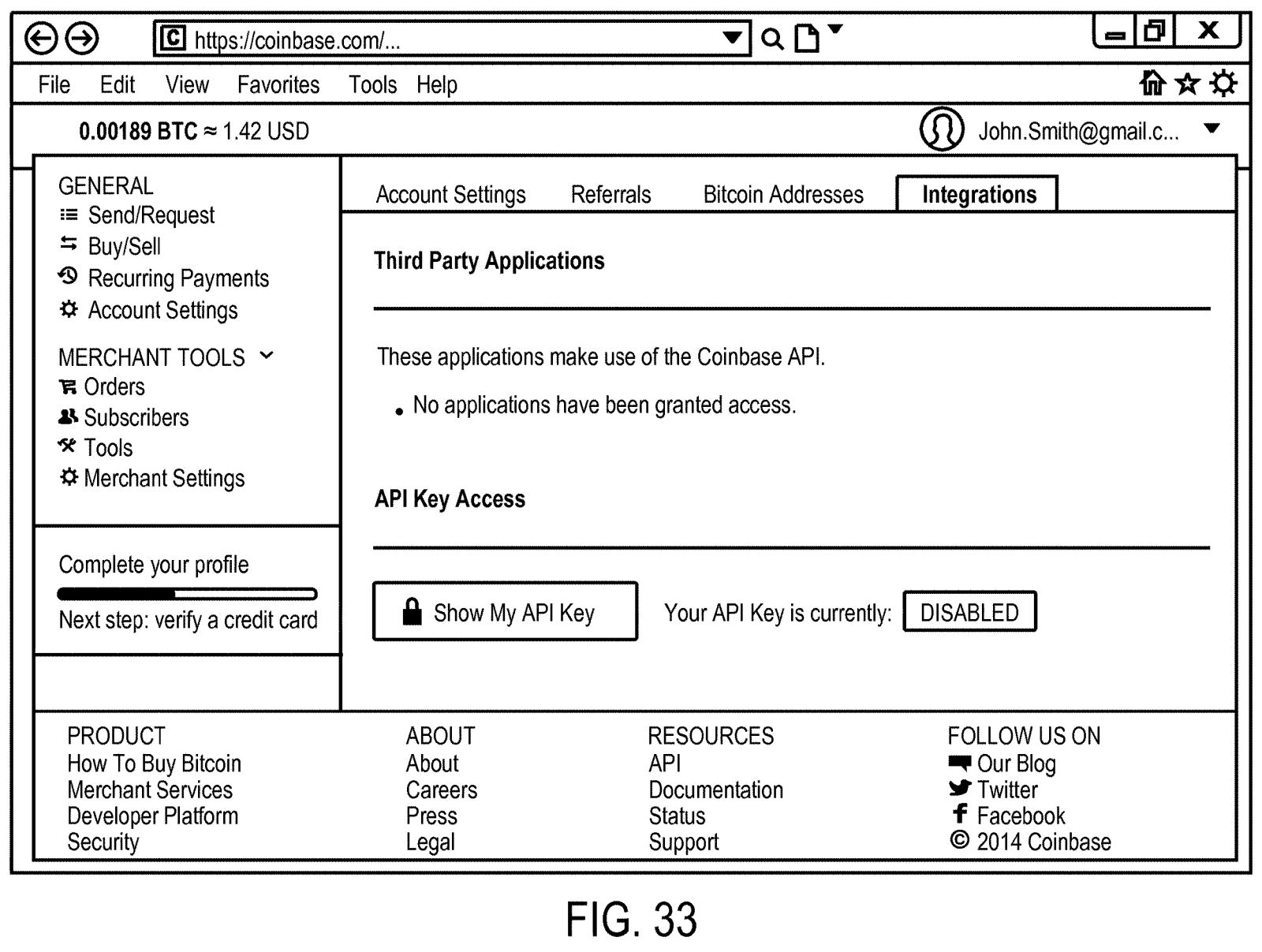

FIGS. 31 to 33 are views of the browser wherein the user interface discloses various tools that can be used by the user;

FIGS. 34 to 37 are views of the browser wherein the user interface is used by the user to purchase bitcoin from the first host computer system;

FIG. 40 is a view of the browser wherein the user interface displays "Limits and Verifications" associated with the second wallet;

FIG. 41 is a view similar to FIG. 3 displaying transfer of bitcoin from the second wallet to the first wallet;

FIGS. 42 and 43 are views of the browser when the user interface steps the user through the transfer of bitcoin from the second wallet to the first wallet;

FIG. 45 is a view similar to FIG. 40 further showing the transfer of bitcoin from the second wallet to a third wallet that is connected to a second host computer system;

FIGS. 51a to 51d are block diagrams that illustrate how values of certain Bitcoin addresses in a wallet are removed and others are maintained;

DETAILED DESCRIPTION OF THE INVENTION

Figure 1A:
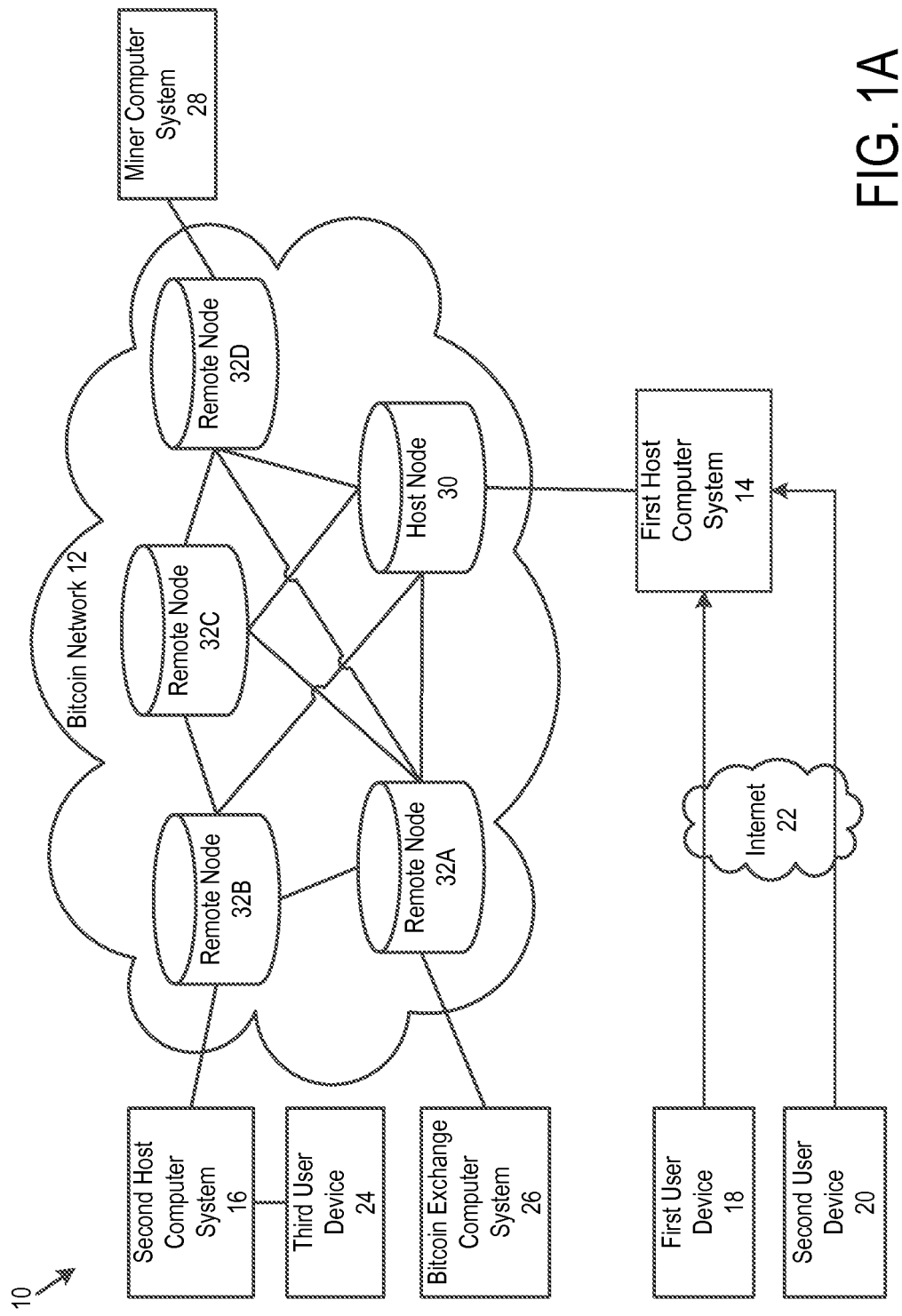
FIG. 1A is a block diagram of a network environment that includes the Bitcoin network and a number of systems forming part thereof or connected thereto.

FIG. 1A of the accompanying drawings illustrates a network environment 10, including the Bitcoin network 12, a first host computer system 14 within which the invention manifests itself, a second host computer system 16, first and second user devices 18 and 20 connected over the Internet 22 to the first host computer system 14, a third user device 24 connected to the second host computer system 16, a bitcoin exchange computer system 26 and a miner computer system 28.

The Bitcoin network 12 includes a host node 30 and a plurality of remote nodes 32A to D that are connected to one another. The first host computer system 14 is connected to the host node 30. The bitcoin exchange computer system 26 is connected to the remote node 32A. The second host computer system 16 is connected to the remote node 32B. The miner computer system 28 is connected to the remote node 32D or could reside on the same computer system.

Figure 1B:
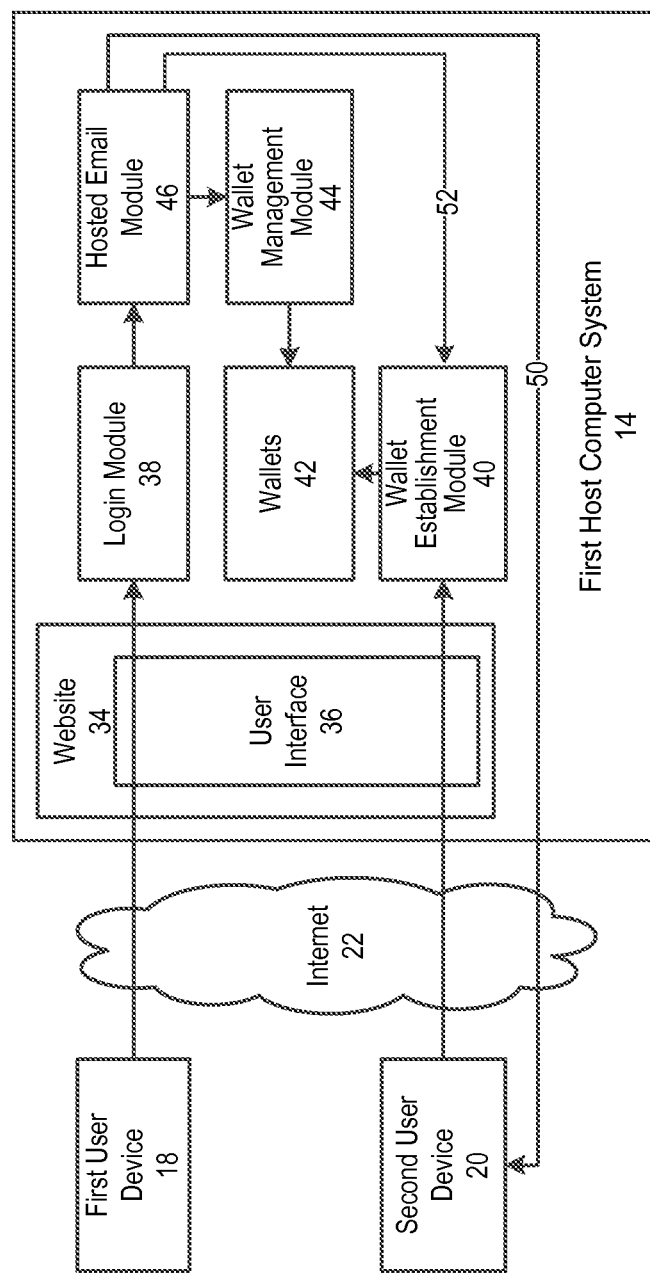
FIG. 1B is a block diagram of a first host computer system and a first and second user devices connected thereto.

The first host computer system 14 is used primarily for transacting bitcoin and, as shown in FIG. 1B, includes a website 34 having a user interface 36, a login module 38, a wallet establishment module 40, a plurality of wallets 42, a wallet management module 44 and a hosted email module 46. The login module 38 is connected to the website 34 and the hosted email module 46 is connected to the login module 38. The wallet establishment module 40 is connected to the wallets 42. The hosted email module 46 is connected via the wallet management module 44 to the wallets 42. As illustrated in the drawing, the first user device 18 is connected over the Internet 22 and the user interface 36 to the login module 38. As further illustrated in the drawing, the hosted email module 46 is connected over the Internet 22 to the second user device 20 and the second user device 20 is connected over the Internet 22 and the user interface 36 to the wallet establishment module 40.

As shown in FIG. 2, the first host computer system 14 already has one wallet (Wallet A) stored among the wallets 42 corresponding to the first user device 18. The first wallet (Wallet A) includes an email address (email address A) and login details for the wallet. The first wallet (Wallet A) also includes a number of Bitcoin addresses (Bitcoin address 1; Bitcoin address 2) that have been created due to respective transfers or purchases (Transfer 1; Transfer 2). The first Bitcoin address (Bitcoin address 1) is created due to a purchase (Transfer 1) from a master wallet of the first host computer system 14 (First Host) and is recorded for a value in an amount in bitcoin. The second Bitcoin address (Bitcoin address 2) is created due to a transfer (Transfer 2) from another location within the Bitcoin network 12 having a network address outside of the first host computer system 14 and is recorded for a particular amount in bitcoin. The first wallet (Wallet A) was originally established by the wallet establishment module 40 in FIG. 1B. The email address (email address A) and login details of the first wallet were also recorded by the wallet establishment module 40. The wallet establishment module 40 and wallet management module 44 were used to record the transfers and purchases (Transfer 1; Transfer 2), their Bitcoin addresses (Bitcoin address 1; Bitcoin address 2), their values and other details within the wallet.

A user of the first user device 18 in FIG. 1B may use a mobile application on the first user device 18 to communicate over the Internet 22 directly with the login module 38 or may use a browser on the first user device 18 to communicate via the Internet 22 and the website 34 with the login module 38. A browser application on the first user device 18 transmits a user interface request over the Internet 22 to the website 34. The website 34 responds to the user interface request by transmitting the user interface 36 over the Internet 22 to the first user device 18. The user interface 36 is then displayed on the first user device 18. The user interface 36 includes fields for entering login credentials, which are then transmitted from the first user device 18 over the Internet 22 to the login module 38. The login module 38 verifies whether the login credentials match the login details for the wallet (Wallet A). If the login credentials match the login details, then the login module 38 logs the first user device 18 into the wallet (Wallet A) in FIG. 2. If the login credentials do not match the login details, then the first user device 18 is not logged in to the wallet.

If the first user device 18 in FIG. 1B is logged in to the wallet, the login module 38 also provides access for the first user device 18 to the hosted email module 46 and transmission of an email by a user of the first user device 18 to an email address of the second user device 20. The user interface 36 provides a field for entering the email address of the second user device 20. The user interface 36 also includes a field for entering an amount in bitcoin (or an amount in local currency that is converted to bitcoin using an exchange rate) that is being transferred from the wallet (Wallet A) corresponding to the first user device 18 to a respective wallet among the wallets 42 corresponding to the second user device 20 that has not yet been established at this point in time. The user of the first user device 18 then uses the hosted email module 46 to send an email at 50 to the second user device 20. The hosted email module 46 simultaneously at 52 instructs the wallet establishment module 40 to establish a wallet corresponding to the email address within the wallets 42. The hosted email module 46 simultaneously instructs the wallet management module 44 to record the amount of bitcoin that is being transferred from the wallet (Wallet A) within the wallet corresponding to the email address.

FIG. 3 illustrates further activity within the wallets 42 due to the email represented by a third transfer (Transfer 3). When the user of the first wallet (Wallet A) transmits the email, the system uses an existing Bitcoin address (Bitcoin address 2) to which the outgoing transfer is charged. Associated with the transfer (Transfer 3) are the email address to which the email has been transmitted, the amount in bitcoin, a miner's fee of zero bitcoin that is paid by the first host computer system 14 to any miner computer system such as the miner computer system 28 in FIG. 1A, and a host fee of zero bitcoin that are charged to the wallet (Wallet A) for the transfer. A second wallet (Wallet B) is established by the wallet establishment module 40 and the email address (email address B) of the second user device 20 is recorded as an identifier of the wallet (Wallet B). A Bitcoin address (Bitcoin address 3) is recorded within the second wallet (Wallet B) for the transfer (Transfer 3). Within the second wallet (Wallet B), the transfer (Transfer 3) has the Bitcoin address (Bitcoin address 3), the identifier of the wallet (Wallet A) from where the funds are transferred associated therewith, and the amount in bitcoin that has been transferred. The amount in bitcoin corresponding to the transfer (Transfer 3) of both wallets (Wallet A; Wallet B) is the same, consistent with double entry accounting principles. The second wallet (Wallet B) so far has no login details or any other user information and has not been accessed by a user of the second user device 20 at this point in time.

Figure 4:
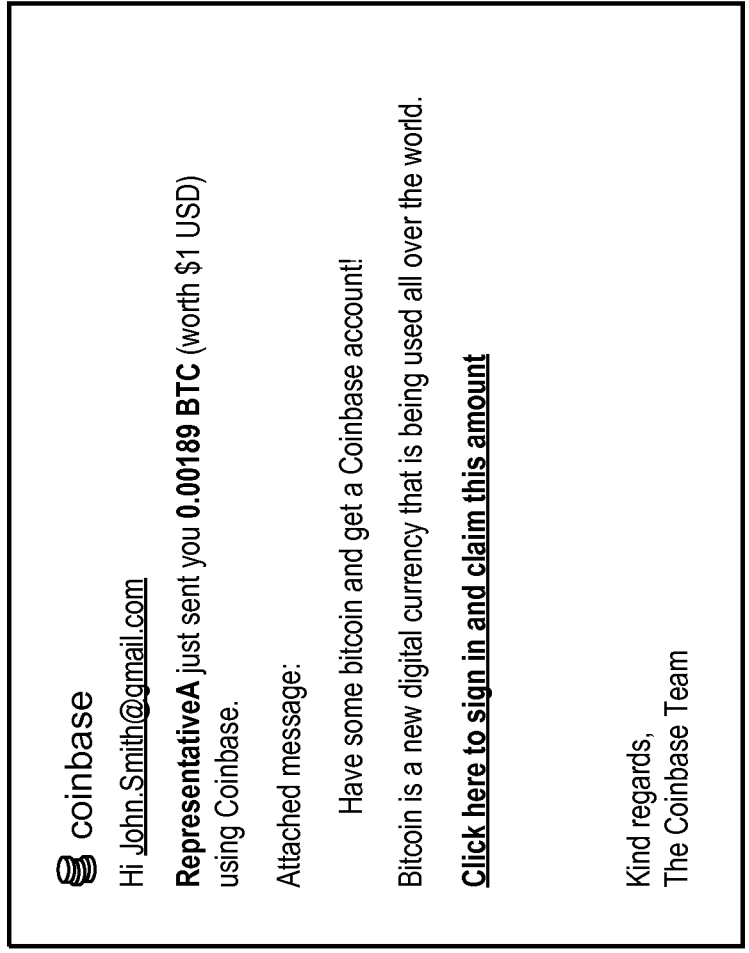
FIG. 4 is a view of an email that is received by the second user device in FIG. 1.

FIG. 4 illustrates the email when it is received at the second user device 20 in FIG. 1B. The email is received and viewed within an email application on the second user device 20. The email includes a link ("Click here to sign in and claim this amount") that, when selected by the user of the second user device 20, transmits a user interface request from the browser on the second user device 20 over the Internet 22 to the website 34. The website 34 responds to the user interface request to transmit the user interface 36 over the Internet 22 to the second user device 20 for viewing within the browser.

Figure 5:
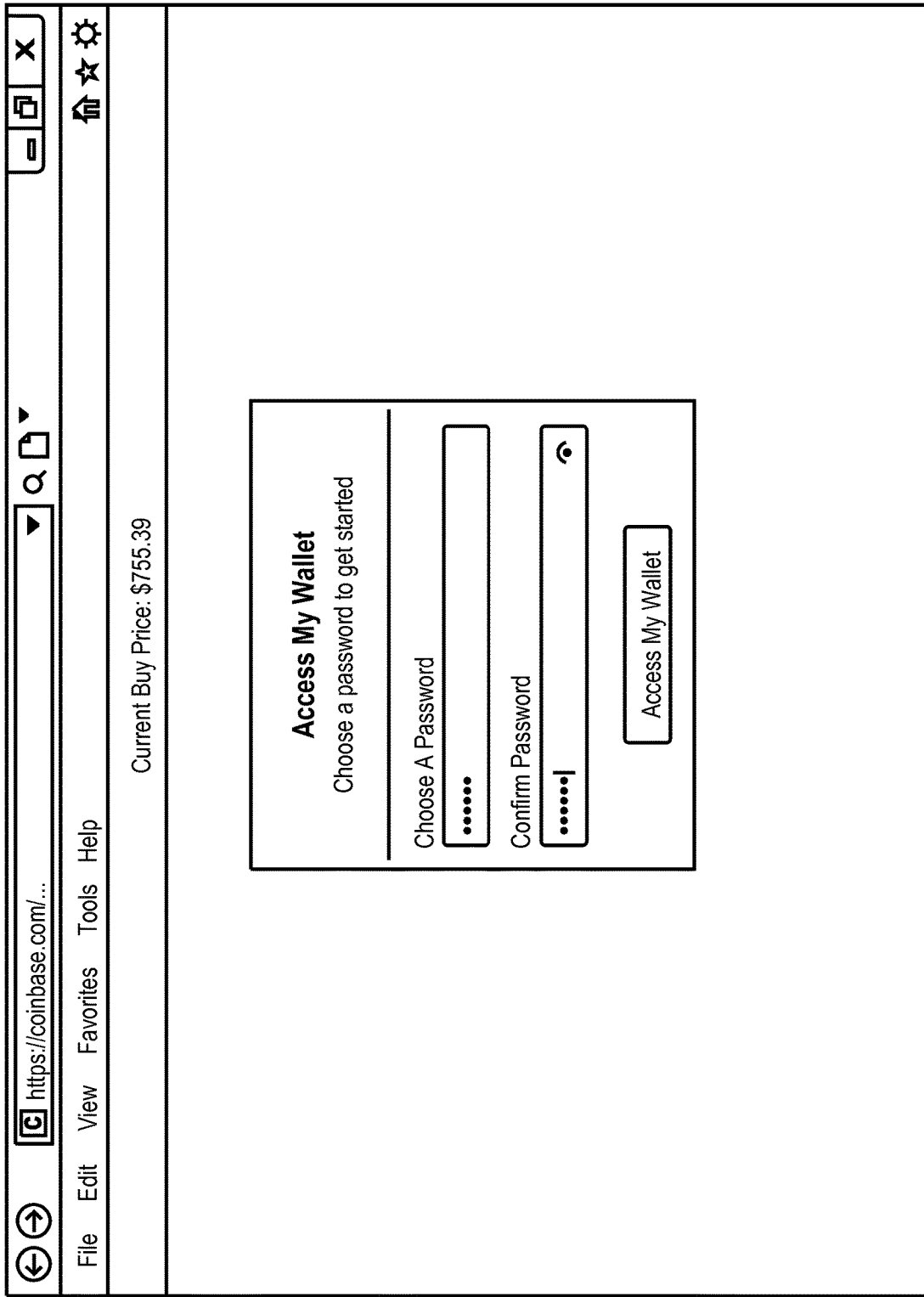
FIG. 5 is a view of a browser displaying a user interface with fields for creating login details for the second wallet.

FIG. 5 illustrates the user interface 36 as displayed on the second user device 20 in FIG. 1B. The user interface 36 includes a plurality of fields for the user of the second user device 20 to enter login details for the second wallet (Wallet B), including a password and a confirmation of the password. After the user has entered a password, the user can access their wallet by selecting the button "Access My Wallet". The wallet establishment module 40 in FIG. 1B stores the login credentials in association with the second wallet (Wallet B). The login module 38 also logs the second user device 20 into the second wallet (Wallet B). If the user is logged out, the user can be provided with a login page where the user can enter login credentials that are compared with the login details in the second wallet (Wallet B) and then log into the second wallet (Wallet B) following a favorable match between the login credentials and the login details.

Figure 6:
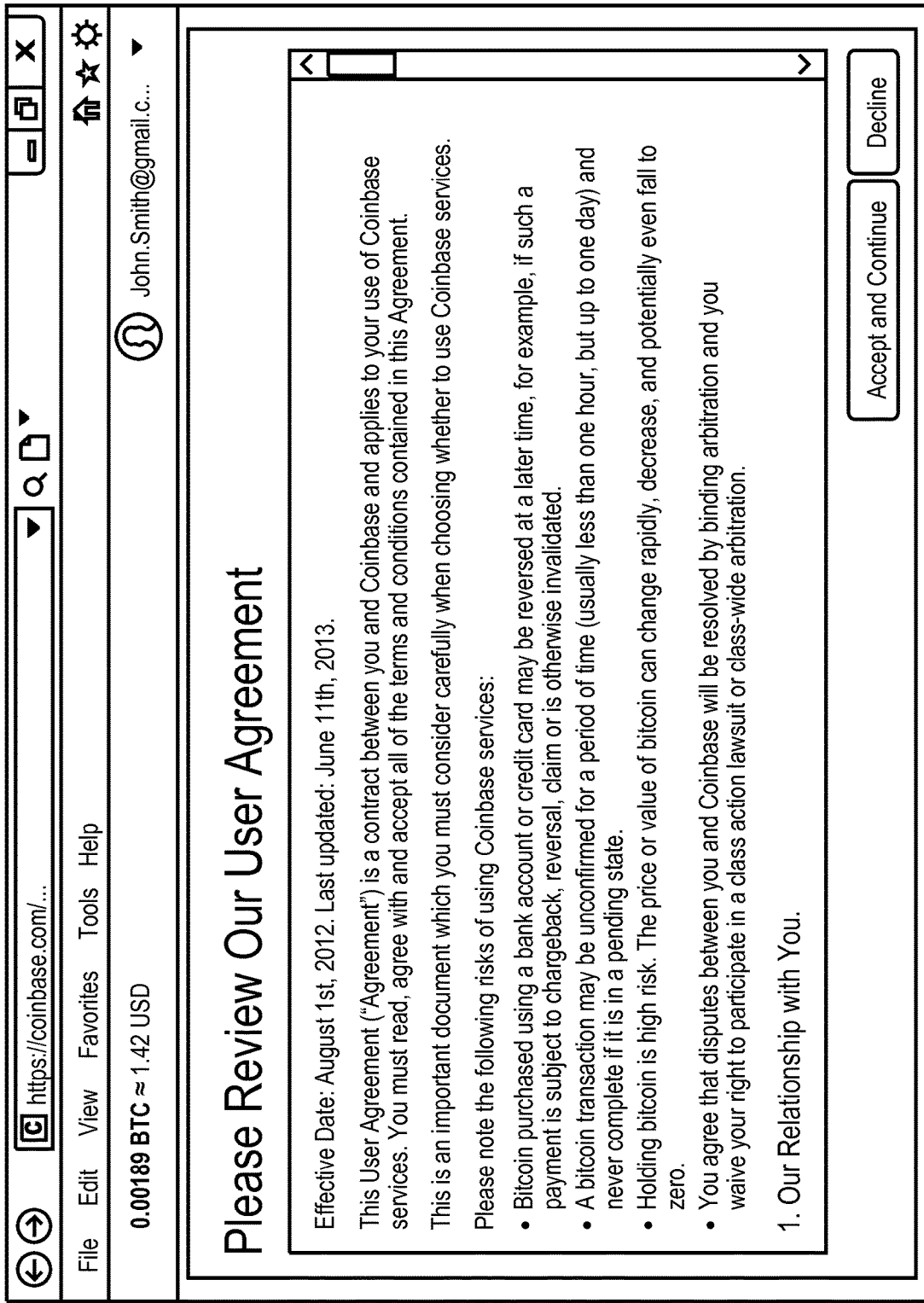
Figure 11:
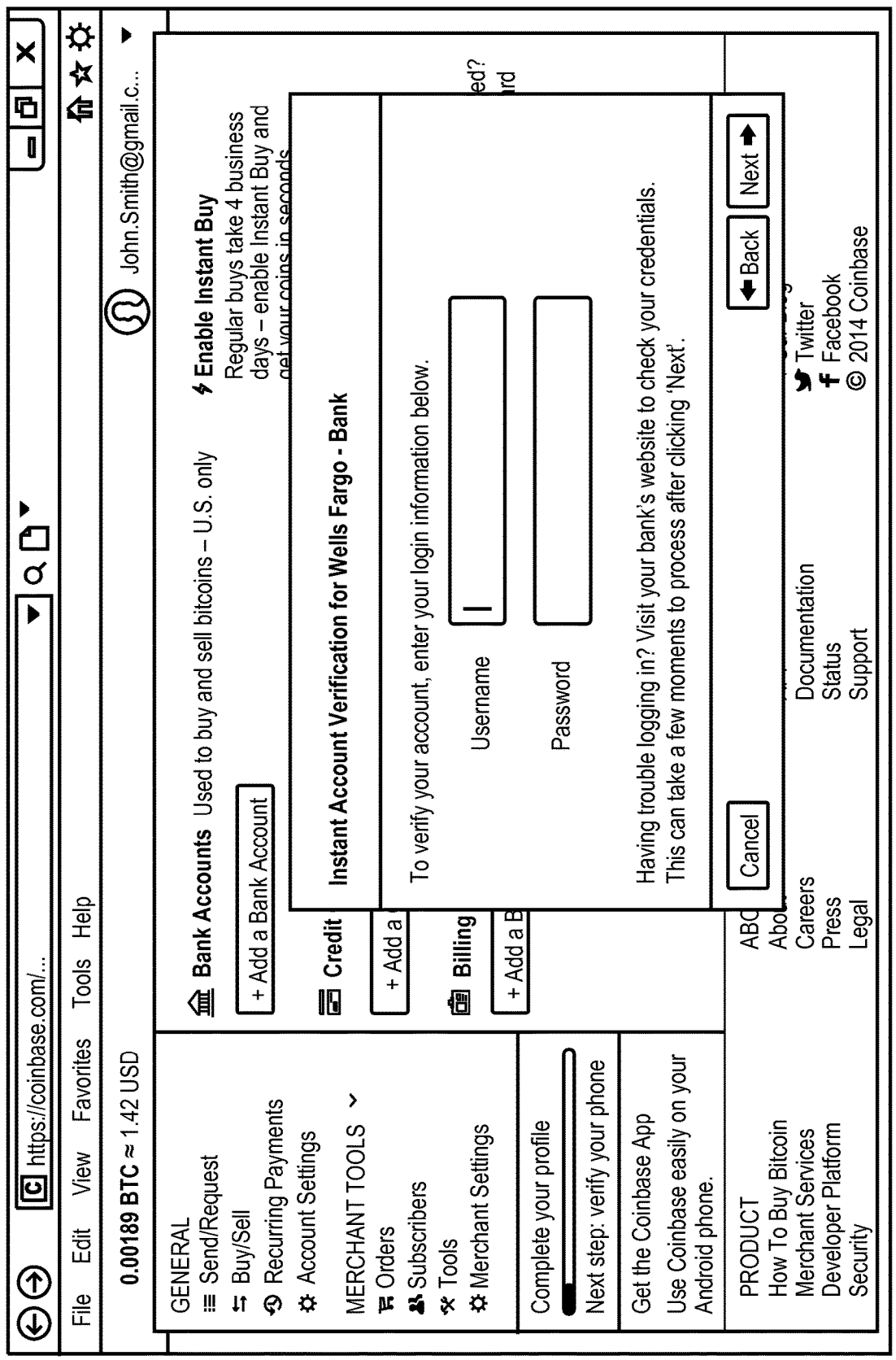
Figure 12:
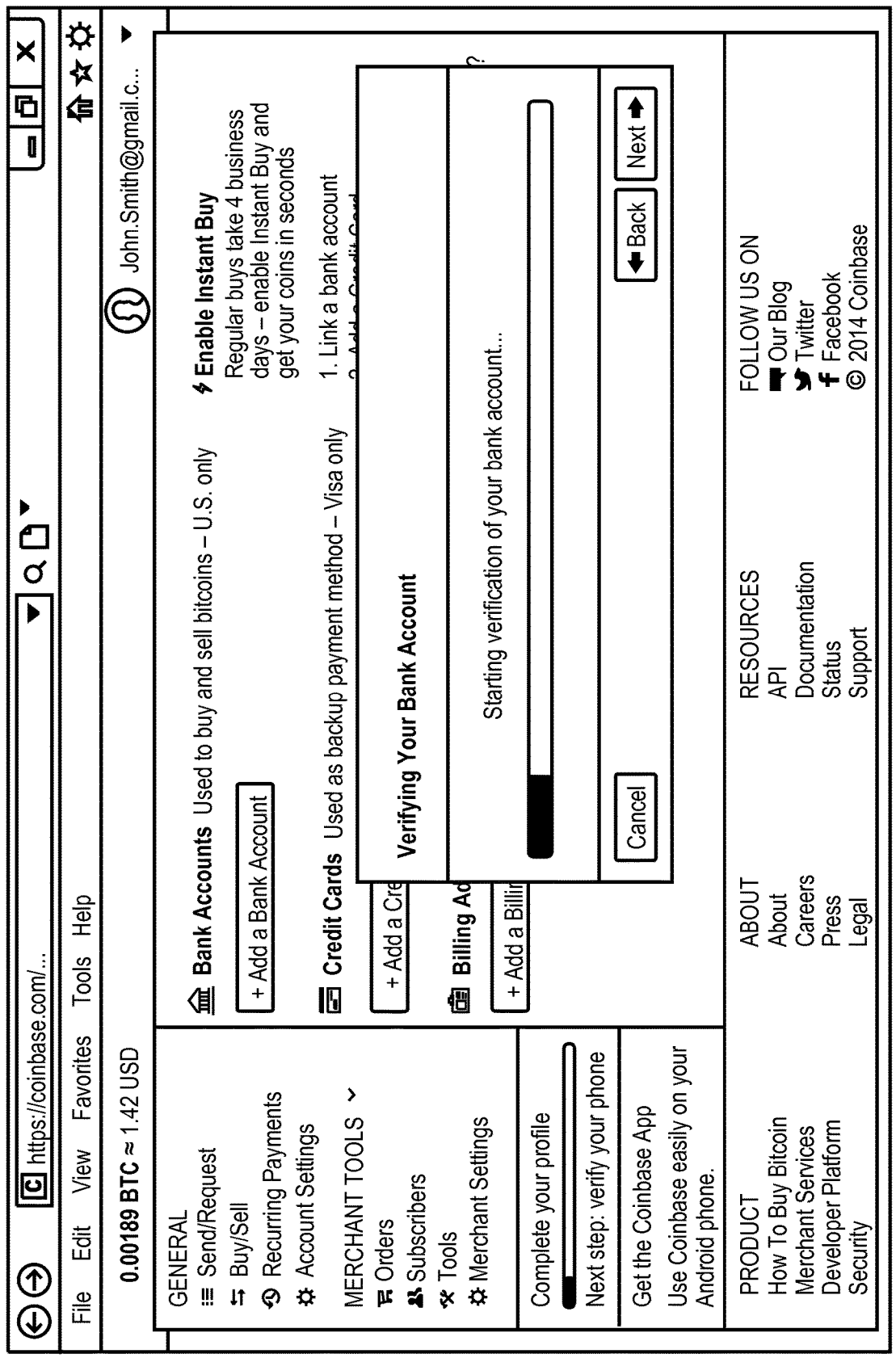
Figure 16:
Figure 17:
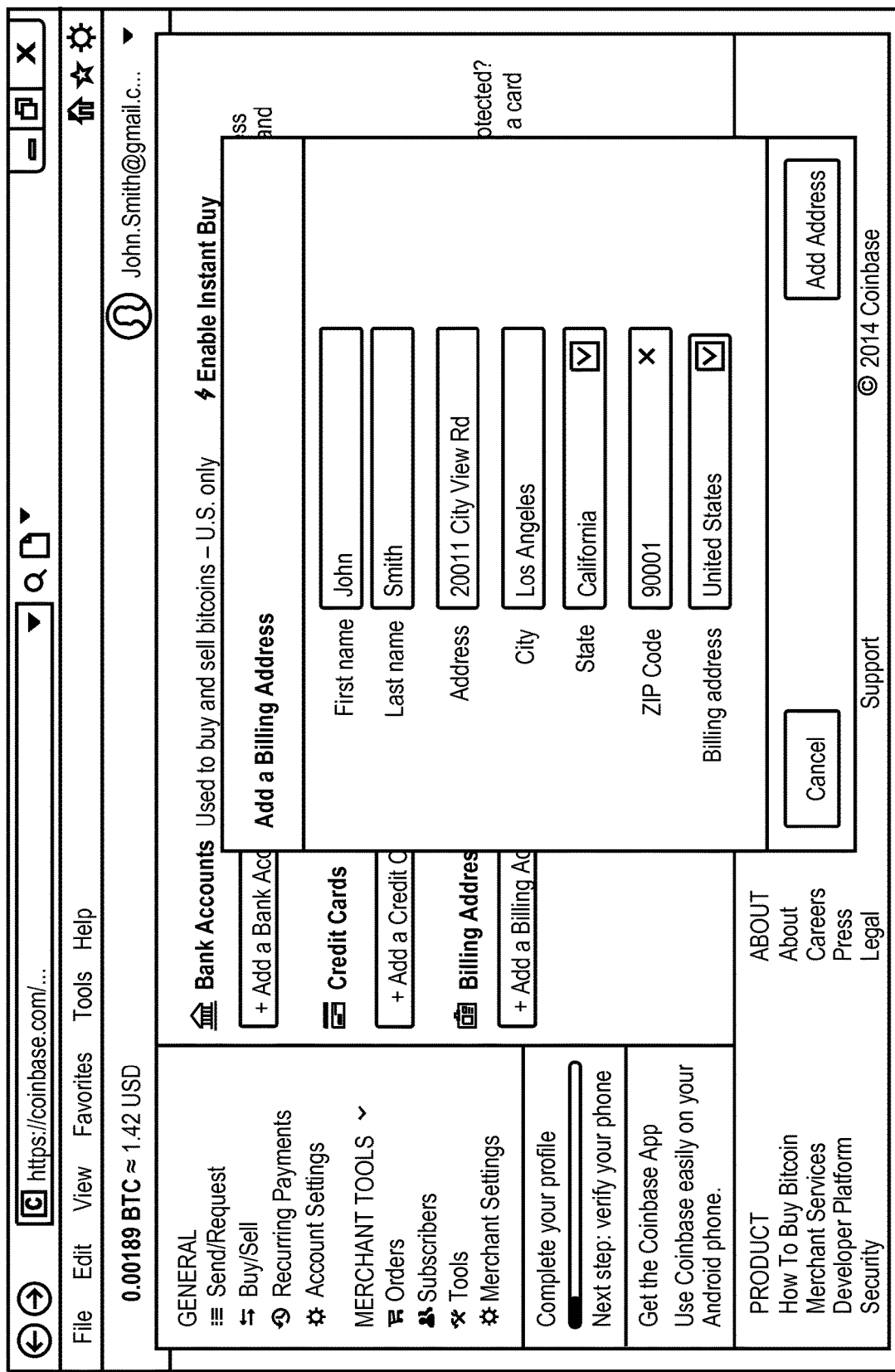
Figure 18:
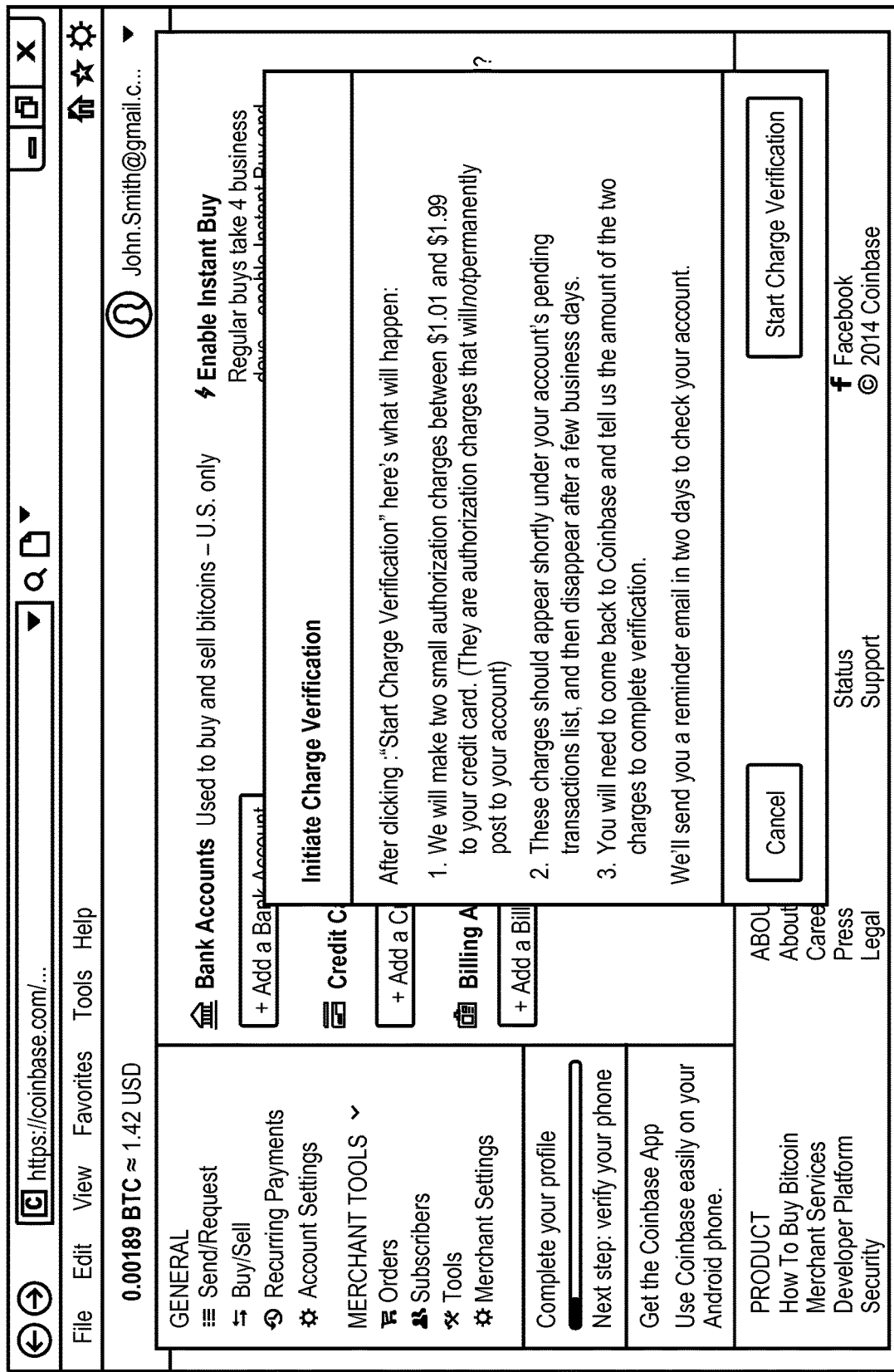
Figure 20:
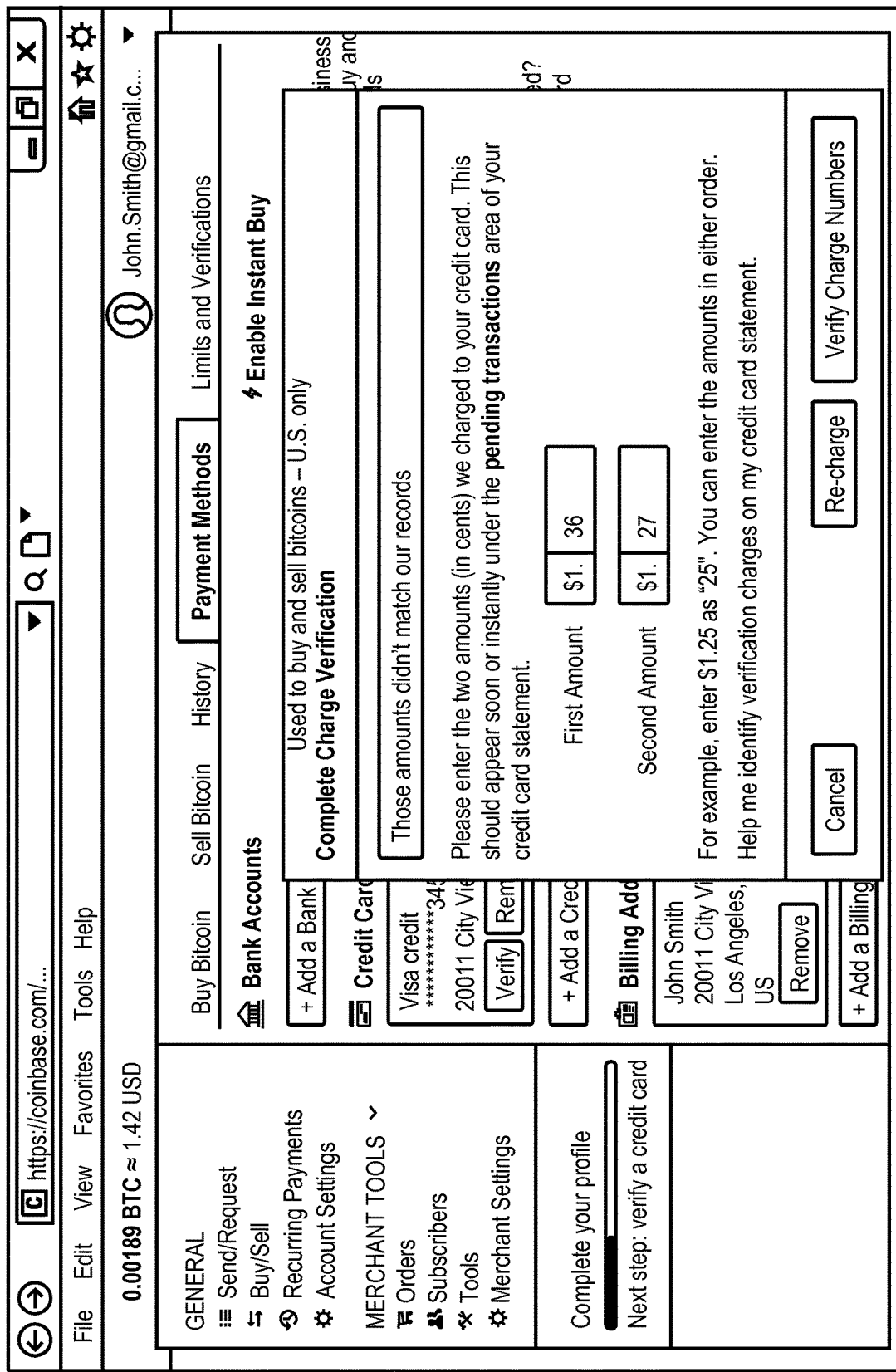
Figure 21:
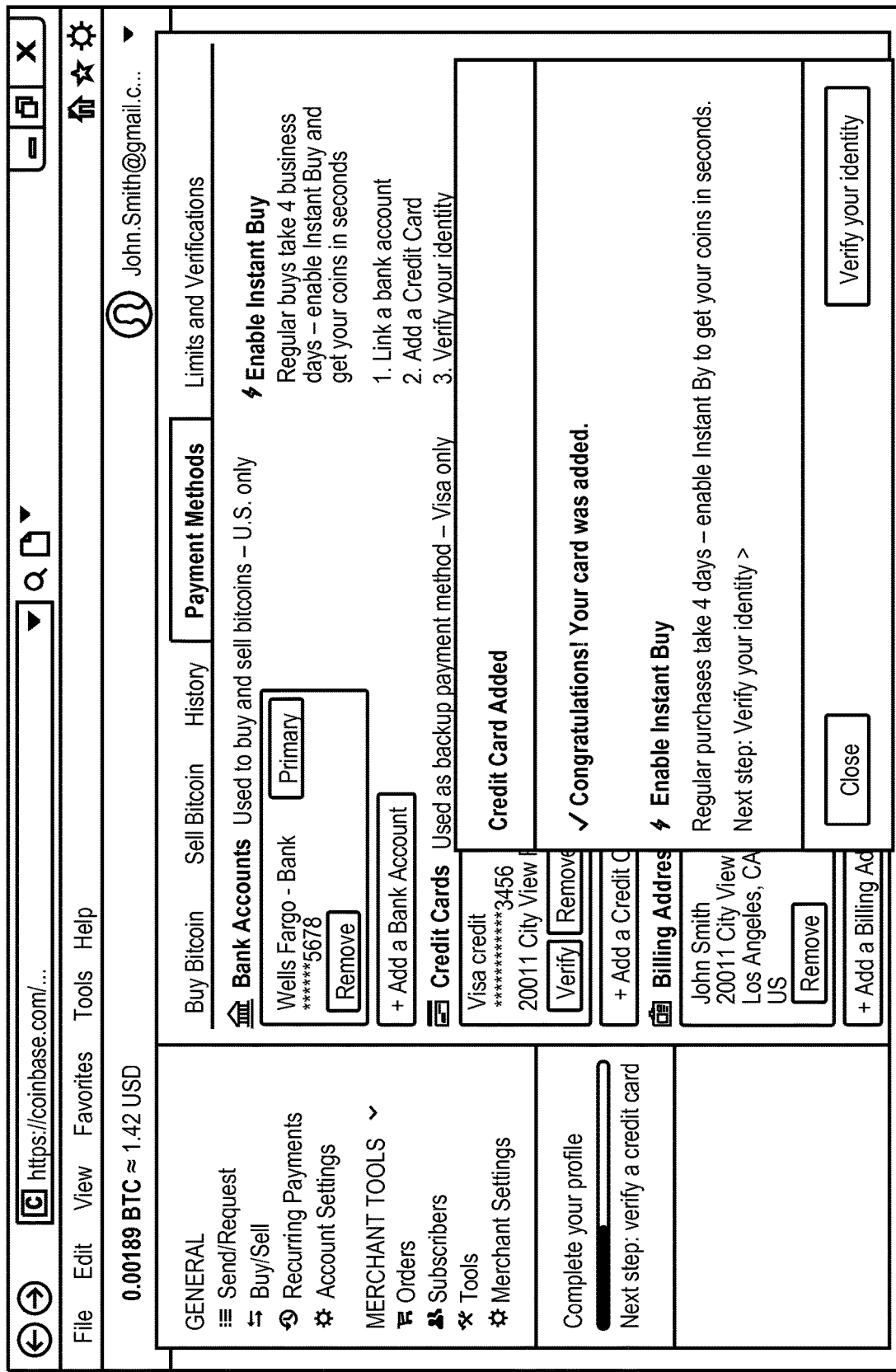
Figure 24:
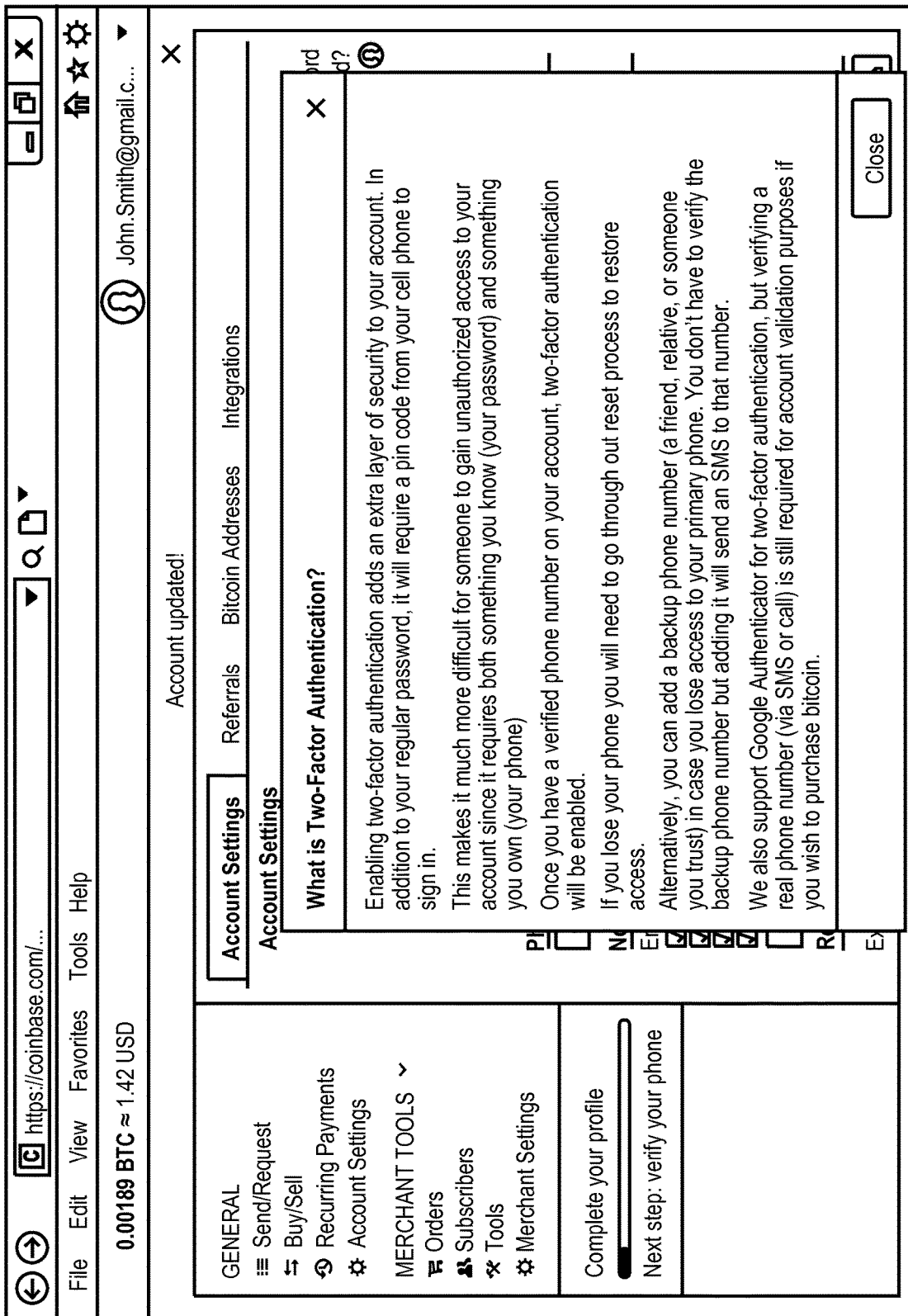
Figure 26:
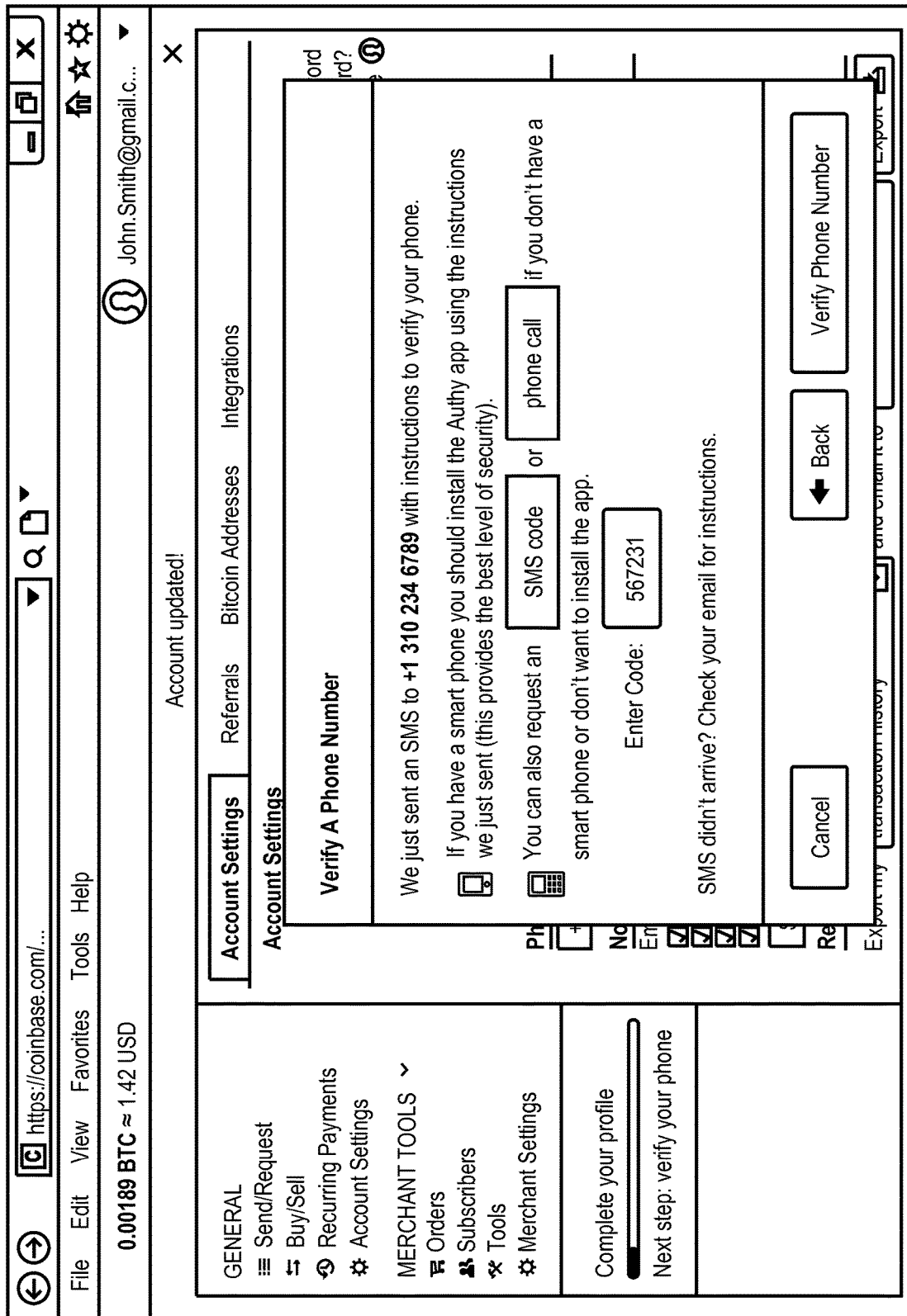
Figure 28:
Figure 30:
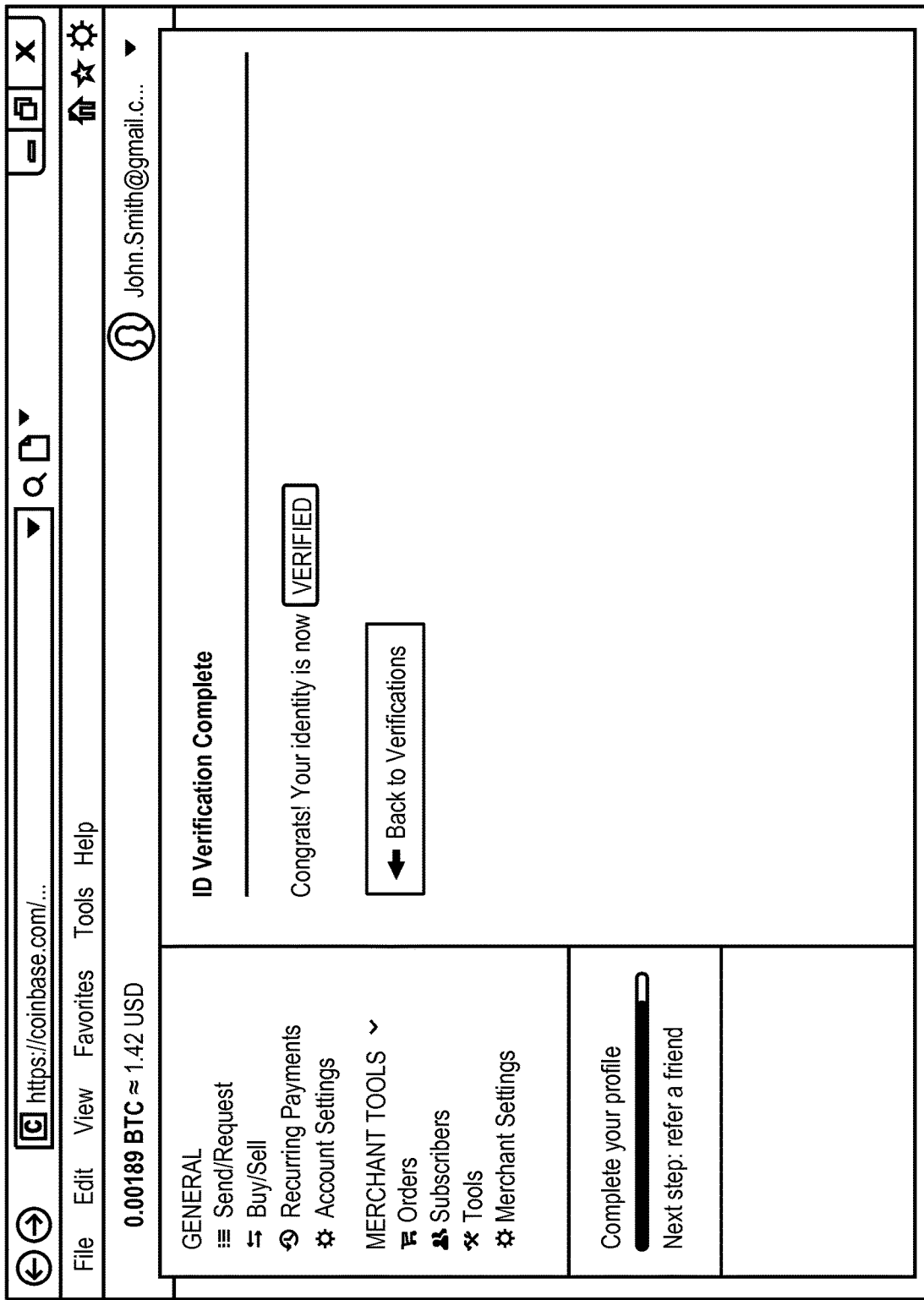

FIG. 6 shows a view that is displayed on the second user device 20 in FIG. 1B. The user is already logged into the wallet, as shown in the top right. The user can accept or decline an agreement. FIG. 7 displays the first page that is displayed to the user following acceptance of the agreement. The page shows the current balance corresponding to the amount of bitcoin at the Bitcoin address (Bitcoin address 4) in FIG. 3. The user can select various tools down the left margin, including sending or requesting bitcoin, buying or selling bitcoin, account settings and various merchant tools. FIG. 8 illustrates a view that is displayed to the user if the user selects the "Buy/Sell" link in FIG. 7. The user is prompted to add a bank account. FIGS. 9 through 15 step the user through the entry of bank account details and verification of the bank account. The user can also select a credit card as a backup payment. FIGS. 16 to 19 step the user through the entry of a credit card number and a billing address, and FIGS. 20 and 21 step the user through a verification process to verify that the user is in control of the credit card account. FIGS. 22 and 23 request additional information from the user. FIG. 23 also allows the user to verify a phone at a phone number and FIGS. 24 through 27 step the user through a process for verifying their phone and phone number. FIGS. 28 through 30 illustrate a process for verifying an identity of the user of the second user device 20. As illustrated in FIGS. 31 to 33, the top margin within the account settings allow for additional tools such as referrals (FIG. 31), viewing of Bitcoin addresses (FIG. 32), and integration with an application programmable interface (FIG. 33).

Figure 34:
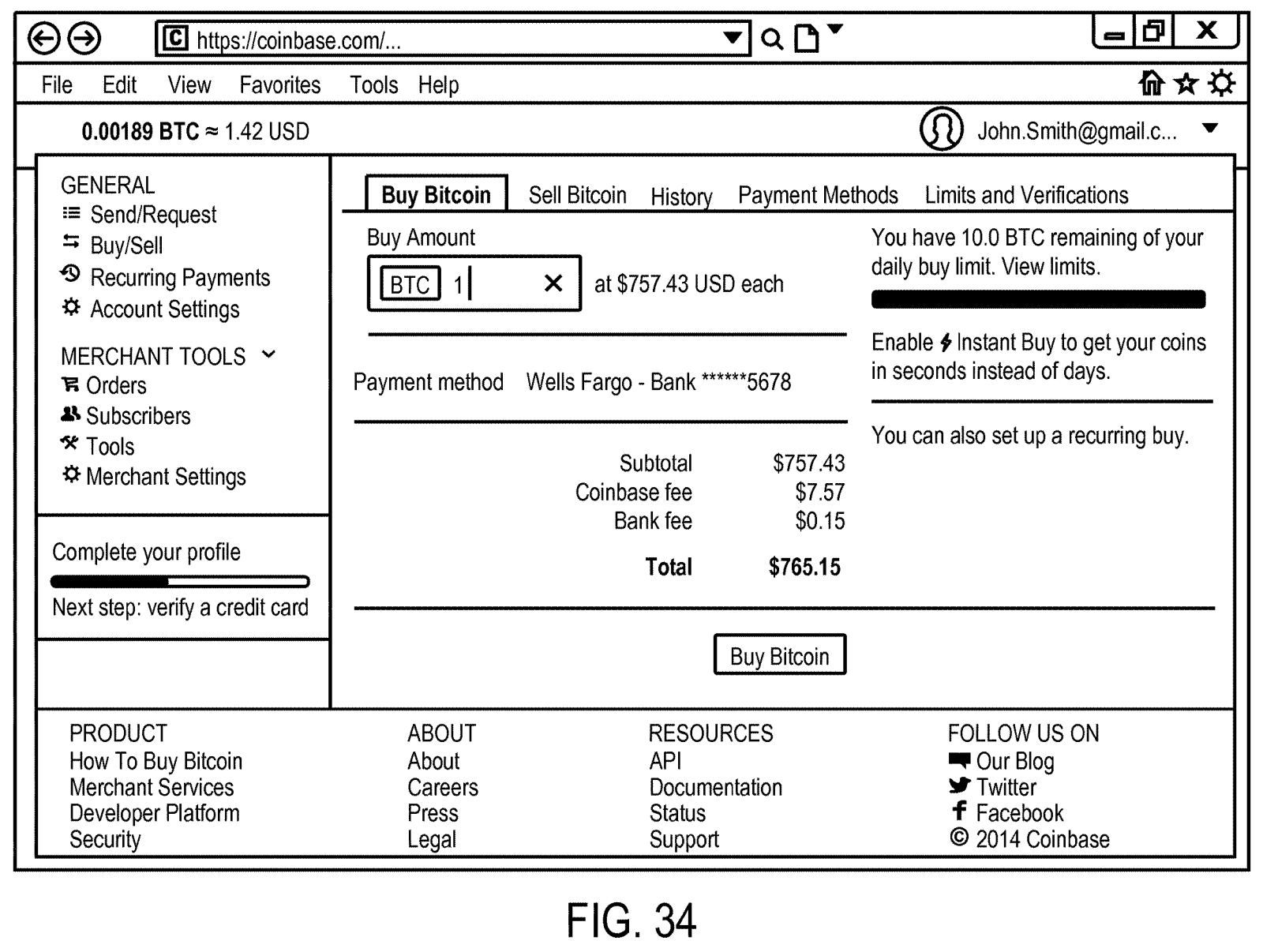
Figure 35:
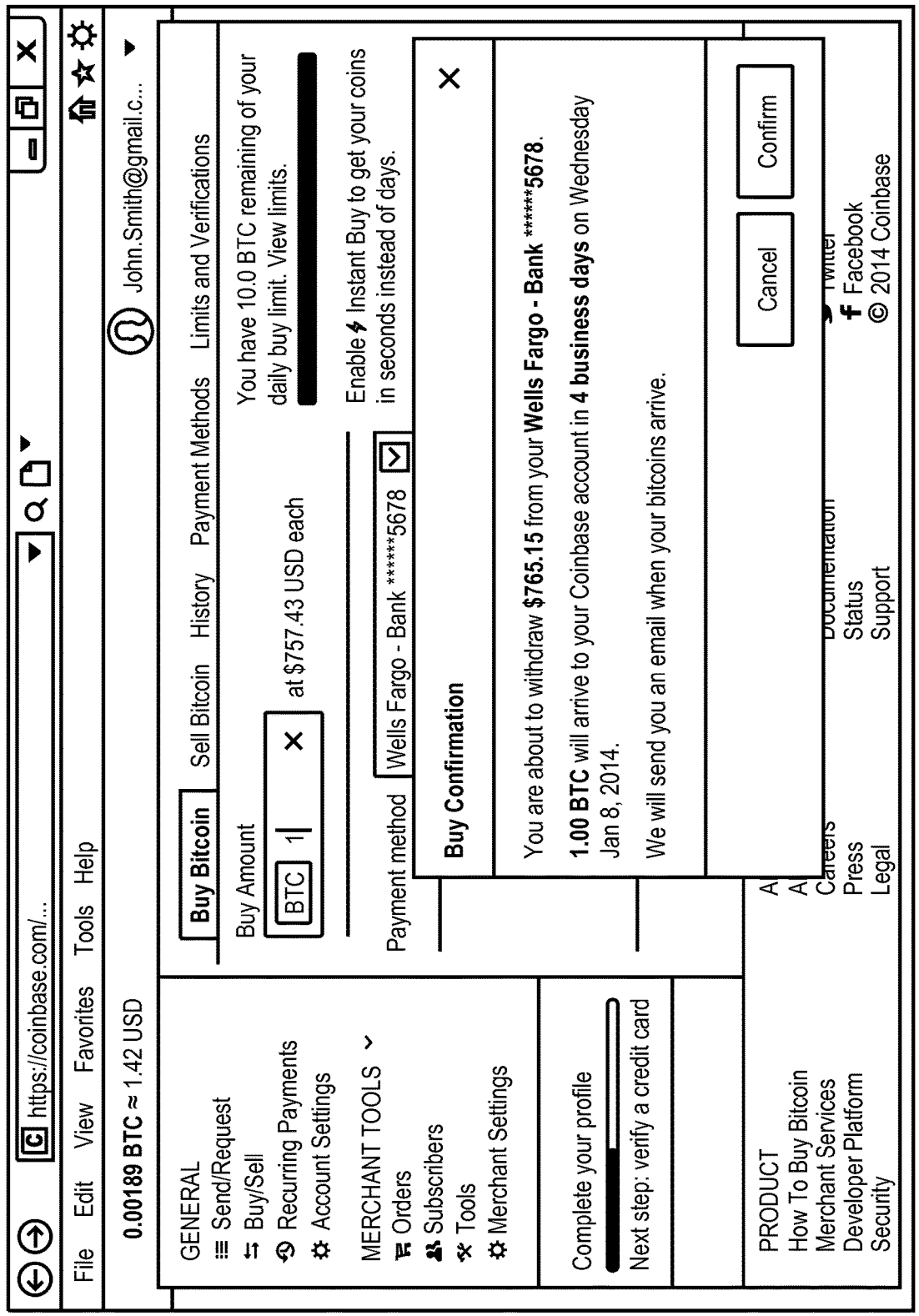
Figure 36:
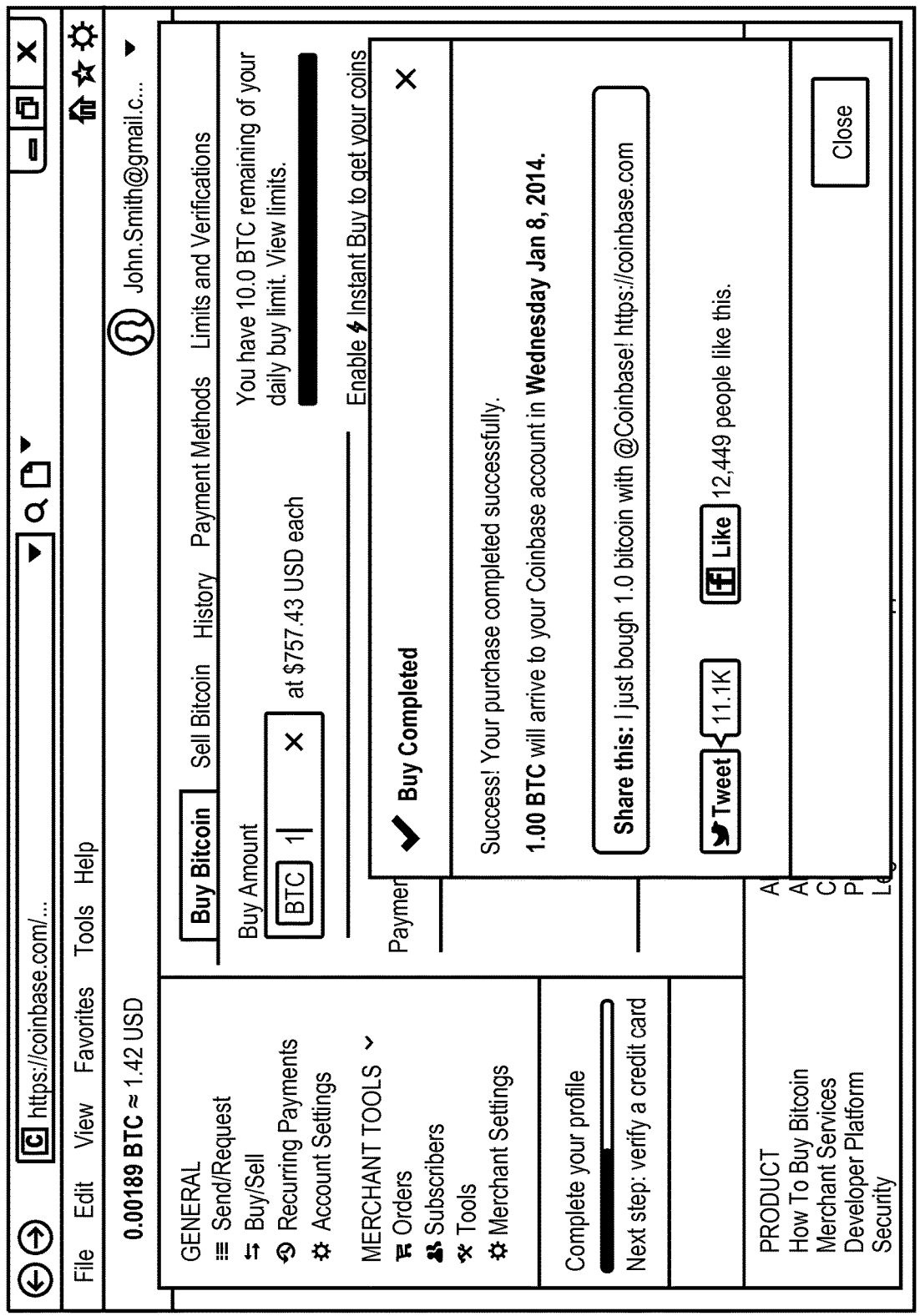
Figure 37:
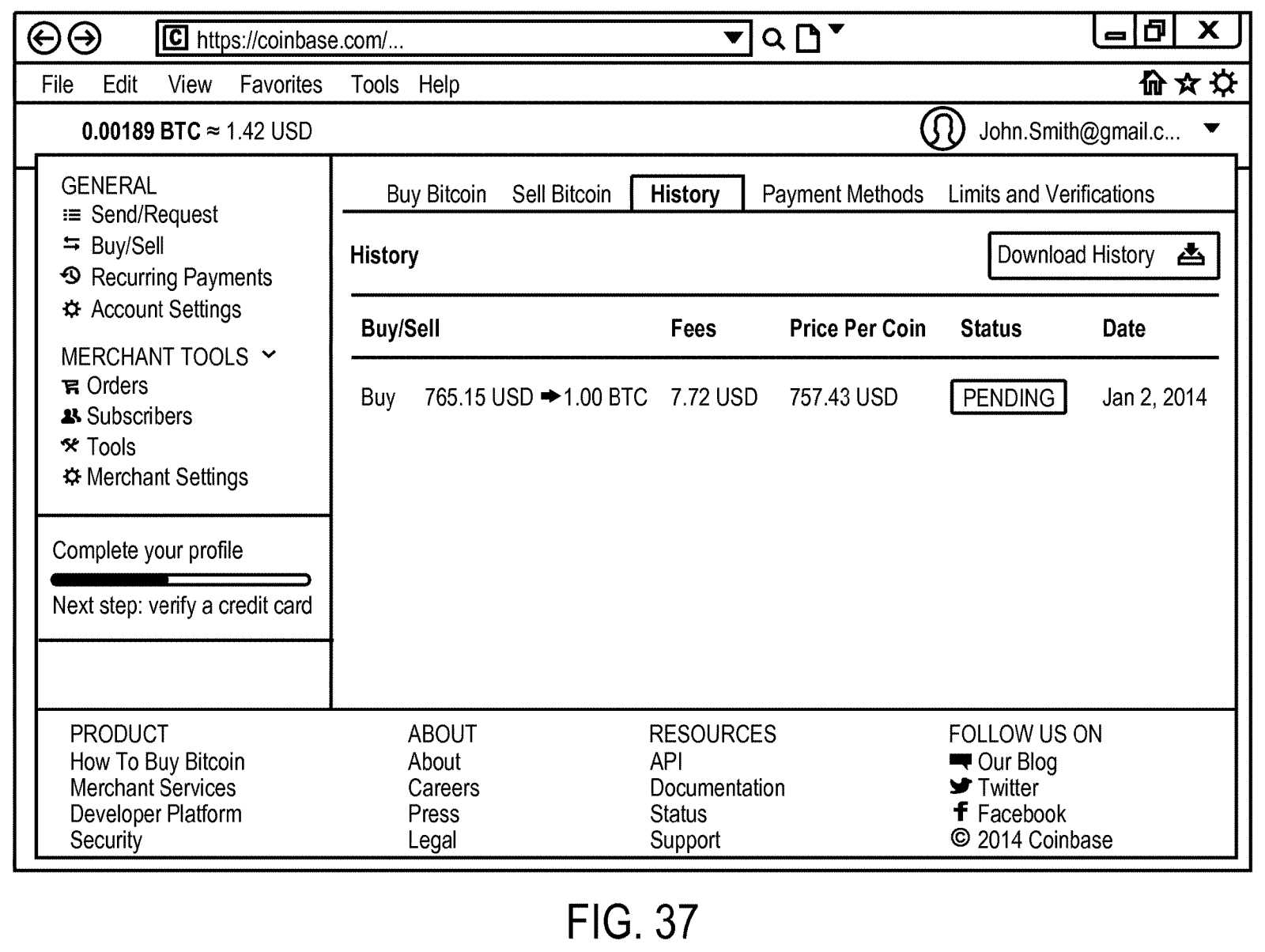

FIG. 34 illustrates a process that is initiated by the user to purchase bitcoin from a wallet of the first host computer system 14. In the present example, the user selects one (1) bitcoin (BTC) to purchase. FIGS. 35 and 36 step the user through the process of purchasing the bitcoin. Once the bitcoin is purchased, the user can select on "History" tab in the top margin to display a view as shown in FIG. 37 wherein the transaction is displayed and is marked as "PENDING".

Figure 38:
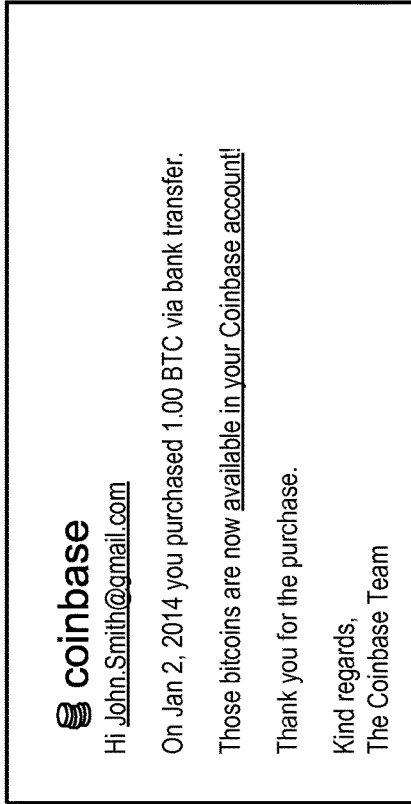
FIG. 38 is an email that is received by the second user device to confirm the purchase of the bitcoin from the first host computer system.

FIG. 38 shows an email that is transmitted by the hosted email module 46 in FIG. 1B to the second user device 20 to confirm the purchase of the bitcoin following selection of a "Confirm" button in FIG. 35. The email also has a link that, when selected by the user, opens the browser on the second user device 20 and allows the user to login to their wallet and view the transaction.

Figure 39:
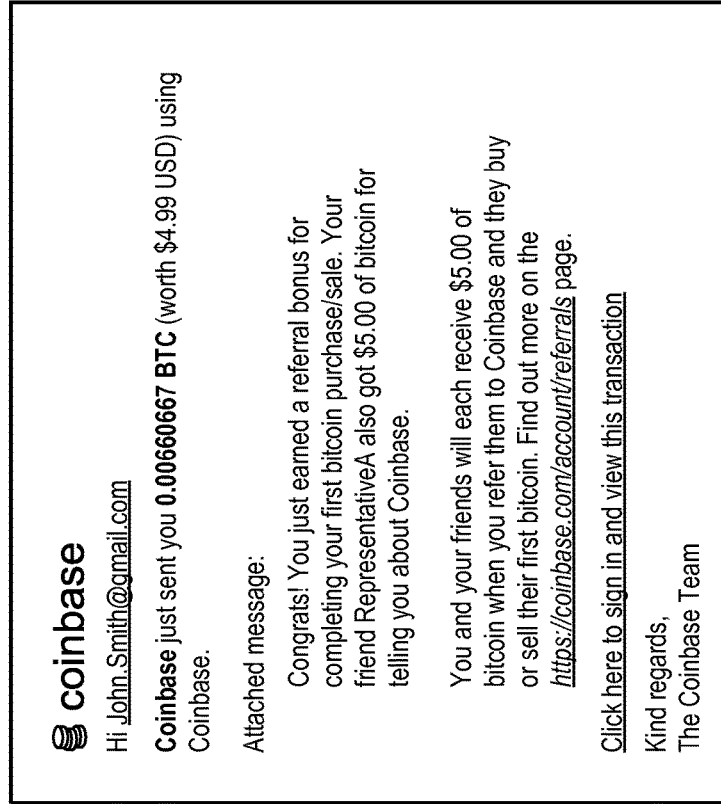
FIG. 39 is an email that is received by the second user device with a notification that bitcoin has been added to their wallet as part of a referral bonus system.

FIG. 39 shows an email that is transmitted by the hosted email module 46 in FIG. 1B to the second user device 20 with a notification that bitcoin has been added to their wallet as part of a referral bonus system.

Figure 40:
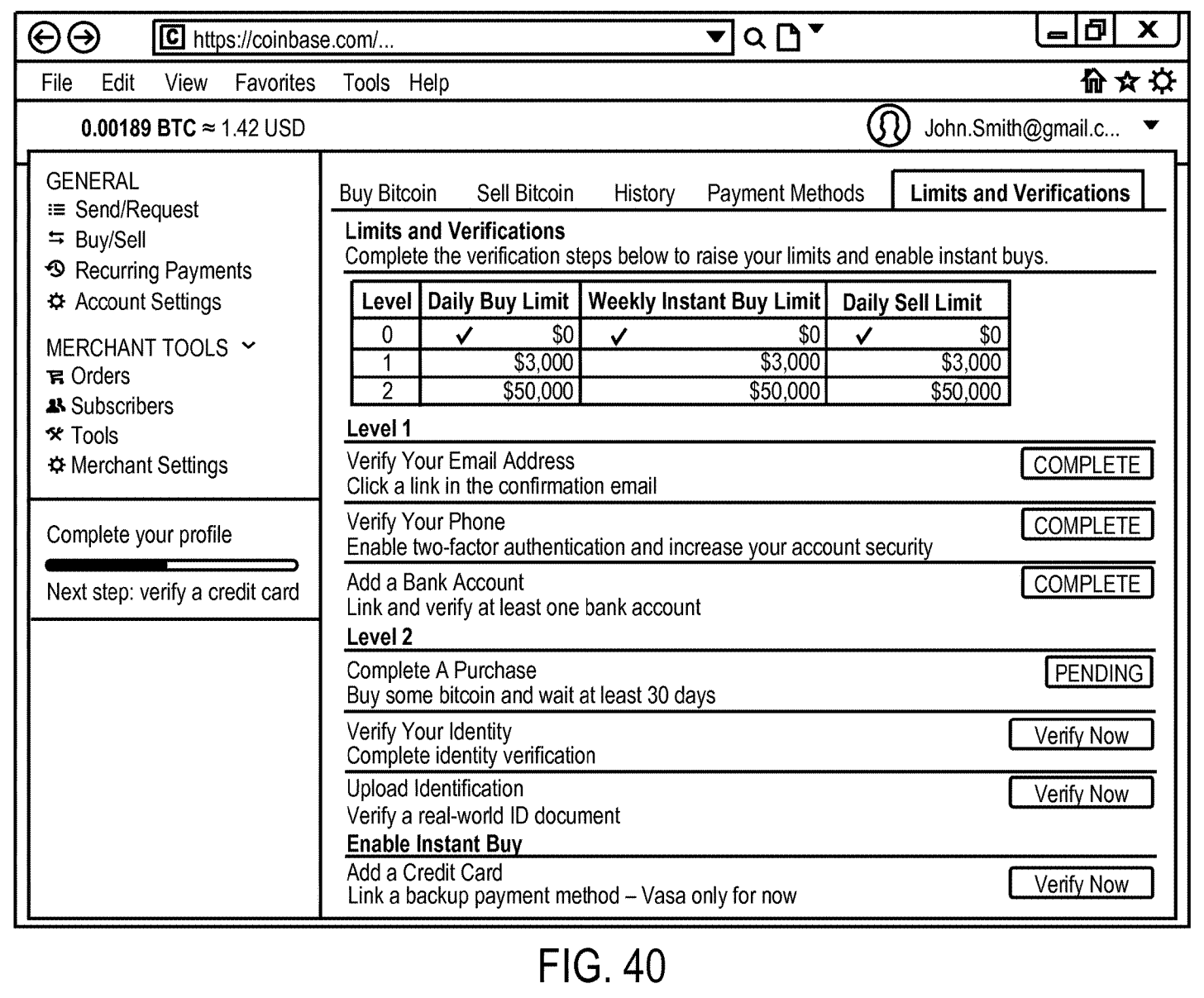

FIG. 40 illustrates a view that is displayed when the user selects a "Limits and Verifications" tab in the top margin of the "Buy/Sell" page.

When the user selects the "Send/Request" link in the left margin in FIG. 40, the user is provided an option to send bitcoin from their wallet (Wallet B) in FIG. 3 to another wallet (e.g. the first wallet (Wallet A)) in FIG. 3.

FIG. 41 illustrates further transfers or purchases (Transfer 4; Transfer 5; Transfer 6). The fourth transfer (Transfer 4) represents the purchase of bitcoin from the first host computer system's 14 master wallet.

The fifth transfer (Transfer 5) represents the transfer of bitcoin from the second wallet (Wallet B) to the first wallet (Wallet A). The second wallet (Wallet B) now has login details stored therein. If the second user device 20 in FIG. 1B has been logged out of the second wallet (Wallet B), then the second user device 20 is first directed to the login module 38 which receives login details for the second wallet (Wallet B) from the second user device 20, verifies whether the login credentials for the second wallet (Wallet B) match the login details for the second wallet (Wallet B). If the login details match the login credentials, then the login module 38 logs the second user device 20 into the second wallet (Wallet B).

The login module 38 then provides the second user device 20 with access to the hosted email module 46. The user of the second user device 20 then enters the email address (email address A) of the user of the first wallet (Wallet A) and an amount of bitcoin that the user of the second user device 20 wishes to transfer from the second wallet (Wallet B) to the first wallet (Wallet A). The user of the second user device 20 then uses the hosted email module 46 to send an email via the Internet 22 to the first user device 18. As soon as the email is sent, a transfer (Transfer 5) is recorded within the second wallet (Wallet B). Because one of the Bitcoin addresses (Bitcoin address 4) has funds associated therewith, it can be charged for the transfer (Transfer 4). Within the second wallet (Wallet B) the transfer (Transfer 4) has the email address (email address A) to which the email has been sent and the amount in bitcoin associated therewith.

As indicated, the miner's fee that is paid by the first host computer system 14 and the host fee that is charged for the transfer are zero bitcoin because the first wallet (Wallet A) is stored within the wallets 42 of the first host computer system 14. The user of the first user device 18 receives the email indicating the transfer of bitcoin to their wallet (Wallet A). A Bitcoin address (Bitcoin address 5) is recorded within the first wallet (Wallet A) for the transfer (Transfer 5) together with the identifier of the second wallet (Wallet B) from which the transfer has been made and the amount in bitcoin. The amount in bitcoin corresponding to the transfer (Transfer 4) in the second wallet (Wallet B) is the same as the amount in bitcoin as in the first wallet (Wallet A).

As illustrated by the next transfer (Transfer 6), the user of the second wallet (Wallet B) can opt to send bitcoin to a Bitcoin address of the first wallet (Wallet A). The transfer (Transfer 6) is the same as the preceding transfer (Transfer 5) in all other respects.

Figure 42:
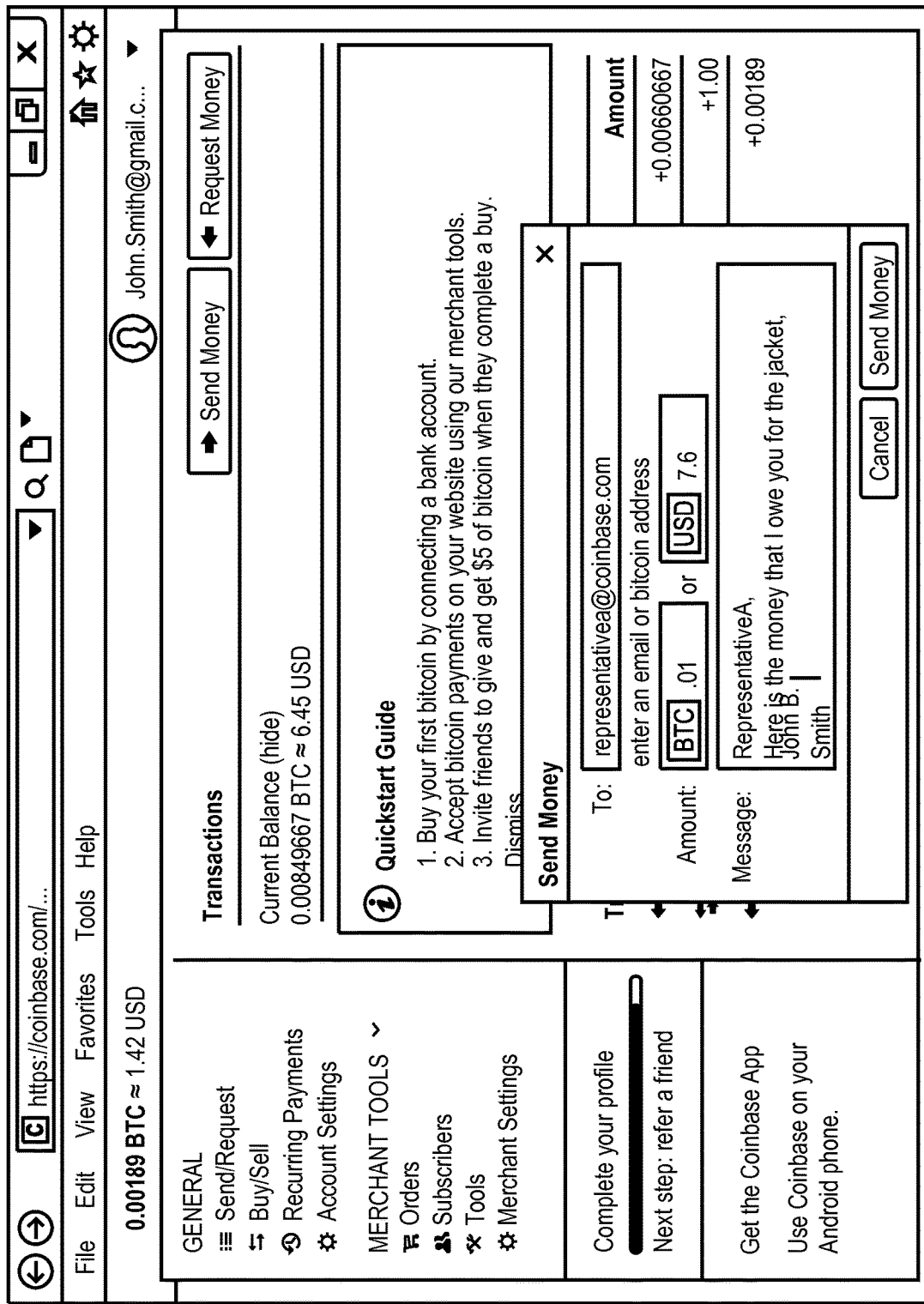

FIG. 42 shows a view that is displayed to the user of the second user device 20 in FIG. 1B in order to make the transfer from their wallet (Wallet B) to the first wallet (Wallet A). The view includes a field for the user to enter the email address (email address A) and fields for entering either an amount in bitcoin (BTC) or an amount in a local currency (USD-United States Dollar). The exchange rate between bitcoin and the local currency is shown in the top left corner. The view also includes a button "Send Money" which, when selected by the user, initiates the transfer of bitcoin.

Figure 43:
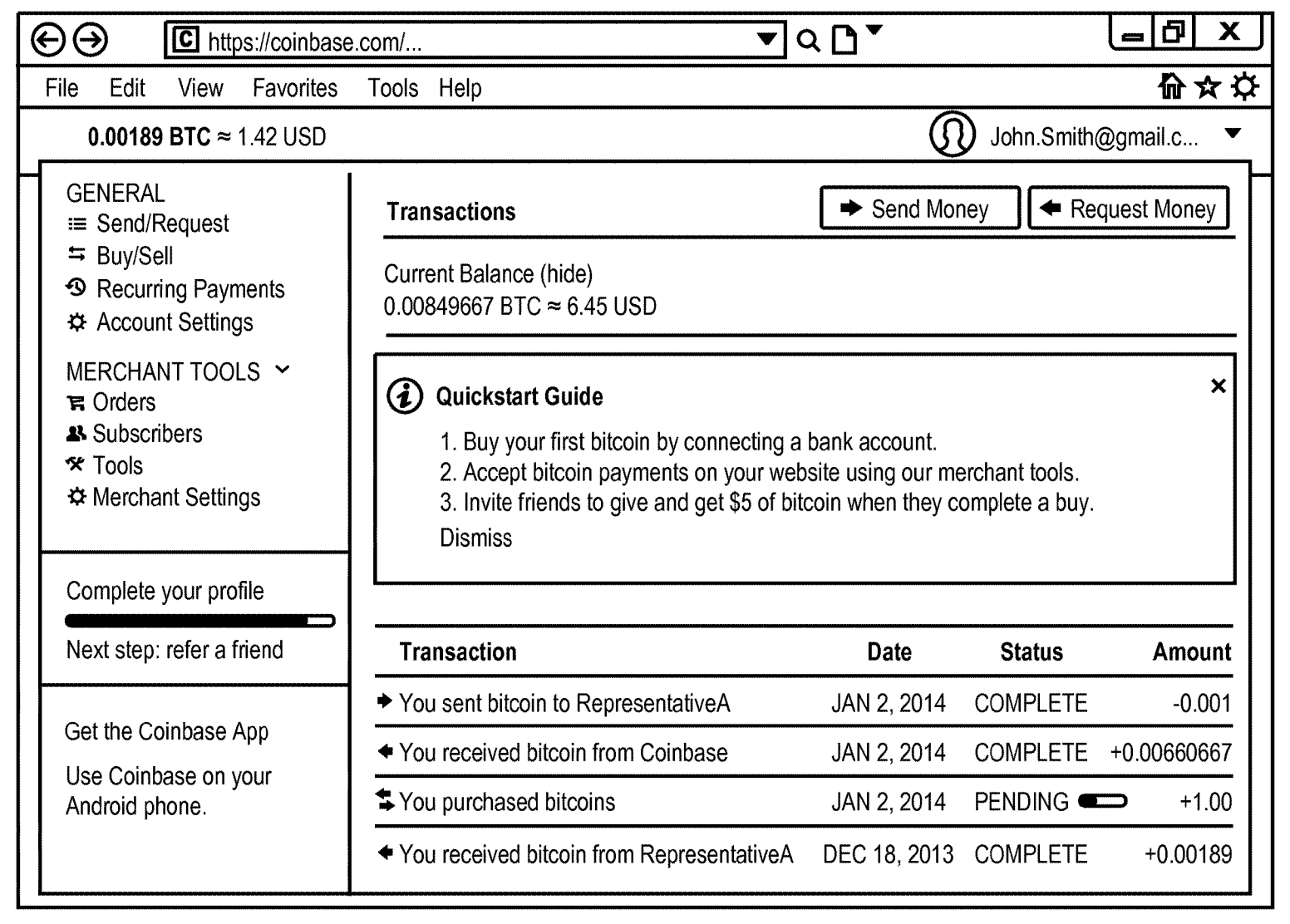
Figure 44:
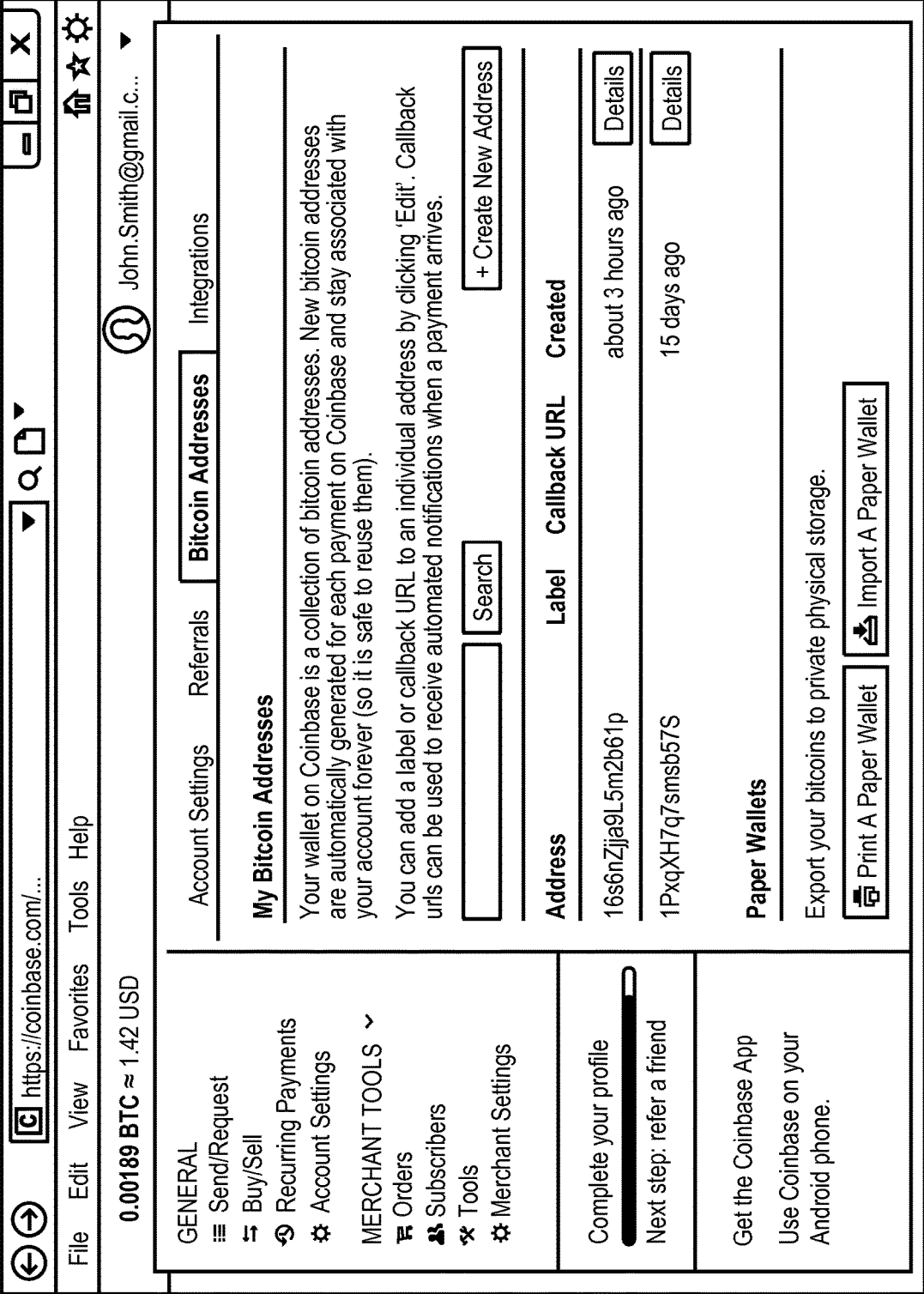
FIG. 44 is a view of the browser wherein the user interface displays Bitcoin addresses associated with transactions that have been completed.

FIG. 43 is a view that is displayed to the user indicating transactions that have been initiated or completed. The purchase of bitcoin discussed with reference to FIGS. 35 to 37 is shown as "PENDING". A block chain verification notice has to be broadcast by the miner computer system 28 and be received by the first host computer system 14 in FIG. 1A before a determination is made to change the marker "PENDING" to "COMPLETE". The other transactions representing transfers between the first and second wallets (Wallet A and Wallet B) in FIG. 41 are shown as completed because they do not need block chain verification outside of the first host computer system 14. No block chain verification notice is thus required for these transactions to be marked "COMPLETE". FIG. 44 shows a view that can be selected by the user by selecting a tab in the top margin wherein the user is shown the Bitcoin addresses associated with transactions that have been completed.

FIG. 45 illustrates a further transaction (Transfer 7) wherein bitcoin is transferred from the second wallet (Wallet B) to a third wallet (Wallet C) held by the second host computer system 16 in FIG. 1A. The user of the second user device 20 enters a bitcoin address (Bitcoin address 6) that is located in the third wallet (Wallet C) and an amount of bitcoin to be transferred to the third wallet (Wallet C). A transfer (Transfer 7) is recorded within the second wallet (Wallet B). Associated with the transfer (Transfer 7) are the Bitcoin address (Bitcoin address 6), the amount in bitcoin that is being transferred and a miner's fee that is charged for the transfer and has to be paid by the first host computer system 14 to the miner computer system 28 in FIG. 1A. No fee is charged by the first host computer system 14 for a transfer to another Bitcoin address.

When the user of the second user device 20 in FIG. 1A completes the purchase, a transfer instruction is created and is broadcast via the host node 30 to all remote nodes 32A-D within the Bitcoin network 12. The transfer instruction thus traverses the first node and the second remote node 32B to reach the second host computer system 16. The second host computer system 16 and all other computer systems connected to the remote nodes 32A-D record the transfer (Transfer 7) with respect to the Bitcoin addresses (Bitcoin address 4; Bitcoin address 6). The transfer (Transfer 7) has associated therewith the amount in bitcoin.

The transfer instruction that results in the transfer (Transfer 5) thus results in no miner's fee being charged to and paid by the first host computer system 14. No host fee is charged to the second wallet (Wallet B) because the transfer (Transfer 7) is made to another wallet (Wallet A) within the wallets 42 of the first host computer system 14. By contrast, the transfer instruction that results in the transfer (Transfer 7) representing the transfer to the Bitcoin address (Bitcoin address 6) in the third wallet (Wallet C) results in a miner's fee that is paid by the first host computer system 14 to the miner computer system 28. The miner computer system 28 is responsible for verifying transfers of bitcoin over the Bitcoin network 12. In the present scenario, the miner computer system 28 verifies the transfer of bitcoin from the second wallet (Wallet B) to the third wallet (Wallet C).

Another transfer may comprise that bitcoin is sent to one of the nodes, e.g. node 32C. The node 32C could be a fourth user device which is owned by the recipient of the bitcoin transfer having its own bitcoin address.

Figure 46:
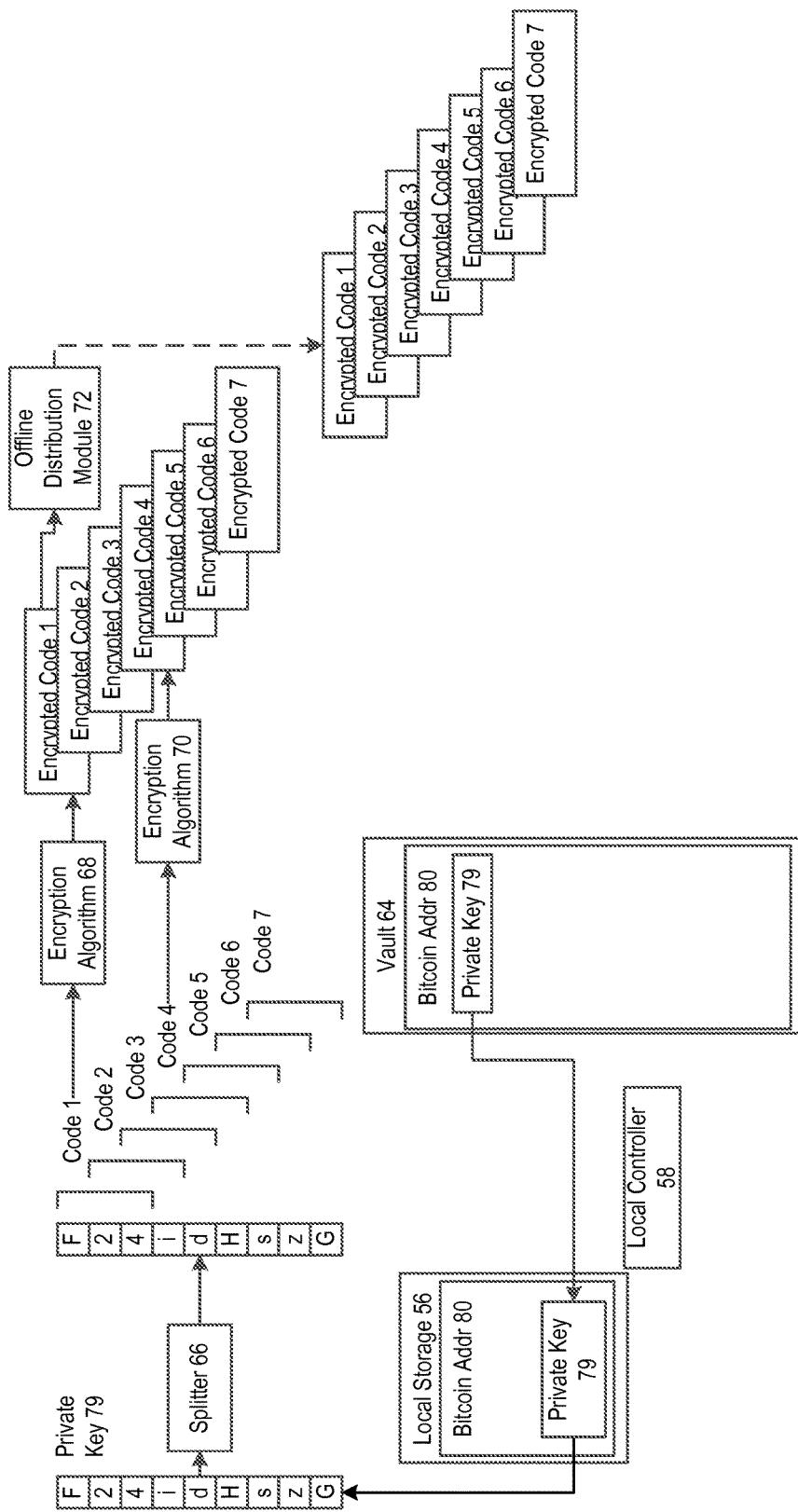
FIG. 46 is a block diagram illustrating splitting of a private key of a vault and offline distribution.

FIG. 46 illustrates components that are used for cold storage of value of bitcoin, including a local storage 56, a local controller 58, a vault 64, a splitter 66, one or more encryption algorithms 68 and 70 and an offline distribution module 72.

The vault 64 has a Bitcoin address 80 with a private key 79. The private key 79 is, for purposes of illustration, shown as a nine digit sequence of characters that are provided to the splitter 66. For purposes of illustration, the splitter 66 splits the nine digits of the private key 79 into seven overlapping codes (Codes 1 to 7). The encryption algorithm 68 encrypts the first code (Code 1) into an encrypted code (Encrypted Code 1). In a similar manner, the second code (Code 2) is encrypted by an encryption algorithm (not shown) into an encrypted code (Encrypted Code 2). Each one of the seven codes is encrypted into a separate encrypted code. A separate key may be used for each one of seven codes. Alternatively, a separate encryption algorithm may be used for each one of the seven codes.

Once all the codes have been encrypted, the offline distribution module 72 transmits each one of the encrypted codes (Encrypted Code 1 to 7) to a separate location. The locations are remote locations that are geographically separated from one another. The offline distribution module 72 may also be used to print one or more of the encrypted codes for paper delivery to respective remote locations.

Figure 47:
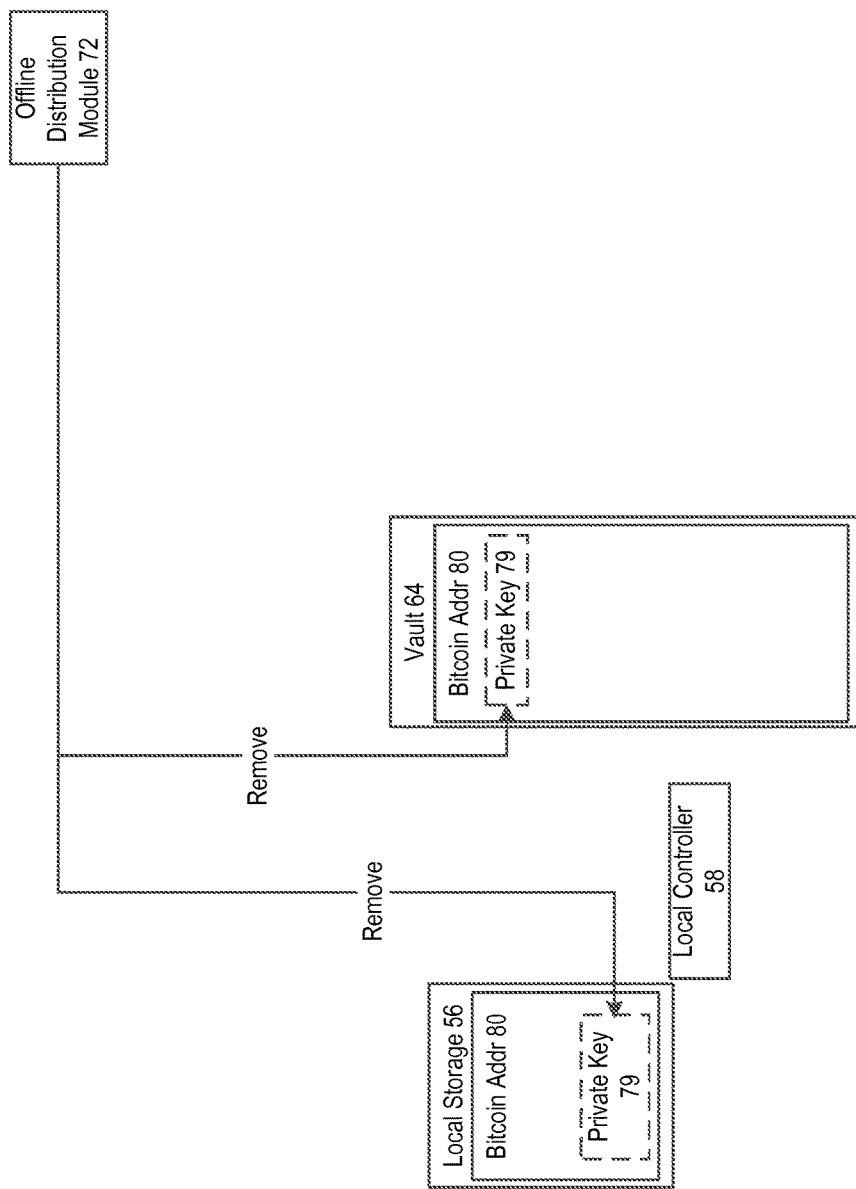
FIG. 47 is a block diagram illustrating removal of the private key of the vault.

FIG. 47 illustrates functioning of the offline distribution module 72 following distribution of the encrypted codes in FIG. 46. The offline distribution module 72 removes the private keys 79 of the Bitcoin address 80 of the vault 64. The offline distribution module 72 also removes the private key 79 of the Bitcoin address 80 within the local storage 56.

Figure 48:
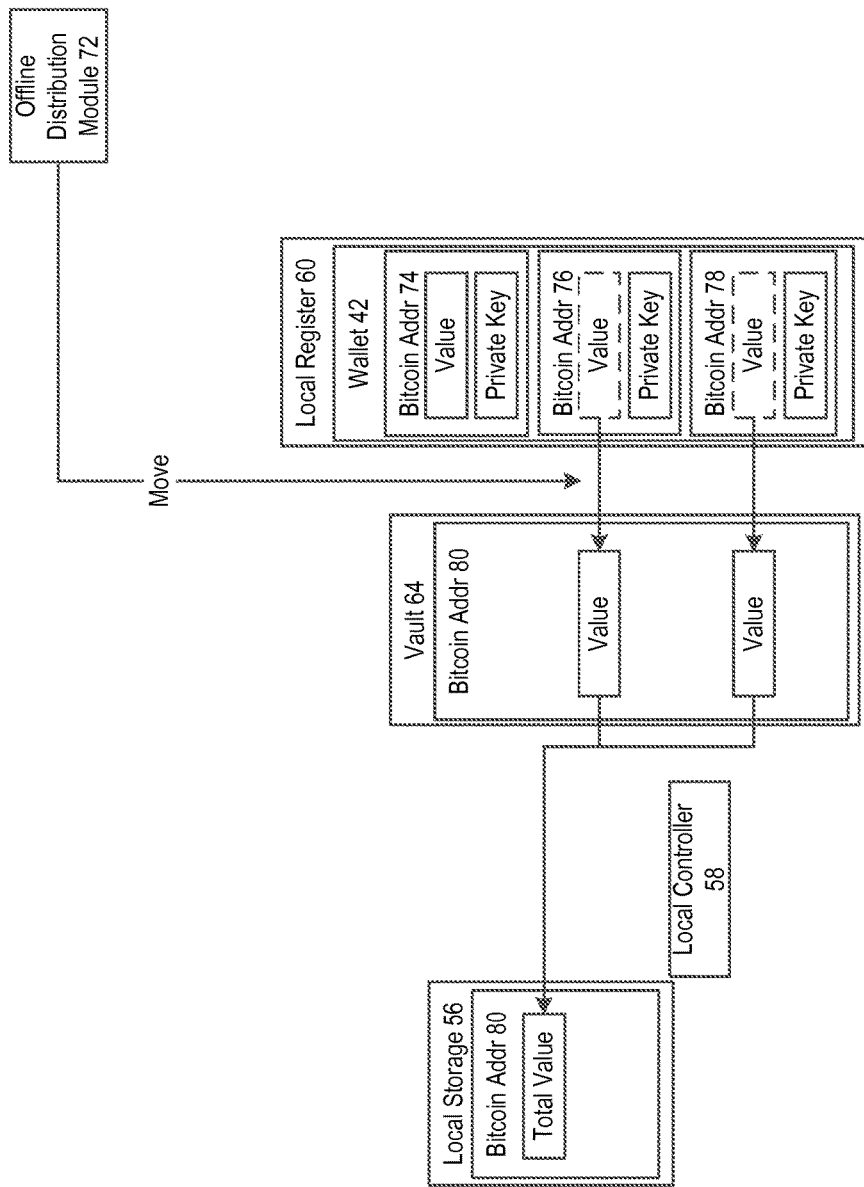
FIG. 48 is a block diagram illustrating offline or "cold" storage of values of Bitcoin addresses of a wallet in the vault.

As shown in FIG. 48, a local register 60 includes a plurality of wallets 42, one of which is shown. The wallet 42 has a plurality of Bitcoin addresses 74, 76 and 78 associated therewith. Each Bitcoin address 74, 76 and 78 has a respective value and a respective private key. The local controller 58 transfers the entire value of the Bitcoin addresses 76 and 78 into the vault 64. The value relating to the Bitcoin address 74 is not transferred into the vault 64. The local controller 58 calculates the total value of the Bitcoin addresses 76 and 78 that have been transferred into the vault 64 and records the total value in the local storage 56 in association with the Bitcoin address 80.

Figure 49:
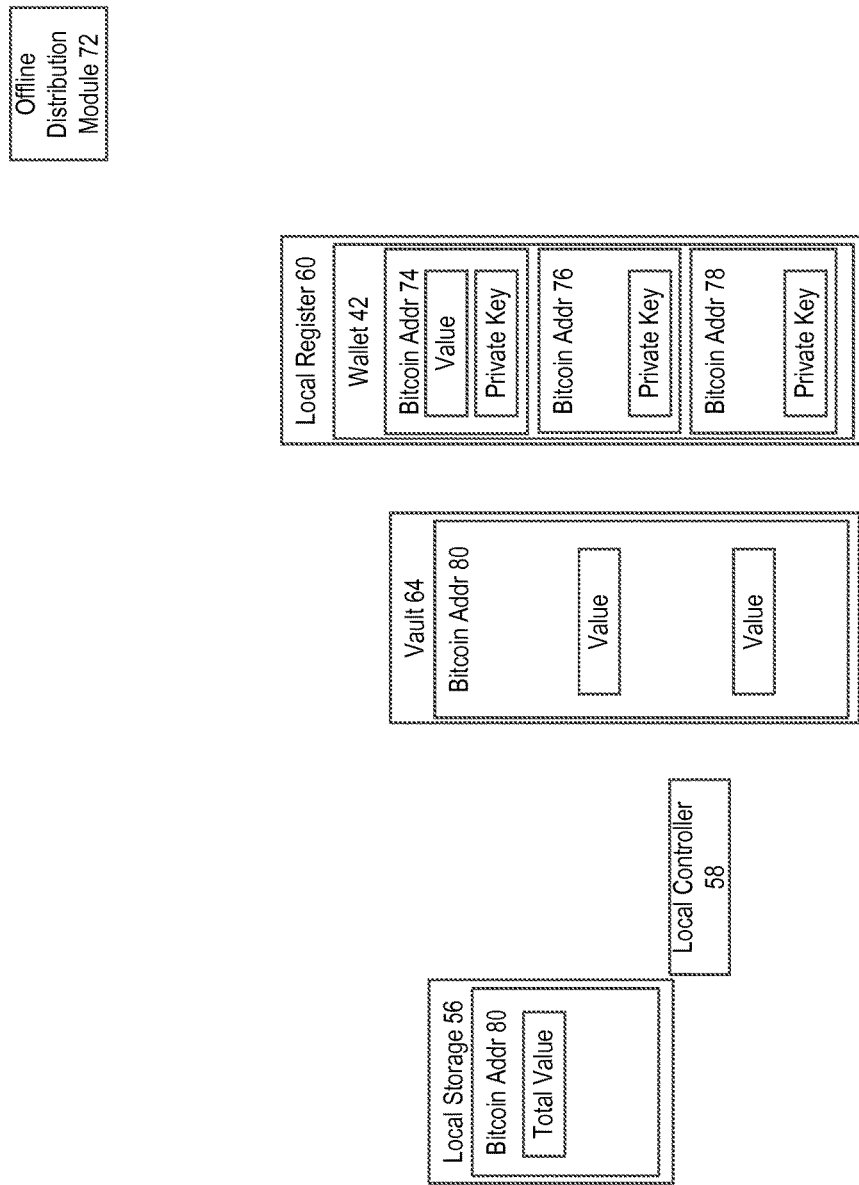
FIG. 49 is a block diagram illustrating isolation of the vault with its private key removed.

As shown in FIG. 49, following removal of the value of the Bitcoin addresses 76 and 78 within the wallet 42, the value of the Bitcoin addresses 76 and 78 are only held within the vault 64 and the local storage 56. The private key 79 is only held in a split and encrypted form at the distributed locations where the offline distribution module 72 in FIG. 46 has distributed them to. Unless access can be gained to the private key 79 that has now been split and distributed, it is not possible to access the value of the Bitcoin addresses 76 and 78. It is now possible for a user to which the wallet 42 is registered to use the Bitcoin address 74 for transacting with another user via the wallet management module 44 in FIG. 1B. The Bitcoin addresses 76 and 78 are not usable by the wallet management module 44 for purposes of transacting with another user at this time because their values, within the wallet 42, have been removed.

Figure 50:
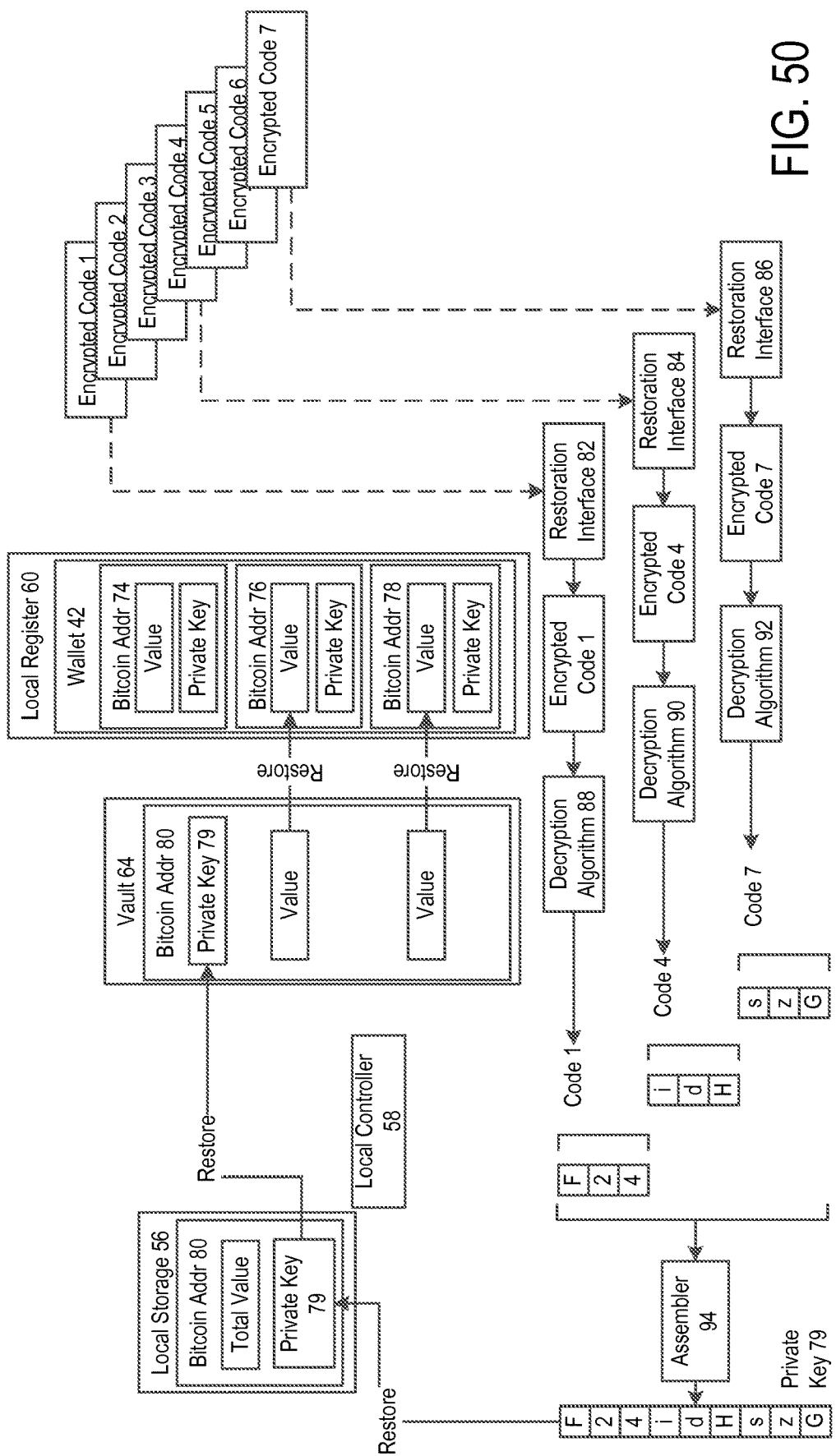
FIG. 50 is a block diagram illustrating how the private key of the vault and the value of the Bitcoin addresses are restored.

FIG. 50 shows how the private keys of the vault 64 and the Bitcoin addresses 76 and 78 that were removed in FIG. 46 are restored. Components that are provided for restoration include a plurality of restoration interfaces 82, 84 and 86, one or more decryption algorithms 88, 90 and 92 and an assembler 94. The holder of the first encrypted code (Encrypted Code 1) is called upon to enter the encrypted code into the restoration interface 82. The restoration interface 82 may for example be a web page with a field for entry of the first encrypted code. Alternatively, the restoration interface 82 may be an application programmable interface (API) and the first encrypted code can be entered into the API with or without human involvement.

In the given example, the second, third, fifth and sixth encrypted codes are not received at this time. The fourth and seventh encrypted codes are received through the restoration interfaces 84 and 86, similar to the first encrypted code.

The decryption algorithm 88 decrypts the first encrypted code (Encrypted Code 1) into the first code (Code 1). In the given example, the decryption algorithms 90 and 92 decrypt the fourth and seventh encrypted codes (Encrypted Code 4 and Encrypted Code 7) into the fourth and seventh codes (Code 4 and Code 7) respectively. In the given example, three codes are the minimum number of codes that are required in order to reassemble the private key 79. The minimum number of codes required for reassembly in FIG. 48 is thus less than the total number of codes into which the private key 79 has been split in FIG. 46. The assembler 94 assembles the private key 79 when the minimum number of codes has been received.

The private key 79 of the Bitcoin address 80 in the local storage 56 is used to access the vault 64. The local controller 58 then restores the private key 79 from the local storage into the vault for association with the Bitcoin address. The block chain will know whether the private key 79 that has been restored is the same private key 79 that was previously associated with the Bitcoin address. Only upon confirmation from the block chain will it be possible to transfer the value from the vault 64 to the local register 60.

The local controller 58 restores the respective value of the Bitcoin addresses 76 and 78 in the vault 64 to the Bitcoin addresses 76 and 78 in the wallet 42. Because the values have been restored to the Bitcoin addresses 76 and 78 in the wallet 42 they are usable for transacting with other users.

FIGS. 51*a* to 51*d* illustrate the use of a "hot" wallet in combination with "cold storage". As shown in FIG. 51*a*, the wallet 42 has the Bitcoin addresses 74, 76, 78 and a further Bitcoin address 98, each having a respective value associated therewith. The local storage 56 has first, second and third Bitcoin addresses 80A to 80C for first, second and third vaults 64A to 64C, respectively. The Bitcoin addresses 76 and 78 form a first transfer set that is selected for cold storage. The Bitcoin addresses 74 and 98 form a first transacting set. The values of the Bitcoin addresses 76 and 78 of the first transfer set are transferred into the first vault 64A, as represented by "Value" in the first vault 64A.

The private key of the Bitcoin address 80A of the first vault 64A is then transferred into the local storage 56 and is stored in association with the first Bitcoin address 80A. As hereinbefore described with reference to FIG. 46, the private key of the Bitcoin address 80A in the local storage 56 is then split and distributed. As hereinbefore described with reference to FIGS. 47 and 48, the private keys of the Bitcoin address 80 and the value of the Bitcoin address 76 and 78 are then removed. It is then not possible for a user of the wallet 42 to use the Bitcoin address 76 and 78 for transacting with another user. The user can still transact with another user using the Bitcoin addresses 74 and 98 of the first transacting set because their values are still associated with them within the wallet 42.

FIG. 51*b* shows the Bitcoin addresses 76 and 78 within the wallet 42 with their values removed and the Bitcoin address 80A within the local storage 56 with its private key removed. The private key of the Bitcoin address 80B of second vault 64B is transferred into the local storage 56 and associated with the second Bitcoin address 80B within the local storage 56. The private key of the second Bitcoin address 80B in the local storage 56 is split and distributed and then removed from the local storage 56. The Bitcoin address 98 is selected as part of a second transfer set of one or more Bitcoin addresses. The value of the Bitcoin address 98 is transferred from the wallet 42 into the second vault 64B, as represented by "Value" in the second vault 64B. The value of the Bitcoin address 98 within the wallet 42 is thus removed. The user of the wallet 42 can now not use the Bitcoin address 98 for purposes of transacting with another user because the value of the Bitcoin address 98 has been removed from the wallet 42. The Bitcoin address 74 forms part of a second transacting set that may include one or more Bitcoin addresses that can be used for transacting with another user.

FIG. 51*c* shows the Bitcoin address 98 having its value removed and the second Bitcoin address 80B within the local storage 56 having its private key removed. At this stage it may be desirable to restore the values of the Bitcoin addresses 76 and 78. The private key of the first Bitcoin address 80A within the local storage 56 is restored to the vault 64 as hereinbefore described with reference to FIG. 50. The respective values of the Bitcoin addresses 76 and 78 are then restored from the vault 64A to the Bitcoin addresses 76 and 78 in the wallet 42. Because the values of the Bitcoin addresses 76 and 78 are restored within the wallet 42, the Bitcoin addresses 76 and 78 of the first transfer set can, at least for the time being, be used together with the second transacting set for transacting with another user.

The same Bitcoin addresses 74, 76, 78 and 98 that are shown in FIG. 51a are also shown in FIGS. 51b and 51c. It should be understood that the Bitcoin addresses may change between the figures. The system allows for the value that was previously associated with one Bitcoin address to be restored to another Bitcoin address if necessary.

As shown in FIG. 51d, the first vault 64A is discarded after the value therein is restored. The first Bitcoin address 80A within the local storage 56 and the first vault 64A will never be used again.

The Bitcoin address 78 is selected as a third transfer set. The private key of the Bitcoin address 80C of the third vault 64C is transferred into the local storage 56 and stored in association with a third Bitcoin address 80C. The value of the Bitcoin address 78 is transferred from the wallet 42 to the third vault 64C. The user of the wallet 42 can now not use the Bitcoin address 78 for transacting with another user. The Bitcoin address 76 forms part of a third transacting set that could include one or more Bitcoin addresses. The Bitcoin address 76 can be used by the user of the wallet 42 for transacting with another user because the value of the Bitcoin address 76 is associated therewith within the wallet 42. The second and third transacting sets can thus be used by the user for transacting with another user. The second and third transfer sets are unusable for transacting with another user because their private keys have been removed.

Figure 52:
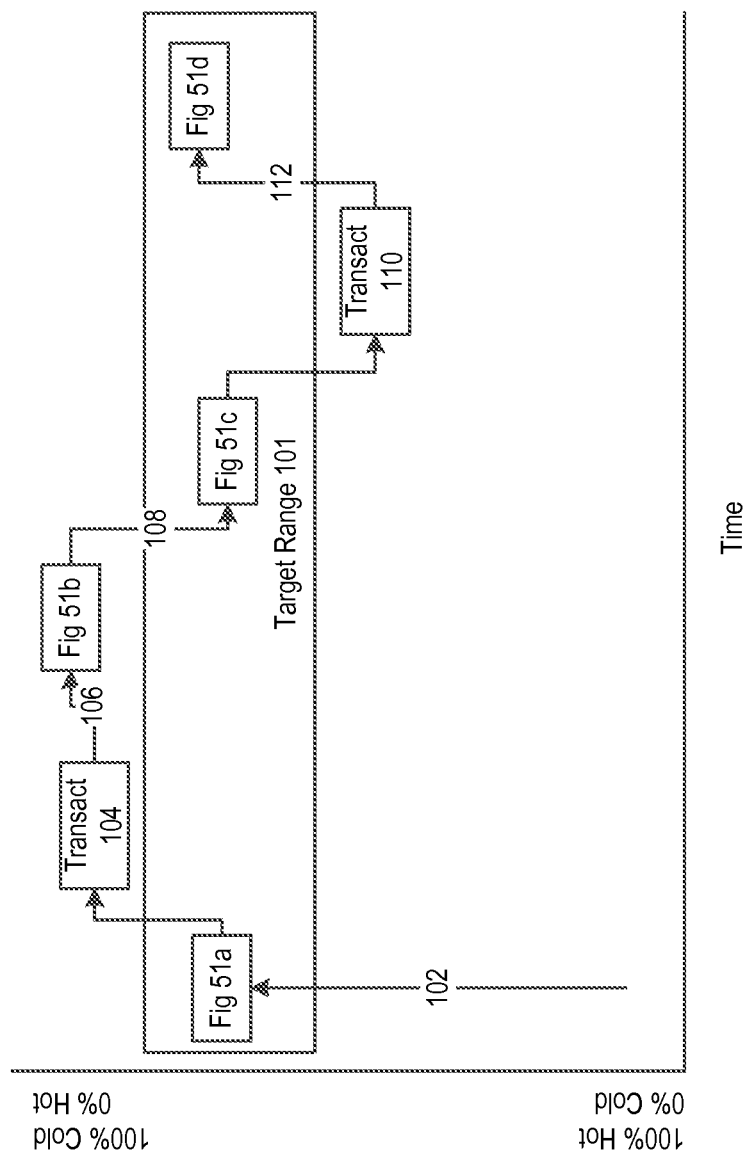
FIG. 52 is a graph illustrating how the wallet is maintained within a range so that only a portion of the wallet is "hot" in the sense that a user of the wallet can use the "hot" portion for transacting with another user.

FIG. 52 illustrates how the local controller 58 (see FIGS. 46 to 50) maintains transaction sets of a wallet 42 within a target range 100. Should all the Bitcoin addresses of the wallet 42 have values associated therewith, the wallet 42 is said to be 100% hot and 0% cold. If all the Bitcoin addresses in a wallet 42 have their values removed, the wallet 42 is to be 0% hot and 100% cold. The target range 101 for the total bitcoin value within the wallet may for example be 5% to 10% hot. At 102, the values of the first transacting set are transferred from the wallet 42 as described with reference to FIG. 51a. At 104, the user transacts with some of the Bitcoin addresses and the total value within the wallet 42 of the Bitcoin addresses that are hot is reduced. At 106, the values of the second transfer set are removed from the wallet 42 as described with reference to FIG. 51b. At 108, the values of the first transfer set are restored as described with reference to FIG. 51c. At 110, the user transacts and gains further Bitcoin addresses for additional value within their wallet 42. At 112, values of the third transfer set are transferred out of the wallet 42 as described with reference to FIG. 51d. It can thus be seen that the local controller 58 in FIG. 46 to 50 adjusts the total value of bitcoin that is not within the target range 101. The local controller 58 typically recalculates the hot/cold value ratio of each wallet on a daily basis and automatically adjusts the value to the target range 101.

Figure 53:
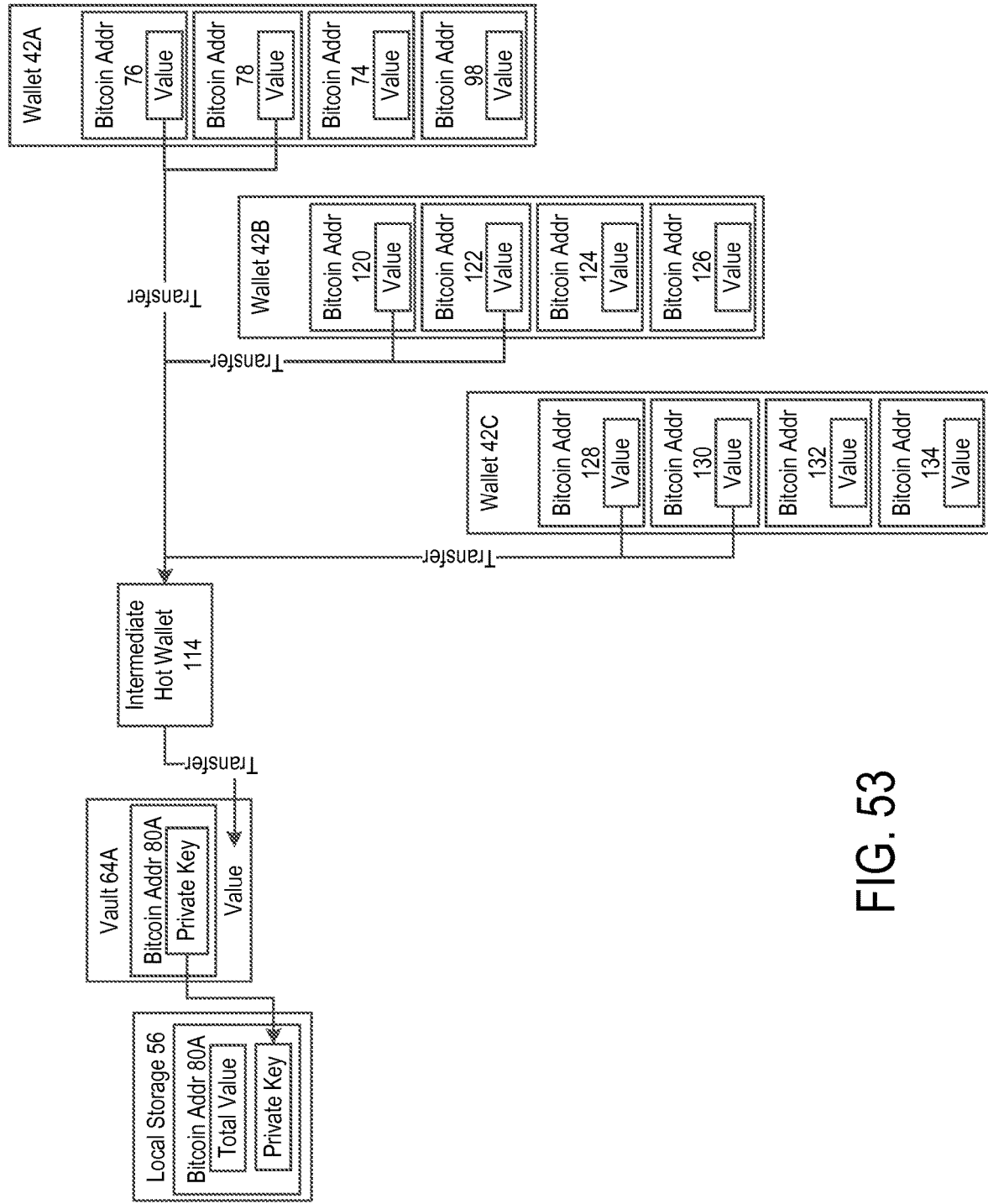
FIG. 53 is a block diagram that shows how an intermediate hot wallet is used to collect value from multiple wallets before transfer to a vault.

FIG. 53 illustrates the use of an intermediate hot wallet 114 that is used to collect bitcoin values from a plurality of wallets 42A to C. The wallet 42A is that same as the wallet 42 as described above. The wallet 42B has bitcoin addresses 120, 122, 124 and 126 associated therewith. The wallet 42C has bitcoin addresses 128, 130, 132 and 134 associated therewith. Each wallet 42A, B or C is held within the target range 101 in FIG. 50. The values of the bitcoin addresses 76, 78, 120, 122, 128 and 130 are identified for transfer to the vault 64A and are first transferred or "swept" to the intermediate hot wallet 114 from where they are transferred to the vault 64A.

Figure 54:
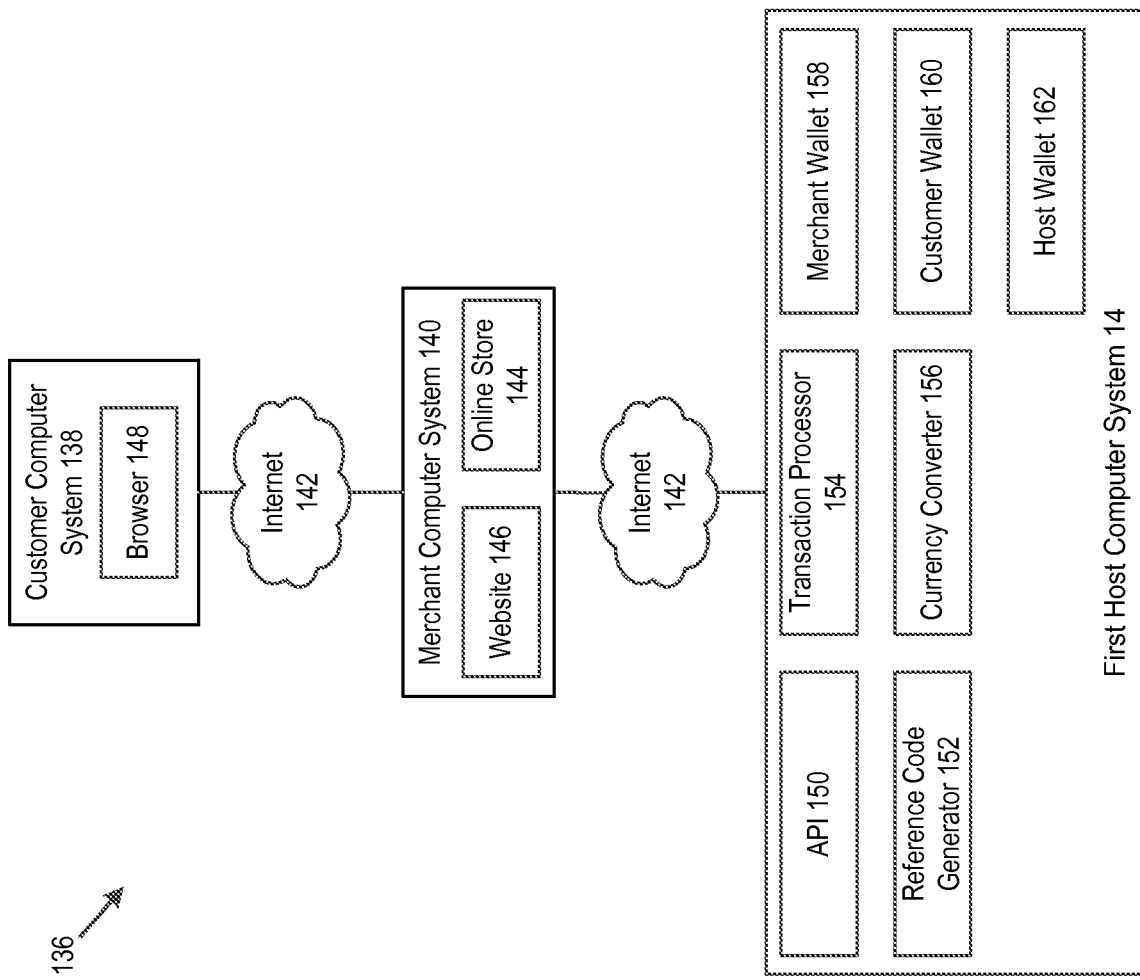
FIG. 54 is a block diagram of a network environment that includes a customer computer system and merchant computer system.

FIG. 54 illustrates a network environment 136 that, in addition to the first host computer system 14, includes a customer computer system 138 and a merchant computer system 140 that are connected to one another over the Internet 142. The merchant computer system 140 has an online store 144 and a website 146. The customer computer system 138 has a browser 148. A customer at the customer computer system 138 can use the browser 148 to access the website 136 over the Internet 142. The website 136 is then displayed on the browser 148. The website 136 allows for the customer to make purchase on the online store 144. The customer may, for example, purchase real goods, virtual goods or services from the online store 144.

The first host computer system 14 includes an application programmable interface (API) 150, a reference code generator 152, a transaction processor 154, a currency converter 156 and merchant, and customer and host wallets 158, 160 and 162. The wallets 158, 160 and 162 may be of the kind as hereinbefore described.

Figure 55:
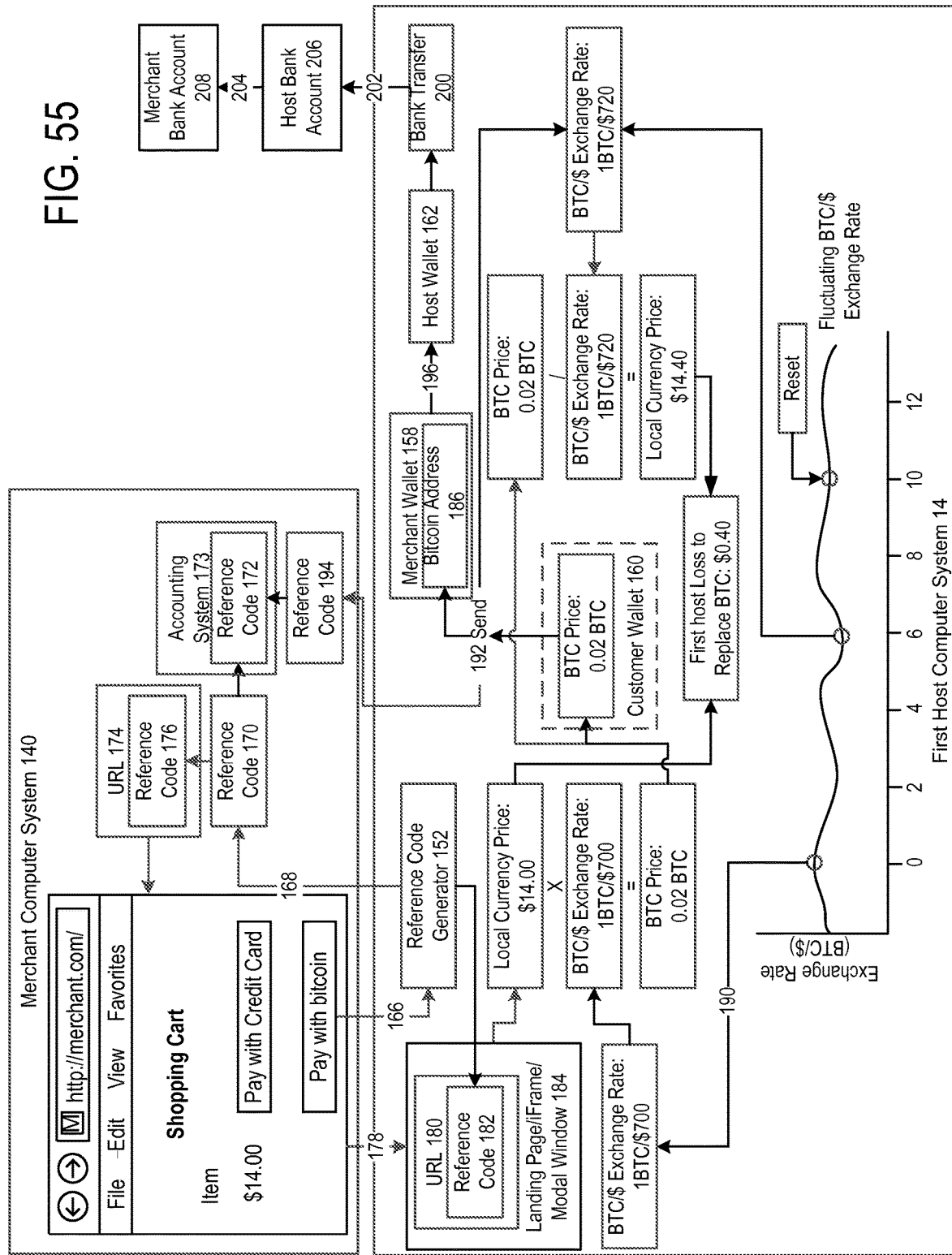
FIG. 55 is a block diagram illustrating functioning for purposes of locking an exchange rate in when processing a transaction made by the customer computer system on the merchant computer system in FIG. 54.

As shown in FIG. 55, the customer is shown a shopping cart with several payment options, including "Pay with Credit Card" and "Pay with bitcoin." Prior to being displayed the shopping cart, the customer has traveled through the shopping flow of the merchant computer system 140, has selected one or more items to be purchased and has selected a shopping or checkout cart, which causes the display of the view shown in FIG. 55. When the user selects the button "Pay with bitcoin" the merchant computer system 140, at 166, transmits an API call to the first host computer system 14. The API call includes a request for payment. The request for payment includes an amount in a currency, in the present example $14.00, an order name (usually a number), order descriptions (usually items in the checkout cart in a single line-item entry separated by commas), and a success uniform resource locator (URL) if desired (a page to which the customer is redirected at checkout if the order completes).

When the first host computer system 14 receives the API call at 166, the reference code generator 152 generates a unique reference code for the specific order. The reference code is thus uniquely generated for each API call. The first host computer system 14 then stores the reference code in its database. At 168, the first host computer system 14 responds to the API call received at 166 to transmit the reference code to the merchant computer system 140. The merchant computer system 140 then receives the reference code as reference code 170. The merchant computer system 140 stores the reference code as reference code 172 within its accounting system 173 and associates the reference code 172 with the particular order shown in the shopping cart. The merchant computer system 140 also creates a URL 174. The reference code 170 is used as a reference code 176 within the URL 174 when the URL 174 is created.

The first host computer system 14 creates a URL 180 that includes a reference code 182. The reference code 182 and the reference code 176 are the same.

The merchant computer system 140 at 178 redirects the browser 148 (FIG. 54) using the URL 174. The browser is then redirected to the URL 180 of the first host computer system 14.

The URL 180 may, for example, be the URL of a landing page, iFrame or modal window 184. The landing page, iFrame or modal window 184 presents checkout options to the customer, including to pay with the customer wallet 160 if one exists, to pay with bitcoin using an external account, or to create a wallet at the first host computer system 14 for purposes of completing the purchase. In a different embodiment, instead of being automatically redirected by the merchant computer system 140 to the first computer system 14, the customer may be redirected to a different page at the merchant computer system 140, which will then contain a link for the customer to navigate to the landing page, iFrame or modal window 184.

When the browser 148 of the customer computer system 138 downloads the landing page, iFrame or modal window 184, the first host computer system 14 automatically generates a bitcoin address 186 specifically for the customer's order within the merchant wallet 158.

The first host computer system 14 also creates a bitcoin price based on the price in local currency and displays the bitcoin price within the landing page/iFrame or modal window 184 within the browser 148. The graph illustrates a fluctuating bitcoin to dollar exchange rate. In the present example, the exchange rate at minute 0 is used at 190 to calculate the exchange rate. The local currency price in the present example is $14.00 which gives a bitcoin price of 0.02 BTC. The price of 0.02 BTC that is based on the exchange rate at minute 0 is maintained for a select period of time, in the present example 10 minutes, before it resets. The customer may not wish to immediately send the bitcoin, but may do so at any time before the price resets at minute 10 and the exchange rate remains locked in and the bitcoin price thus remains unchanged at 0.02 BTC during that time.

An option is displayed to the customer to send the bitcoin together with the price in bitcoin at minute 0. When the customer selects the option to send the bitcoin, the customer computer system 138 transmits a send instruction to the first host computer system 14. The first host computer system 14 receives and at 192 detects the send instruction. The customer may for example request to send bitcoin from the customer wallet 160 or via another path as hereinbefore described. The first host computer system 14 responds to the send instruction to transmit an order status message that includes the reference code for the transaction to the merchant computer system 140. The merchant computer system 140 receives the reference code as reference code 194. The merchant computer system 140 then matches the reference code 194 to the reference code 172 within its accounting system 173 and marks the transaction as complete.

In the present example, the send instruction is processed at minute 6. The exchange rate has in the present example changed between minute 0 and minute 6. Should the bitcoin price of 0.02 BTC be converted to local currency at this time it would result in a different price in local currency than the original transaction. The difference between the original price at minute 0 and minute 6 represents either a loss or a gain for the first host computer system 14. The loss and gain is used to calculate bitcoin replacement costs on a periodic basis.

In the present example the first computer system 14 responds to the send instruction received at 192 to transmit 0.02 BTC to the bitcoin address 186 associated with the merchant wallet 158. When the bitcoin reaches the bitcoin address 186, the first host computer system 14, at 196, immediately purchases the bitcoin from the merchant wallet 158, resulting in a transfer of the bitcoin from the merchant wallet 158 to the host wallet 162. The first host computer system 14 purchases the bitcoin at the exchange rate locked in at minute 0.

Periodically, for example daily, the first host computer system 14 calculates the total amount of bitcoin sold by the merchant wallet 158 that day at the locked in prices. The first host computer system 14 has a bank transfer module 200 that, at 202, transmits a payment instruction to a bank for the first host computer system 14. The bank for the first host computer system 14 communicates with a bank of the merchant computer system 140. Such communication, at 204, results in transfer of funds from a host bank account 206 to a merchant bank account 208.

In the present example, the customer uses their customer wallet 160 to transfer funds in the form of bitcoin from the customer wallet 160 to the merchant wallet 158 and the funds are then transferred in the form of bitcoin from the merchant wallet 158 to the host wallet 162. In another embodiment, the merchant wallet 158 can be bypassed such that the customer transfers funds in the form of bitcoin from the customer wallet 160 directly into the host wallet 162. In either embodiment the funds that are received by the host wallet 162 are used as a basis for calculating the amount of money in local currency that is transferred by the bank transfer module 200, minus a fee that is held back by the first host computer system 14 for purposes of processing the transaction.

Referring again to FIG. 54, the API 150 sends and receives API calls at 166, 168 and the order status message in response to the send instruction 192 in FIG. 55. The currency converter 156 is responsible for receiving and maintaining exchange rate for bitcoin to local currency and for calculating the bitcoin price based on the local currency price and the exchange rate at any particular moment in time. The transaction processor 154 is responsible for transferring funds in the form of bitcoin or local currency from one wallet or bank account to another.

In the embodiment above, the exchange rate is locked in when the customer accesses the landing page, iFrame or modal window 184 and is locked for ten minutes. In such an embodiment the merchants typically create a payment "button" or using the API, specifically the button API, of the first host computer system. Selection of the button by the customer results from the process described above wherein the customer is directed to the landing page, iFrame or modal window 184. Such a button does not need to look any different from the merchant's standard "submit order" button and the button API is linked into the standard "submit order" button of the merchant computer system 140, which when clicked will direct the user directly to the landing page, iFrame or modal window 184. When the user hits the landing page the exchange rate is locked. The merchant "order" is thus not created—i.e., with locked in exchange rate—until the user clicks the payment button to land on our landing page.

Another embodiment is used in white-label solutions. In these instances, the user is not directed away from the merchant domain to a landing page such as the landing page, frame or modal window 184 to complete payment. Instead, the checkout information that would have otherwise shown on the landing page is displayed inside the merchant's browser checkout tool. Such an embodiment may not allow "one-click" checkout for users who are already signed into their customer wallet 160; a user can only pay by QR code scan and/or manual entry of a bitcoin address. In order for this information to be incorporated into the merchant's webpage, the merchant (1) creates a "button" when they post an item for sale to the website (the button includes the price in local currency, but not a bitcoin price and can be created at any time—e.g., weeks before a purchase); and (2) when the customer wishes to pay, e.g., by clicking on a "Place Order" button, the merchant computer system 140 sends an API call to the first host computer system 14 which responds by sending back a locked in exchange rate, which again is good for ten minutes. The merchant then displays the checkout information to the user—i.e., the proper bitcoin address and amount. This embodiment differs in that: (1) the "order" is created earlier in time, and the exchange rate follows on as a separate API call; and (2) the checkout information is hosted within the merchant's domain.

Figure 56:
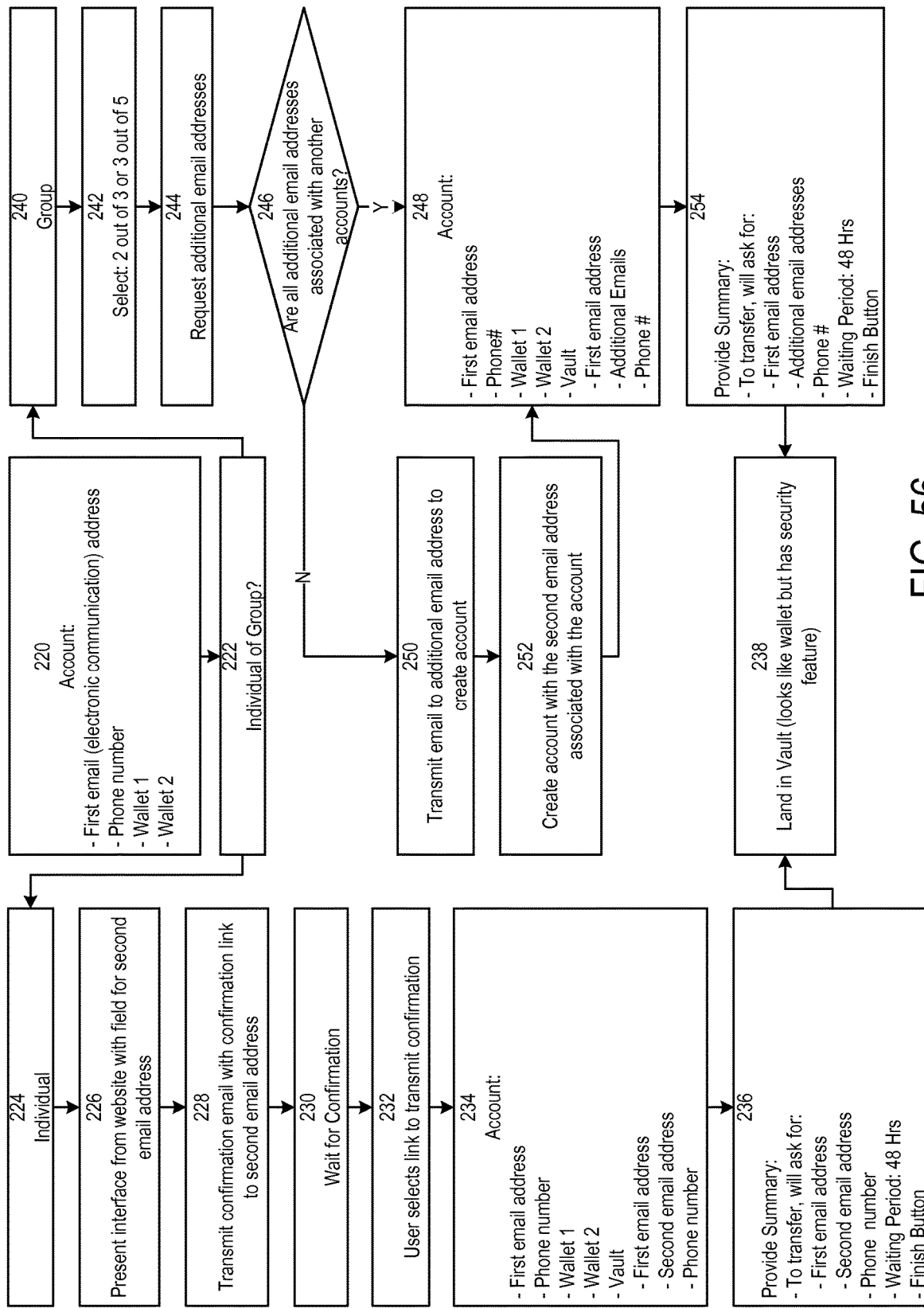
FIG. 56 is a flow chart illustrating the establishment of a personal vault.

FIG. 56 illustrates a method of managing bitcoin wherein a personal vault is created for a user. At 220, the user already has an account that the user can log into using a website. The account has a first email (electronic communication) address. The first email address may be john.smith@gmail.com. The account also has a phone number associated therewith and one or more wallets as herein before described. The website provides the user with a link to create a vault. At 222, the user is provided an option to create an individual vault or a group vault. In an individual vault the user will be required to respond to two emails in order to transfer bitcoin out of the vault. In a group vault multiple users are required to respond to emails in order for the user of the account represented at 220 to transfer the bitcoin out of the vault.

The user may, at 224, select an individual vault. At 226, an interface of the website is presented with a field for the user to enter a second email address. The second email address may for example be john.smith@hotmail.com. The user enters the second email address and selects a button to transmit the second email address from their device to the first host computer system 14. When the first host computer system 14 receives the second email address, the first host computer system 14, at 228, transmits a confirmation email with a confirmation link to the second email address. The purpose of the email that is transmitted at 228 is to confirm the second email address. At 230, the first host computer system 14 waits for the confirmation. The first host computer system 14 does not proceed to create a vault if the confirmation is not received. At 232, the user selects the confirmation link, which causes transmission of the confirmation from the device of the user to the first host computer system 14. When the first host computer system 14 receives the confirmation, the first host computer system 14 proceeds at 232 to register a vault within the same account shown at 220. The vault includes the first and second email addresses. The vault also includes the phone number of the account.

At 236, the first host computer system 14 updates the interface of the website to provide a summary. The summary indicates that, in order to transfer bitcoin out of the vault, emails will be sent to the first and second email addresses, and the summary includes the phone number associated with the vault and that the bitcoin will not be transferred out of the vault for a period of 48 hours. The interface also includes a "Finish" button. When the user selects the "Finish" button, the browser used by the user, at 238, lands in the vault. The vault looks like a wallet, but has a security feature that limits transfer of bitcoin out of the vault.

The user may, at 240, select a group vault. At 242, the first host computer system 14 provides the user with an option whether 2 out of 3 confirmations are required or 3 out of 5 confirmations are required. If the user selects that 2 out of 3 confirmations are required, then the user is required to enter two email addresses in addition to their own email address shown in the account at 220. If the user selects that 3 out of 5 confirmations are required, then the user is required to enter four email addresses in addition to their email address shown in the account at 220.

At 224, the interface of the website is updated to request the additional email addresses from the user. The interface typically includes fields for the user to enter the additional email addresses.

At 246, the first host computer system 14 makes a determination whether all the additional email addresses are associated with other accounts within the first host computer system 14. If all the additional email addresses are associated with other accounts, then the first host computer system 14 proceeds at 248 to update the account represented at 220 with a vault that includes the first email address, the additional email addresses and the phone number associated therewith.

If one or more of the additional email addresses are not associated with any accounts within the first host computer system 14, then the first host computer system 14, at 250, transmits an email to the additional email address that is not associated with an account to create an account. A user receiving the email transmitted at 250 can proceed at 252 to create an account with the second email address associated with the account. Only after all the additional email addresses are associated with accounts does the first host computer system 14, at 248, proceed to register a vault.

The first host computer system 14 then at 254 provides a summary through the interface of the website. The summary shows that in order to transfer bitcoin, emails will be sent to and confirmations will be required from the first email address and the minimum of the additional email addresses. The summary also includes the phone number associated with the vault and states the waiting period before the bitcoin is transferred. The website also includes a "Finish" button which, when selected by the user at 238, lands the browser used by the user in the vault.

Figure 57:
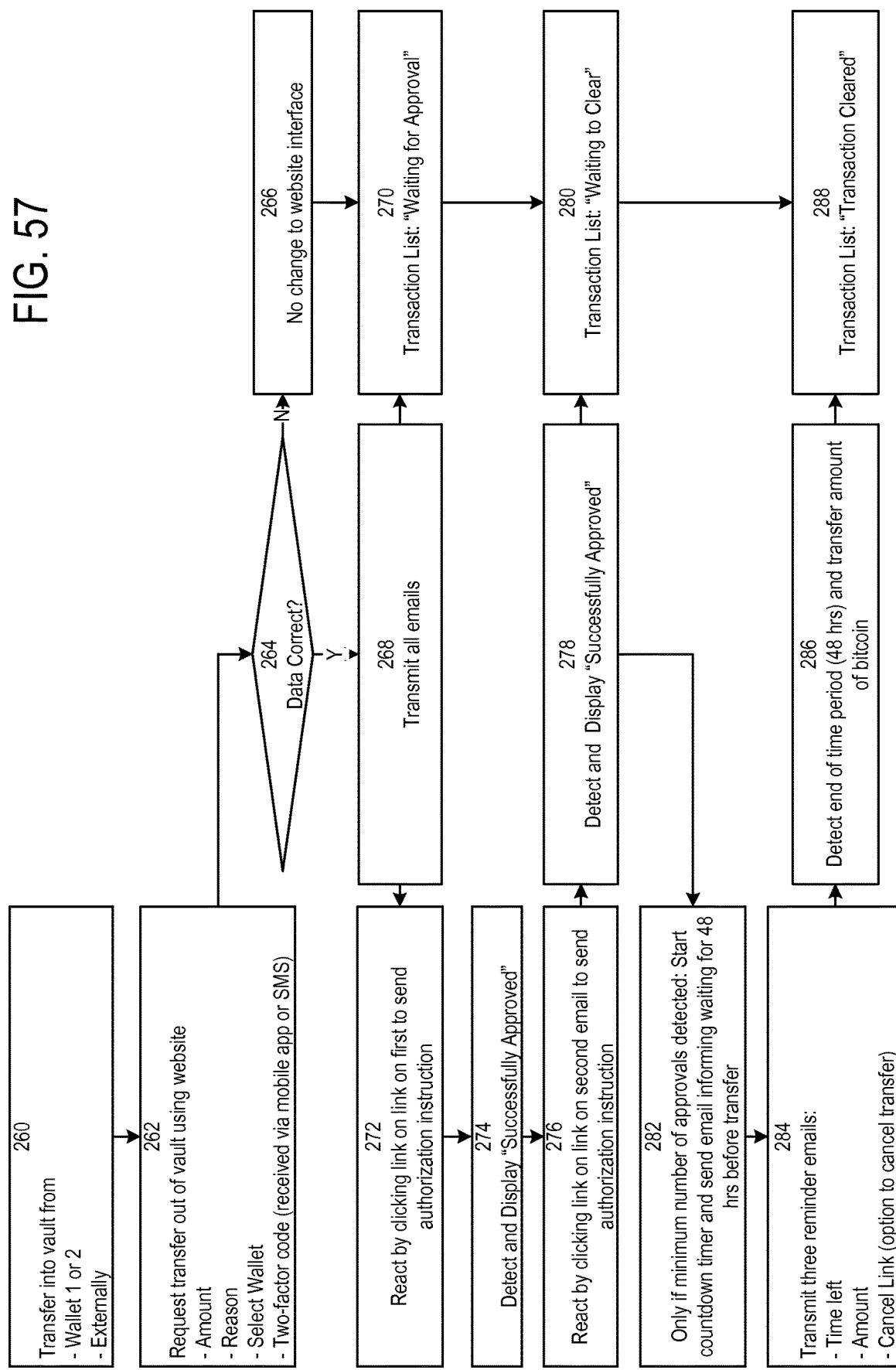
FIG. 57 is a flow chart illustrating how bitcoin is transferred into and out of the vault.

FIG. 57 illustrates how bitcoin is transferred into and out of the vault. At 260, the user first transfers bitcoin into the vault. The user may transfer the bitcoin from one of their wallets associated with their account into the vault or may transfer the bitcoin into the vault from an external source. The bitcoin is then stored within the vault.

At 262, the user requests a transfer out of the vault using the website. The user includes the amount of bitcoin to be transferred, the reason for the transfer and selects a wallet to which the bitcoin is to be transferred. The user also includes a two-factor code which the user may obtain through a mobile application or via SMS communication with the first host computer system 14.

At 264, the first host computer system 14 determines whether the two-factor code is correct. If the two-factor code is incorrect, then the first host computer system 14, at 266, makes no change to the website interface.

If the determination is made at 264 that the two-factor code is correct, then the first host computer system 14 proceeds at 268 to transmit all emails. In the case of an individual vault, emails are sent to the first and second email addresses represented in the account at 234 in FIG. 56. In the case of a group vault, then emails are transmitted to the first email address and the additional email addresses represented in the account at 248 in FIG. 56. At 270, the first host computer system 14 updates the transaction list within the website to represent that approval is being awaited.

Each one of the emails has a respective link that can be selected by a recipient. At 272, a user receiving one of the emails reacts to the email by clicking on the link. Selection of the link causes an authorization instruction to be transmitted from a device of the respective user to the first host computer system 14. At 274, the first host computer system 14 detects the authorization instruction received in response to one of the emails that have been transmitted. Selection of the link on the email opens a browser on the recipient's device and displays a message that the authorization has been successfully approved.

At 276, the recipient of a second one of the emails reacts to the email by clicking the link on the second email to send an authorization instruction. At 278, the first host computer system 14 detects the authorization instruction transmitted at 276 and displays a web page indicating that the authorization has been successfully approved.

When all the predetermined approvals have been received, the first host computer system 14 proceeds, at 280, to update the transaction list to indicate that clearance is being awaited. At 282, only if the minimum number of approvals are detected, the first host computer system 14 starts a countdown timer and sends an email to the user of the account informing the user that the bitcoin will be transferred after 48 hours. Block 284 represents the transmission of three email reminders to the user during the 48 hour waiting period. Each email includes the time remaining before the 48 hours will have elapsed and the amount of bitcoin that will be transferred out of the vault. Each email also includes a "Cancel" link. The user can select the "Cancel" link, which caused the transmission of a cancel instruction to the first host computer system 14. The cancel instruction will cancel the transfer of the bitcoin and therefore the request that was transmitted at 262.

At 286, the first host computer system 14 detects an end of the time period. The first host computer system 14 then transfers the amount of bitcoin out of the vault and in to the destination selected at 262. The first host computer system 14 also updates the transaction list on the website to indicate that the transaction has been cleared.

Figure 58:
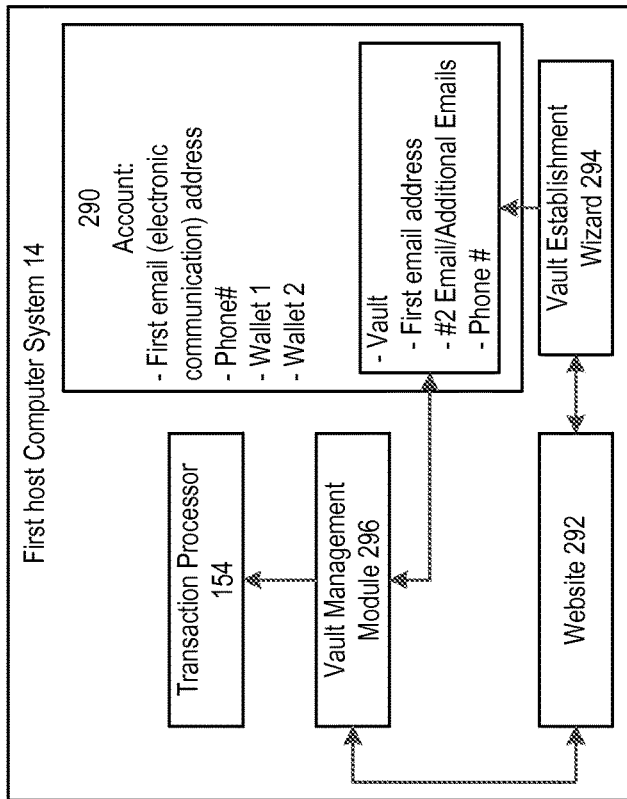
FIG. 58 is a block diagram of the first host computer system illustrating components that are used for establishing the vault and transferring bitcoin into and out of the vault.

FIG. 58 illustrates components of the first host computer system 14 that are used for carrying out the method shown in FIGS. 56 and 57, including an account 290 of a user, a website 292, a vault establishment wizard 294, a vault management module 296 and the transaction processor 154 hereinbefore described. The vault establishment wizard 294 is programmed to execute the establishment of the vault as described with reference to FIG. 56. The vault management module 296 is programmed to manage the vault as described with reference to FIG. 57. A user accesses the website 292 and downloads an interface so as to interact via the website 292 with the vault establishment wizard 294 and the vault management module 296. The vault management module 296 provides instructions to the transaction processor 154 to transfer the bitcoin out of the vault.

Figure 59:
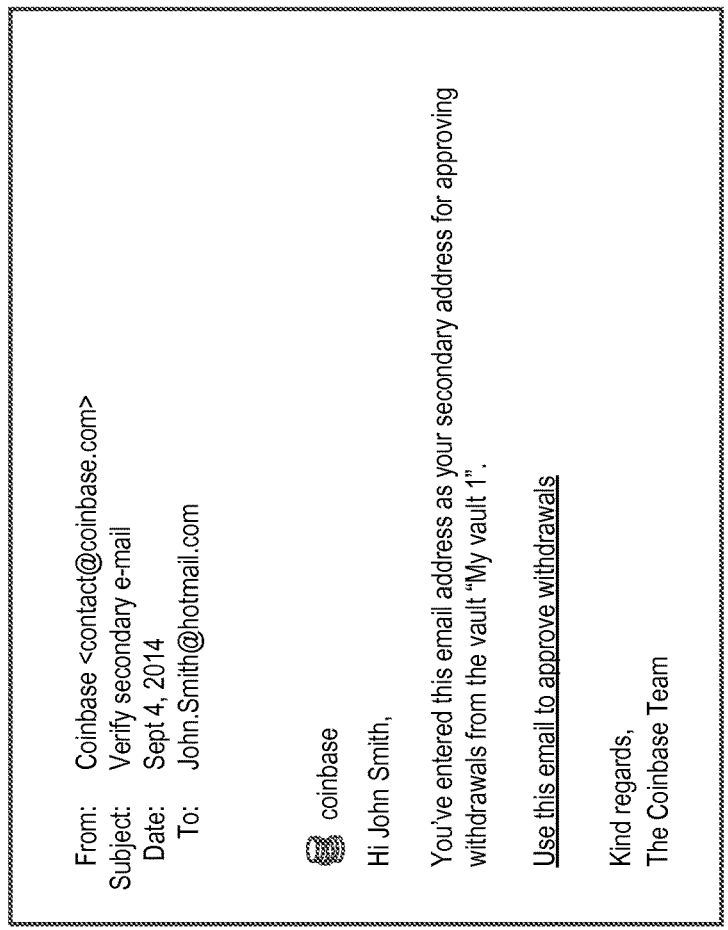
FIG. 59 is an email that is transmitted to verify a secondary email address.
Figure 60:
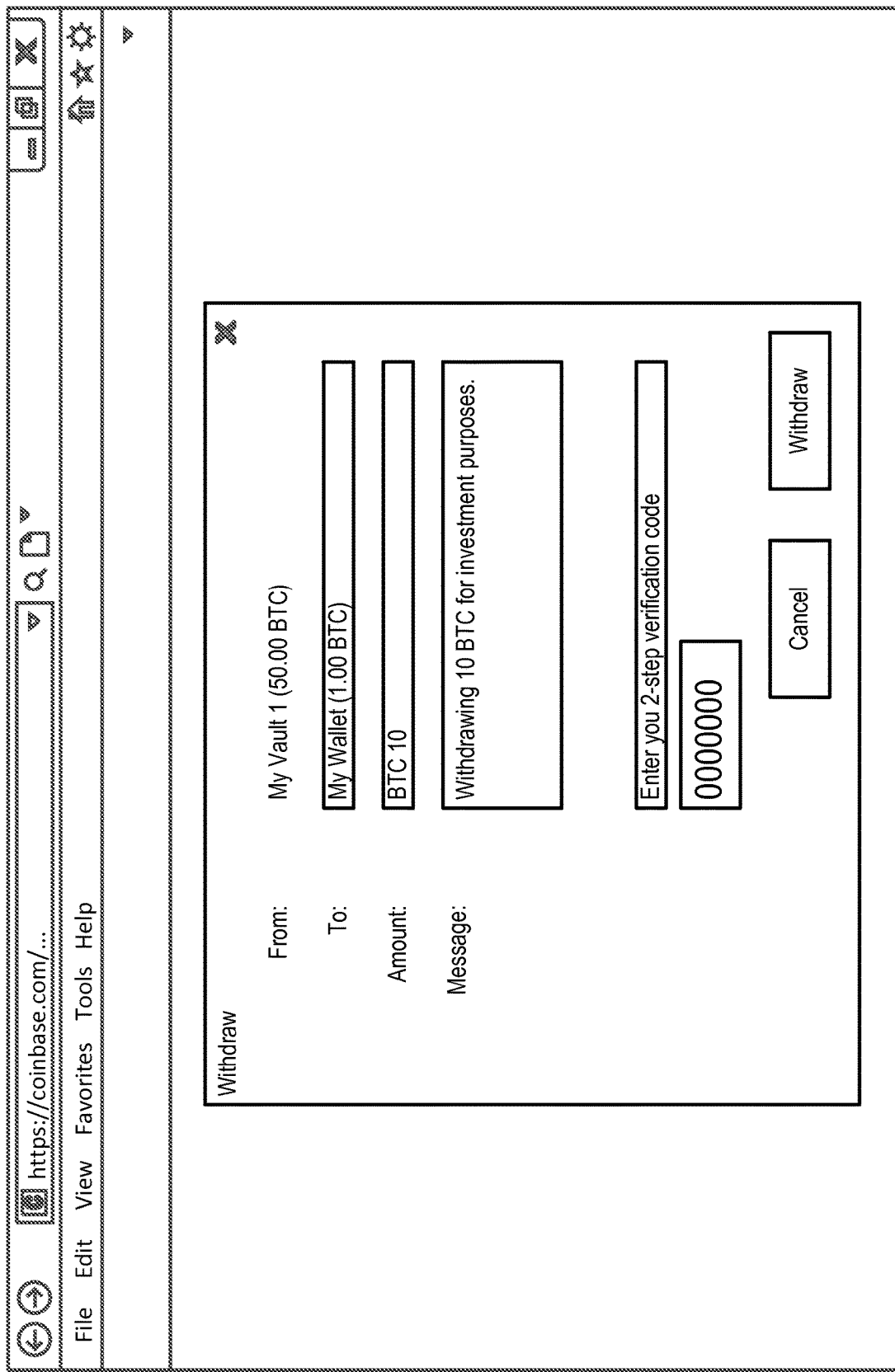
FIG. 60 is a view of a browser wherein a user interface displays options for transferring bitcoin out of a vault.
Figure 61:
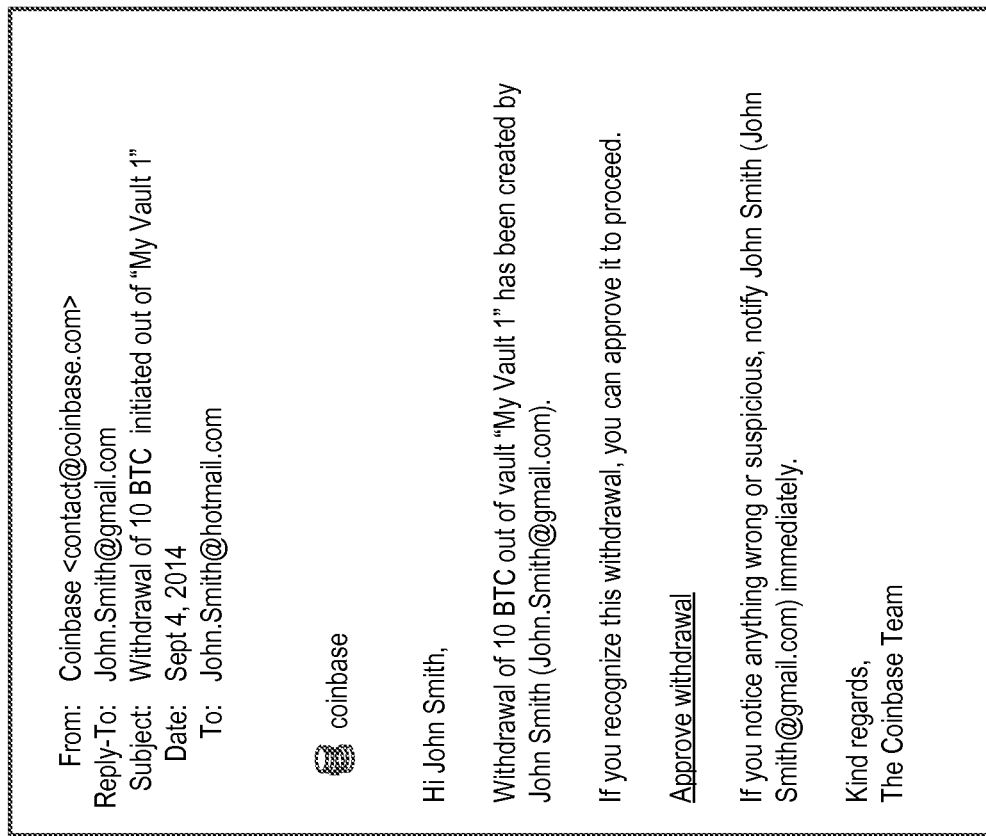
FIGS. 61 and 62 are emails that are transmitted to primary and secondary email addresses to approve a withdrawal.
Figure 62:
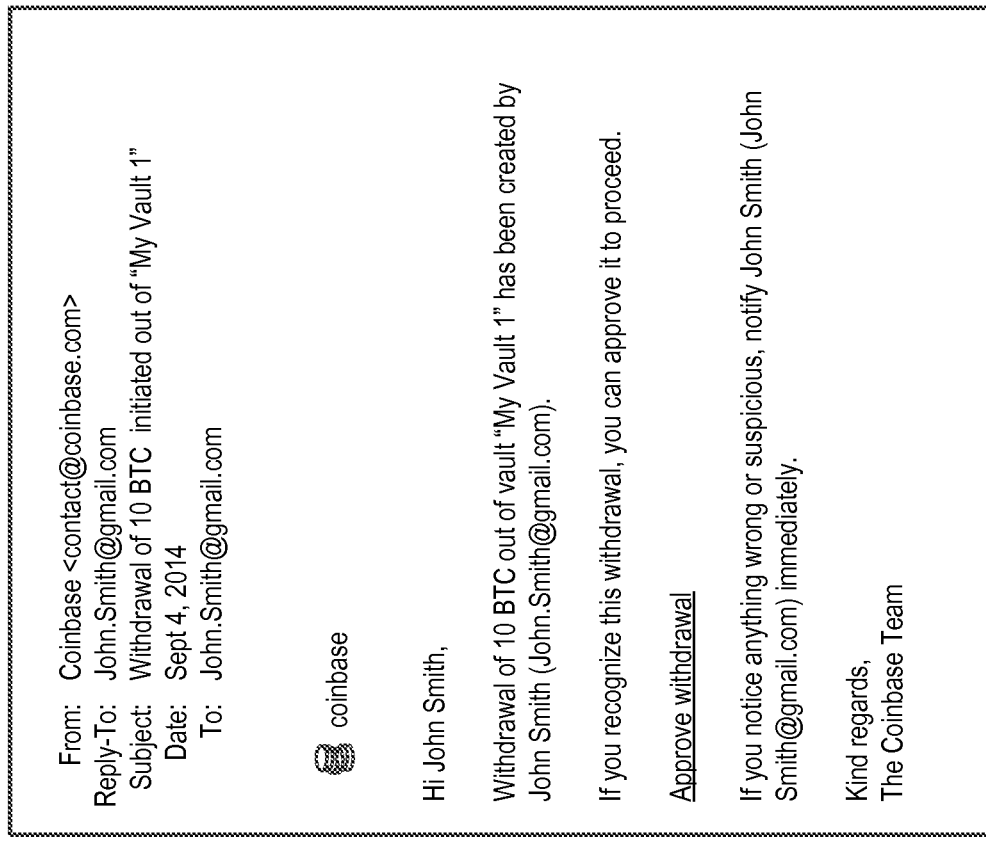
Figure 63:
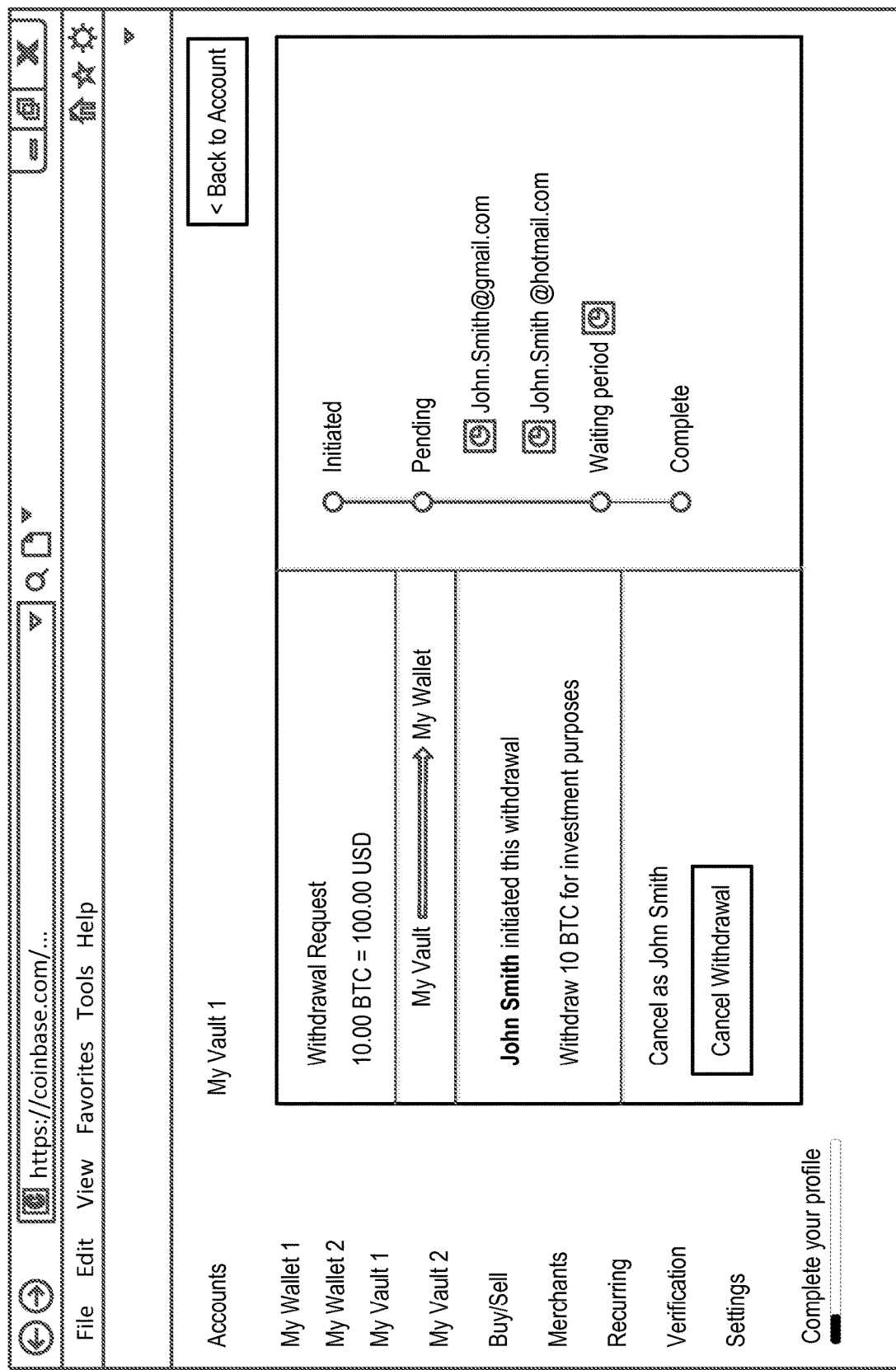
FIG. 63 is a view of the browser with the user interface displaying a transaction status window.

FIG. 59 shows the email that is transmitted at 228 in FIG. 56. FIG. 60 shows an interface of the website 292 in FIG. 58 when the user requests a transfer out of a vault at 262 in FIG. 57. FIGS. 61 and 62 show the emails that are transmitted at 268 in FIG. 57. FIG. 63 shows the interface of the website after the minimum number of approvals are received and the countdown clock has been started at 282 in FIG. 57.

Email addresses are used in the exemplary embodiment for electronic communication via email. Another embodiment may make use of other electronic communication addresses such as text messages to phone numbers or messages through social networks. Such messages may include authorization links as described or authorization may be obtained otherwise such as sending a reply message and including "Y" or "Yes" in the reply message. A secondary electronic communication address may be an individual address or a group address.

Figure 64:
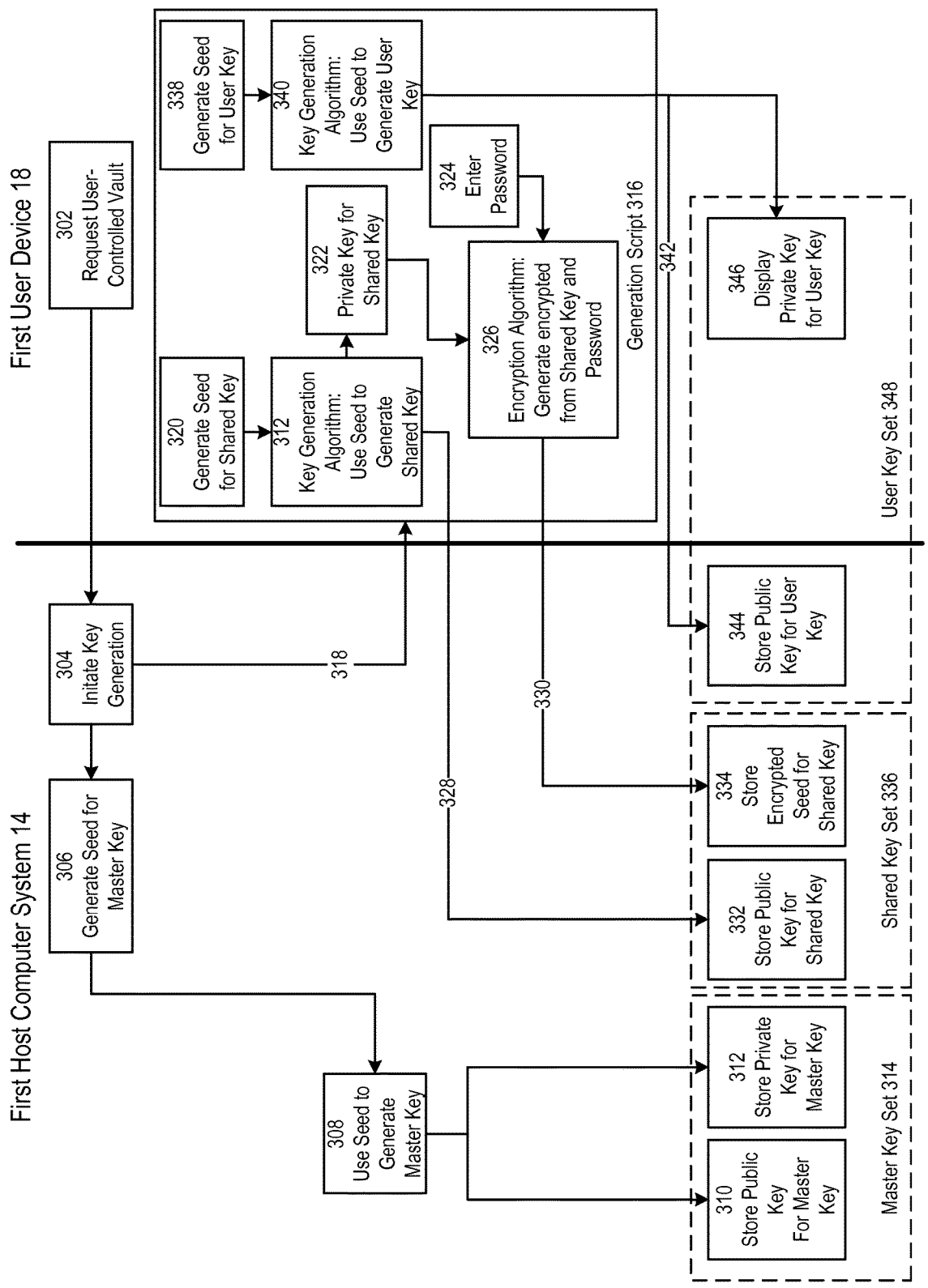
FIG. 64 is a block diagram illustrating the establishment of a user-controlled vault.

FIG. 64 illustrates the establishment of a user-controlled vault. At 302, a user at the first user device 18 transmits a request for a user-controlled vault to the first host computer system 14. At 304, the first host computer system 14 responds to the request to initiate key generation.

At 306, the first host computer system 14 generates a seed for a master key. At 308, the first host computer system 14 uses the seed generated at 306 to generate a master key. The master key includes a public key for the master key and a private key for the master key. At 310, the first host computer system 14 stores the public key for the master key and, at 312, stores the private key for the master key. The combination of the keys stored at 310 and 312 form a master key set 314.

A generation script 316 initially resides on the first host computer system 14. At 318, the first host computer system 14 transmits the generation script 316 to the first user device 18. The first user device 18 receives the generation script 316, which is executable on the first user device 18.

At 320, the generation script 316 generates a seed for a shared key. The generation script 316 includes a key generation algorithm. At 321, the key generation algorithm uses the seed generated at 320 to generate a shared key. The shared key includes a public key and a private key.

The private key for the shared key is shown at 322. The generation script 316 also includes an interface with a field for a user to enter a password via a keyboard. At 324, the user enters the password into the interface. The generation script 316 also includes an encryption algorithm. At 326, the encryption algorithm generates an encrypted seed from the private key shown at 322 and the password entered at 324.

At 328 and 330, the key generation algorithm and encryption algorithm respectively send the public key of the shared key and the encrypted seed to the first host computer system 14. At 332, the first host computer system 14 stores the public key for the shared key and, at 334, stores the encrypted seed for the shared key. The public key stored at 332 and the encrypted seed 334 can be viewed as a shared key set 336. Additionally, the private key shown at 322 forms part of the shared key set 336. The private key shown at 322 is however never transmitted from the first user device 18 to the first host computer system 14.

At 338, the generation script 316 further generates a seed for a user key. At 340, the key generation algorithm uses the seed generated at 338 to generate a user key. The user key includes a public key for the user key and a private key for the user key. At 342, the key generation algorithm transmits only the public key for the user key to the first host computer system 14. At 344, the first host computer system 14 stores the public key for the user key.

At 346, the generation script 316 displays the private key for the user key to the user. The user can then store the private key manually on the first user device 18 or write it down for later use. The first user device 18 never transmits the private key displayed at 346 to the first host computer system 14. The combination of the public key for the user key stored at 344 and the private key for the user key displayed at 346 form a user key set 348.

Figure 65:
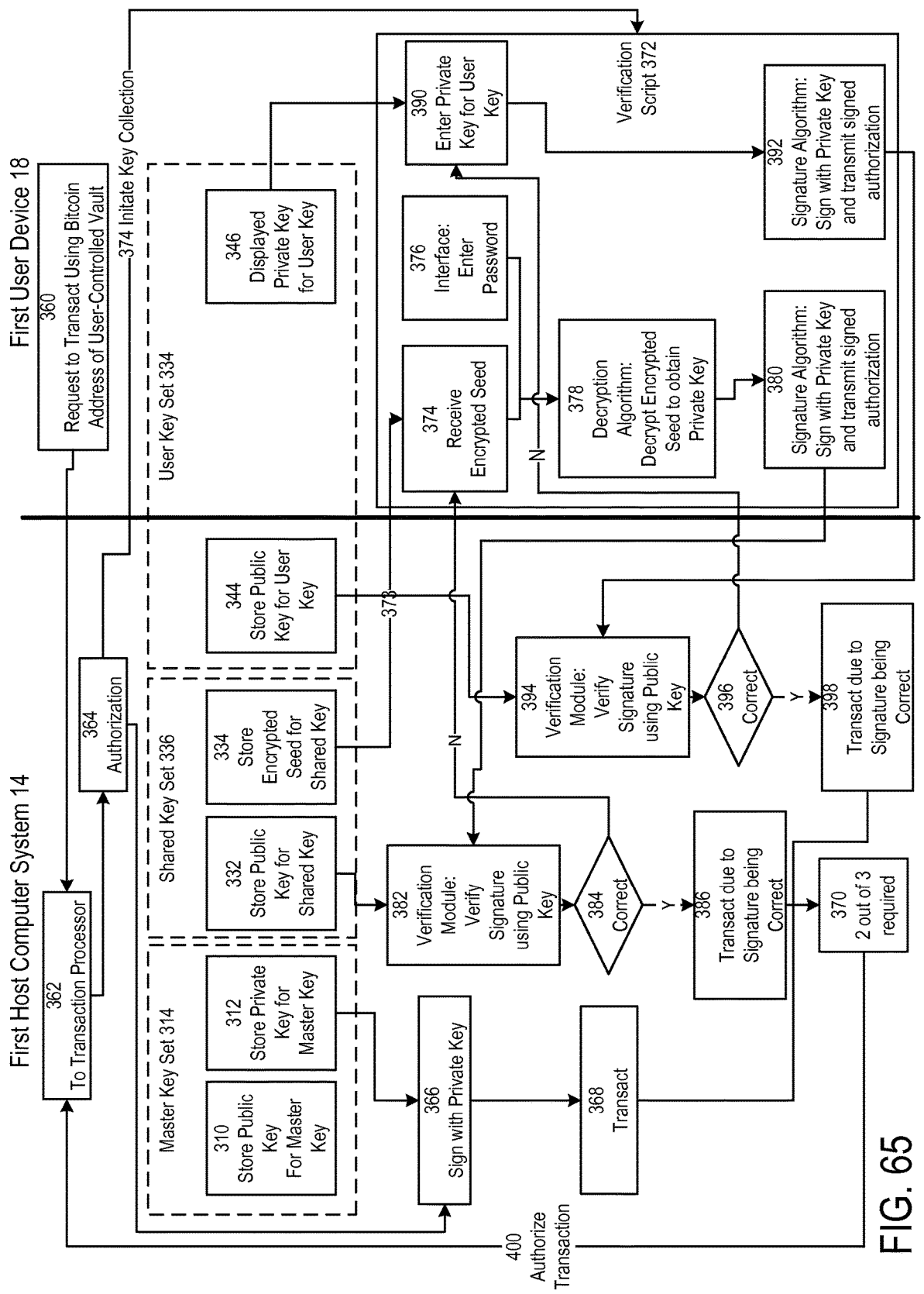
FIG. 65 is a block diagram illustrating the user of the user-controlled vault for authorizing a transaction.

FIG. 65 illustrates how the user-controlled vault is used by the user. At 360, the user of the first user device 18 creates and transmits a request to transact using bitcoin of the user-controlled vault. At 362, the request reaches the transaction processor 154 hereinbefore described. At 364, the first host computer system 14 creates an authorization for the transaction.

The master key set 312, shared key set 336 and user key set 334 are replicated from FIG. 64 and the same reference numerals apply. It should however be understood that these keys are stored or displayed in FIG. 64 and that the stored and displayed keys are not stored but only retrieved and used in FIG. 65.

At 366, the first host computer system 14 signs the authorization 364 with the private key for the master key. Such signature then allows for an authorization to transact at 368. As shown in 370, two out of three authorizations are required in order to transact and the authorization provided at 368 may form one of the two authorizations.

A verification script 372 initially resides on the first host computer system 14. At 373, the first host computer system 14 initiates key collection by transmitting the verification script 372 to the first user device 18. The verification script 372 is executable on the first user device 18. Both the generation script 316 in FIG. 64 and the verification script 372 in FIG. 65 may be in the form of JavaScript™ that is executable by a browser on the first user device 18.

The encrypted seed stored at 334 on the first host computer system 14 is transmitted together with the verification script 372 and is received at 374 by the first user device 18. The verification script 372 further includes an interface with a field for entering a password. At 376, the user enters the same password that the user entered at 324 in FIG. 64 into the field provided in the interface using a keyboard. The verification script 372 further includes a decryption algorithm. At 378, the decryption algorithm uses the encrypted seed and the password to decrypt the encrypted seed and obtain the private key. The encryption at 326 in FIG. 64 and decryption at 378 in FIG. 65 may follow the BIP38 protocol which is commonly understood by those skilled in the art of bitcoin encryption.

The authorization 364 is transmitted together with the verification script 372 to the first user device 18. The verification script 372 further has a signature algorithm. At 380, the signature algorithm signs the authorization with the private key. The signature algorithm then transmits the signed authorization (together with the signature) to the first host computer system 14.

The first host computer system 14 has a verification module. As will be commonly understood as those skilled in the art, a verification module is an algorithm that verifies a signature that was created with a private key using a public key. At 382, the verification module verifies the signature using the same public key stored at 332 for the shared key in the shared key set 336 that also includes the encrypted seed stored at 334. At 384, the verification module determines whether the signature is correct. If the signature is not correct, then the first computer system 14 returns to 374 where the encrypted key is received and the user enters a password. If, at 384, a determination is made that the signature is correct, then the first host computer system 14 proceeds to 386 to provide an authorization due to the signature being correct. The authorization at 386 may be one of the authorizations required at 370 in order to authorize the transaction.

The verification script 372 further includes an interface for entering the private key of the user key that was previously displayed at 346 to the user. At 390, the user enters the private key into the field provided therefor. At 392, a signature algorithm forming part of the verification script 372 signs the authorization with the private key that has been entered by the user. The signature algorithm then transmits the signed authorization (together with the signature) to the first host computer system 14. At 394, a verification module verifies the signature using the public key that was stored at 344. At 396, the verification module determines whether the signature is correct. If the signature is incorrect, then the first host computer system 14 instructs the verification script 372 to return to 390 where the user is again asked for the private key for the user key. If the signature is correct, then the first host computer system 14 proceeds to 398 to provide an authorization for the transaction due to the signature being correct. The authorization provided at 398 may be one of the authorizations required at 370.

What should be noted this time is that the password entered at 376 is never transmitted to the first host computer system 14. Similarly, the private key entered at 390 is never transmitted to the first host computer system 14. The user's control over the password and private key effectively disallows the transaction from being processed outside of the user's control.

After two out of the three authorizations have been received at 370, the first host computer system 14 proceeds at 400 to authorize the transaction with the transaction processor 154.

Figure 66:
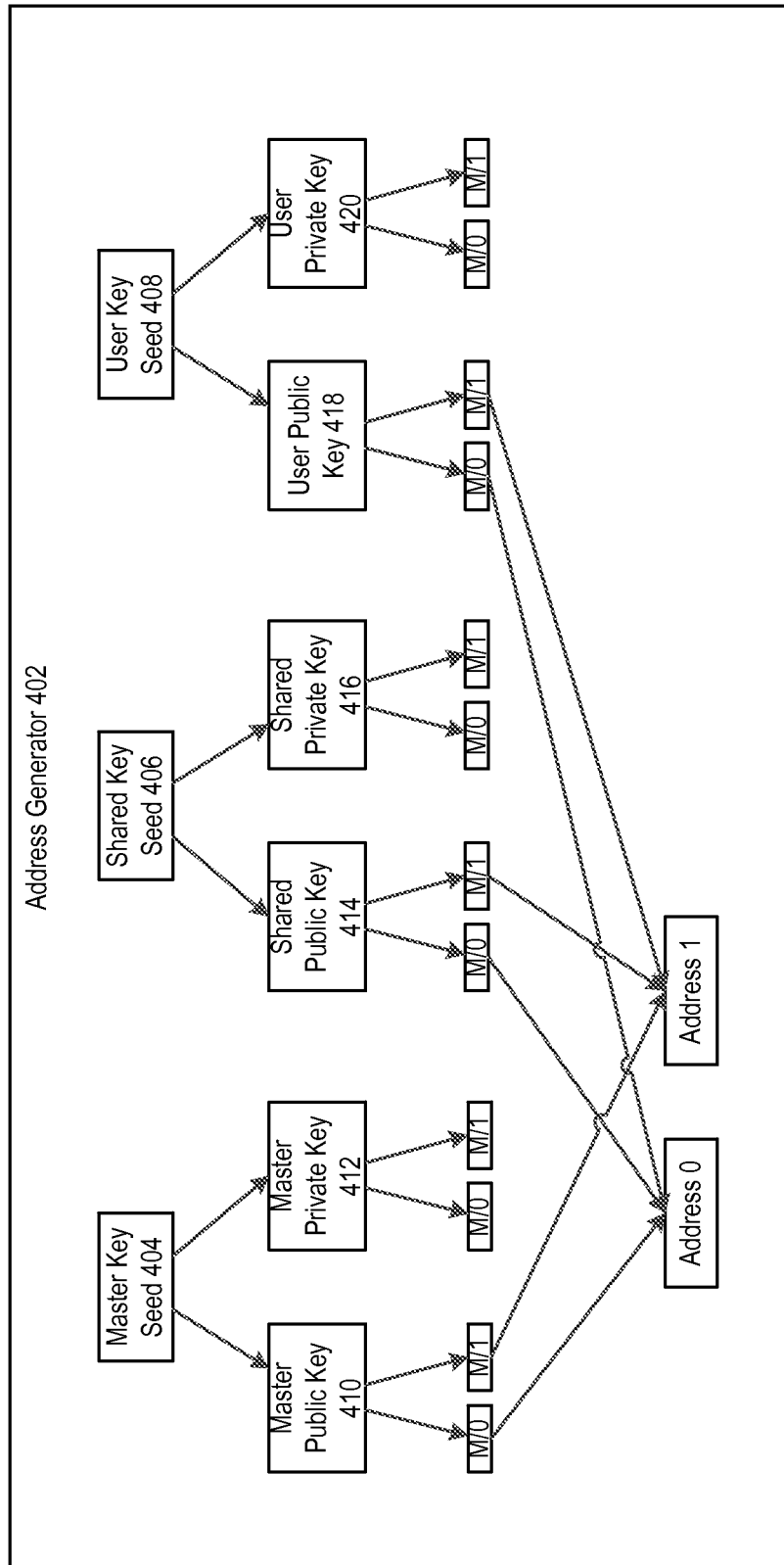
FIG. 66 is a block diagram of an address generator that is used by the user-controlled vault.

FIG. 66 illustrates an address generator 402 that is used to generate addresses such as the bitcoin address that are used for the transaction requested at 360 in FIG. 65. A master key seed 404, shared key seed 406 and user key seed 408 are generated. The master key seed 404 is used to generate a master public key 410 and a master private key 412. The shared key seed 406 is used to generate a shared public key 414 and a shared private key 416. The user key seed 408 is used to generate a user public key 418 and user private key 420.

Each one of the keys 410 to 420 may be used to generate child keys M/0, M/1 . . . . The shared keys at each level may then be combined to generate an address. For example, the M/0 keys of the master public key 410, shared public key 414 and user public key 418 may be used to generate an address (Address 0). The M/0 level may for example be the public keys stored at 310, 332 and 334 in FIG. 64. The address (Address 0) may for example be the bitcoin address for the transaction. Similarly, the M/1 level keys of the master public key 410, shared public key 414 and user public key 418 may be used to generate another address (Address 1). The further addresses may be generated to create further bitcoin addresses of for other purposes.

Figure 67:
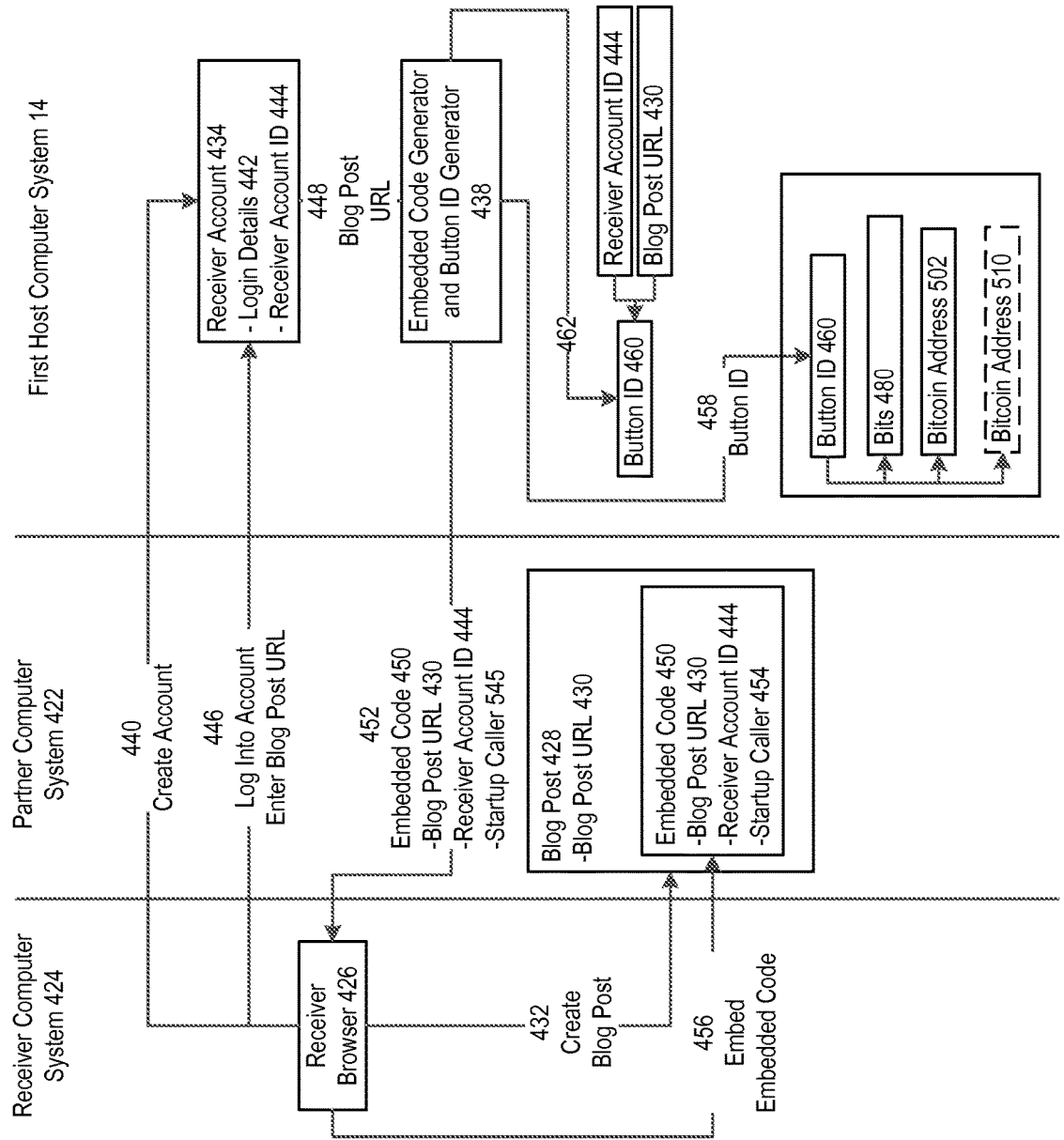
FIG. 67 to FIG. 71 are a block diagrams illustrating the functioning of a tip button.

FIG. 67 of the accompanying drawings illustrates the first host computer system 14, a partner computer system 422 and a receiver computer system 424. The receiver computer system 424 includes a receiver browser 426. The partner computer system 422 has a website, in the present example a blog with a blog post 428 that has a blog post URL 430. At 432, a user of the receiver computer system 424 uses the receiver browser 426 to create the blog post 428.

The first host computer system 14 has a wallet in the form of receiver account 434, an embedded code generator and a button ID generator 438. At 440, the user of the receiver computer system 424 creates the receiver account 434. The receiver account 434 has login details 442 and a receiver account identifier (ID) 444. At 446, the user of the receiver computer system 424 logs into the receiver account 434 and enters the blog post URL 430 through the user interface 36 (FIG. 1B). The blog post URL 430 is then stored in association with the particular receiver account 434 with the wallet management module 44 (FIG. 1B). At 448, the first host computer system 14 provides the blog post URL 430 to the embedded code generator and button ID generator 438. The embedded code generator 438 then generates an embedded code 450 and, at 452, transmits the embedded code 450 to the receiver browser 426. The embedded code 450 includes the blog post URL 430, receiver account ID 444 and a startup caller 454.

The blog post 428 on the partner computer system 422 has a frame for pasting the embedded code 450 due to prior agreement between operators of the first host computer system 14 and the partner computer system 422. At 456, the user of the receiver computer system 424 copies the embedded code 450 received at 452 and pastes the embedded code 450 into the frame of the blog post 428. The embedded code 450 is then embedded and forms part of the HyperText Markup Language (HTML) of the blog post 428.

A blog post 428 is used herein to describe the invention by way of example. It should however be understood that the invention may have broader application. A URL of a page may for example have a video, song or news article. Such a page will typically have a frame for pasting the embedded code 450. Alternatively, media content such as a video may not have a separate frame for pasting the embedded code. Instead, another manner of activating payment features of the invention may be provided, such as a separate URL link, voice activation, detection of human gestures of a user, etc.

The button ID generator (see 438) generates a unique button ID. At 458, the button ID generator stores the button ID as button ID 460 within a data store of the first host computer system 14. At 462, the button ID generator 438 stores the button ID 460 in association with the particular receiver account ID 444 and particular blog post URL 430. Multiple receiver accounts may exist within the first host computer system 14. In addition, a receiver account may have multiple blog post URL's associated therewith. Each pair of a respective receiver account ID and respective blog post URL have a unique button ID.

Figure 68:
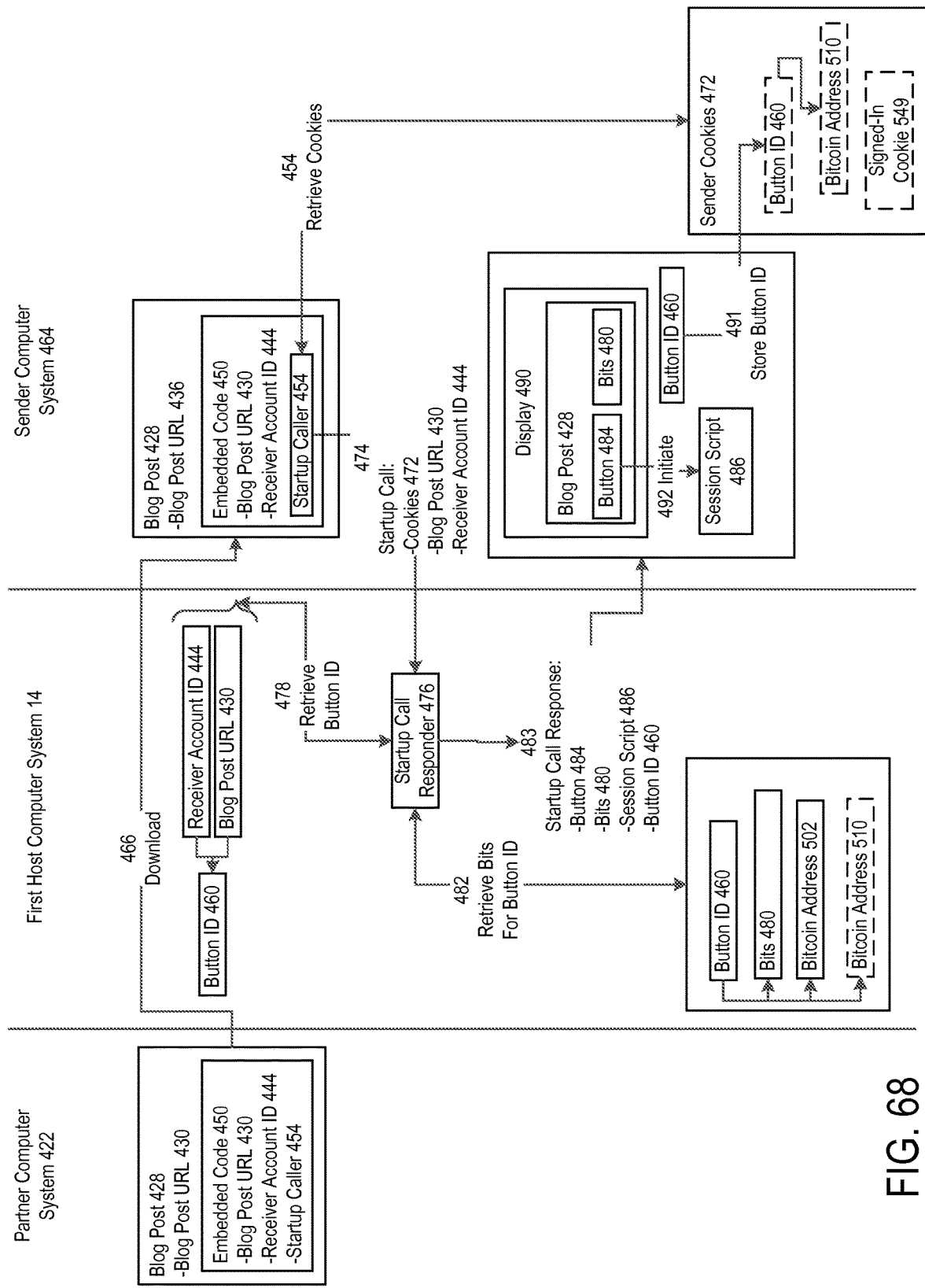

FIG. 68 shows the first host computer system 14, the partner computer system 422 and a sender computer system 464. The sender computer system 464 has a sender browser (not shown). At 466, the sender browser downloads the blog post 428 from the partner computer system 422. The startup caller 454 is a script, e.g. JavaScript®, that automatically executes on the sender computer system 464. At 470, the startup caller 454 retrieves all sender cookies 472 on the sender computer system 464. The startup caller 454, at 474, transmits a startup call to the first host computer system 14. The startup call includes the cookies 472, the blog post URL 430 and the receiver account ID 444.

The first host computer system 14 includes a startup call responder 476 that receives the startup call 474. The startup call responder 476, at 478, uses the blog post URL 430 and receiver account ID 444 received in the startup call 474 to identify the particular button ID 460.

The button ID 460 in storage may have bits 480 representing all payments made in association with the button ID 460. At 482, the startup call responder 476 retrieves the bits 480 associated with the button ID 460 from the data store.

At 483, the startup call responder 476 transmits a startup call response to the sender computer system 464. The startup call response transmitted at 483 is in response to the startup call received at 474. The startup call response includes a button 484, the bits 480, a session script 486 and the button ID 460. A display 490 of the sender computer system 464 displays the blog post 428. The embedded code 450 has added the button 484 and the bits 480 to the blog post 428. The button 484 is a two-dimensional button that is selectable by a user of the sender computer system 464. The session script 486 is associated with the button 484 so as to be executable when the user selects the button 484.

The embedded code 450, at 491, stores the button ID 460 within the sender cookies 472. The button ID 460 stored within the sender cookies 472 can now be used to identify the button ID 460 within the first host computer system 14.

Figure 69:
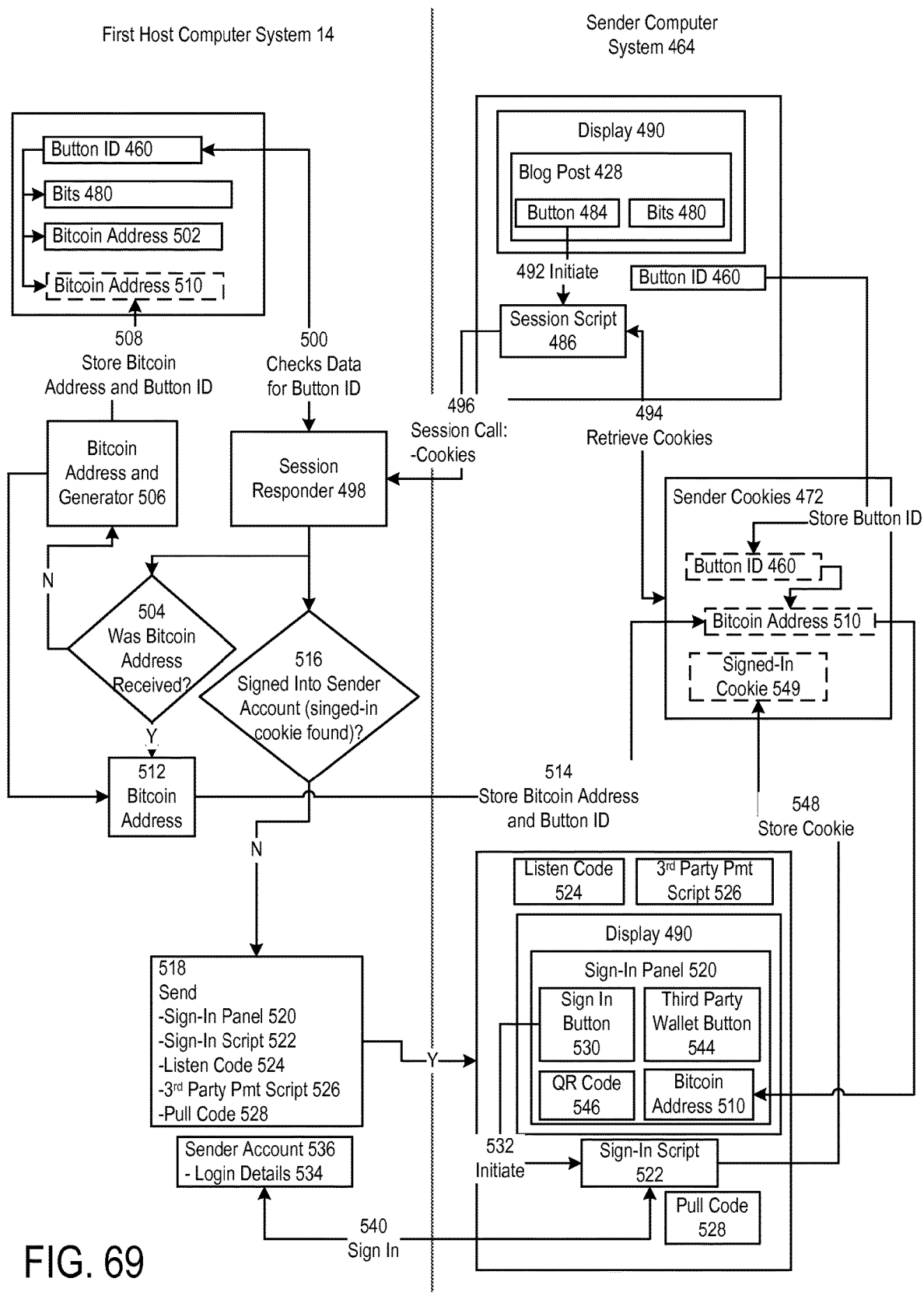

In FIG. 69, the user has selected the button 484 which, at 492, initiates the session script 486. The session script 486, at 494, retrieves the sender cookies 472 and, at 496, makes a session call to the first host computer system 14. The session call 496 includes the cookies 472.

The first host computer system 14 includes a session responder 498 that receives the session call 496. At 500, the session responder 498 checks all data for the button ID 460 that has been received in the session call 496. The data associated with the button ID 460 may include a bitcoin address 502, although no bitcoin address may be included within the cookies 472 of the session call 496. At 504, the session responder 498 determines whether a bitcoin address was received in the cookies 472 of the session call 496. If no bitcoin address was received, the first host computer system 14 executes a bitcoin address generator 506. The bitcoin address generator 506 then generates a bitcoin address and, at 508, stores the bitcoin address in association with the button ID 460. The newly saved bitcoin address is represented as bitcoin address 510. At 512, the session responder 498 transmits the bitcoin address 510 that has been generated by the bitcoin address generator 506 to the sender computer system 464. At 514, the session script 486 stores the bitcoin address 510 in association with the button ID 460 within the sender cookies 472. Upon a browser refresh, the process started at 466 in FIG. 68 is restarted and all cookies are stored from earlier browser sessions are collected and transmitted by the startup caller 454.

At 516, the session responder 498 determines whether the sender computer system 464 is signed into a sender account. The determination is made based on whether a signed-in cookie is found among the cookies transmitted in the session call 496. If no signed-in cookie is found, then the session responder 498 proceeds to 518. At 518, the session responder 498 sends a sign-in panel 520, a sign-in script 522, a listen code 524, a third party payment script 526, and a pull code 528 to the sender computer system 464. The session script 486 creates an overlay window that includes the sign-in panel 520 with a sign-in button 530 having the sign-in script 522 associated therewith. The user can select the sign-in button 530 which, at 532, initiates the sign-in script 522. The sign-in script 522 creates and opens a further window (not shown) that allows the sender of the sender computer system 464 to enter login details 534 of a sender account 536. At 540, the sign-in script 522 signs the sender computer system 464 into the sender account 536 using the login details 534. The sign-in script 522, at 548, stores a signed-in cookie 549 within the sender cookies 472. The sign-in panel 520 further includes two payment selections, including a third party wallet button 544, and a Quick Response (QR) code 546. The third party payment script 526 is stored in association with the third party wallet button 544. The listen code 524 and pull code 528 are stored in an executable manner within the sender computer system 464. The session script 486 retrieves the bitcoin address 510 from the sender cookies 472 and displays the bitcoin address 510 within the sign-in panel 520.

Figure 70:
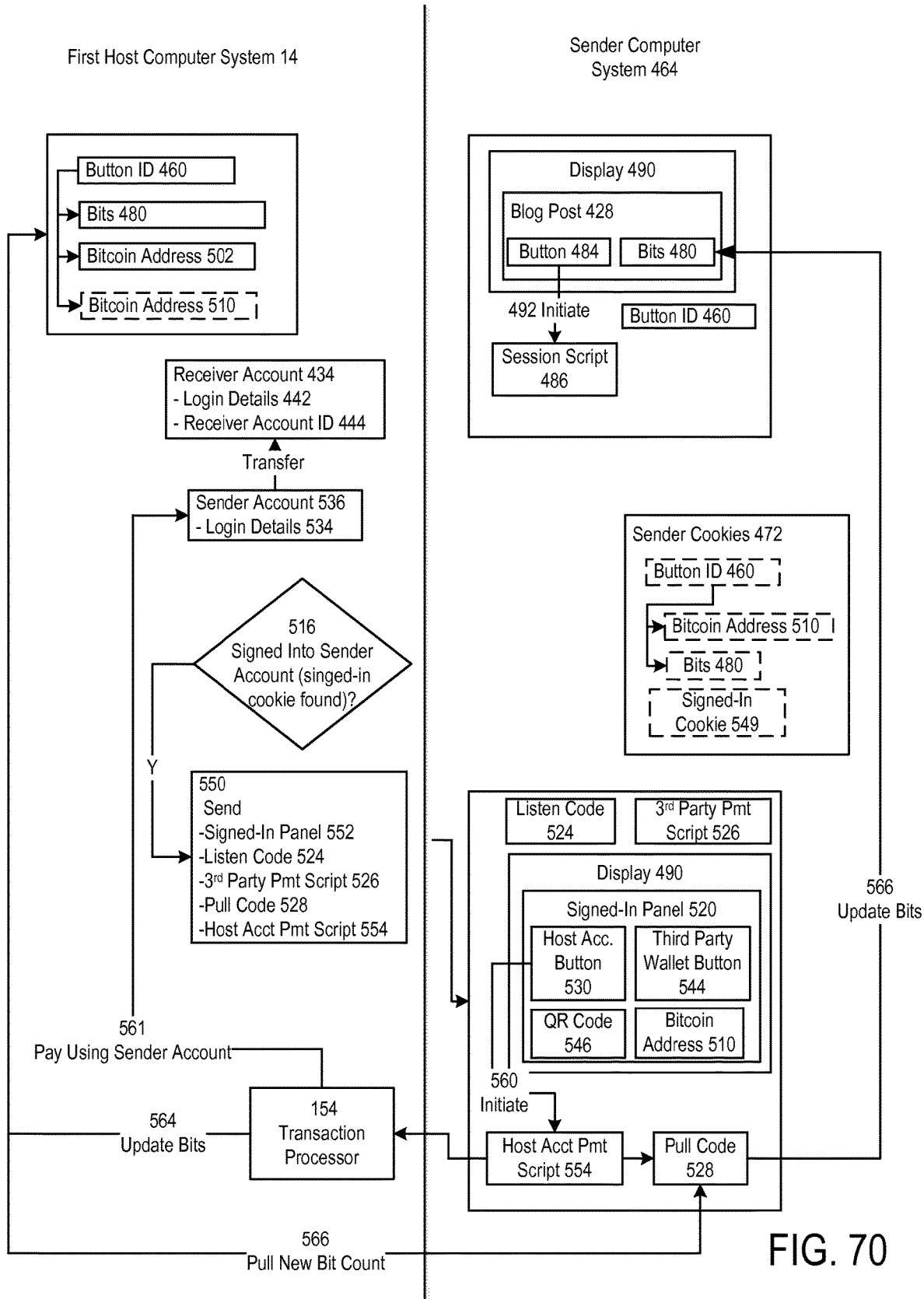

As shown in FIG. 70, if the determination at 516 is made that the sender computer system 464 is signed-in to the sender account 436, or after the sender computer system 464 signs-in at 540 in FIG. 69, the session responder 498 proceeds to 550. At 550, the session responder 498 transmits a signed-in panel 552, the listen code 524, the third party payment script 526, the pull code 528 and a host account payment script 554 to the sender computer system 464. The signed-in panel 552 is the same as the sign-in panel 520 with the exception that it includes a host account button 556 instead of the sign-in button 530. The third party payment script 526 is stored in association with the third party wallet button 544. The host account payment script 554 is stored in association with host account button 556.

Selection by the user of the host account button 556 initiates at 560 the host account payment script 554. The host account payment script 554 transmits an instruction to the transaction processor 154 of the selection. At 561, the transaction processor 154 makes a payment out of the sender account 536 to the receiver account 434 as hereinbefore described without going through the bitcoin network or the block chain.

At 564, the transaction processor 154 updates the bits 480 by adding the bits of the present transaction to the bits 480 already stored within the data store. The bits 480 within the data store thus represent an ongoing tally of all payments made in association with the button ID 460. The bitcoin addresses 502 and 510 represent bitcoin addresses that are generated for different sender computer systems 464 using the same button ID 460.

After the host account payment script 554 transmits the instruction to the transaction processor 15, the host account payment script 554 initiates the pull code 528. The pull code 528, at 574, pulls the new bit count from the bits 480 in the storage of the first host computer system 14. At 566, the pull code 528 updates the bits 480 in the blog post 428 based on the bits that have been pulled by the pull code 528 in FIG. 70.

Figure 71:
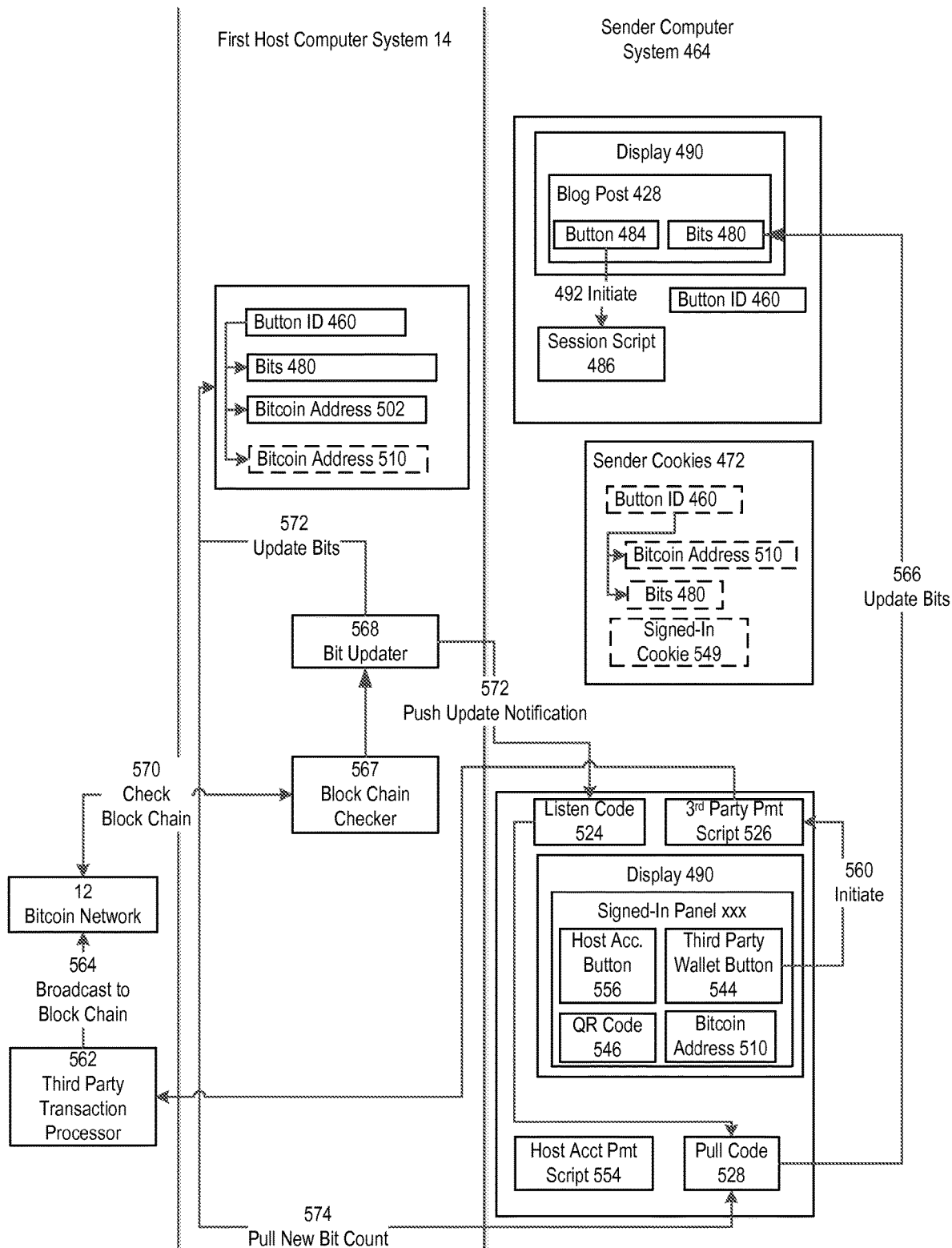

As shown in FIG. 71, the user selects the third party wallet button 544 which, at 560, causes execution of the third party payment script 526. The third party payment script 526 then transmits a transaction (of bitcoin to the bitcoin address 510) to a third party transaction processor 562. The third party transaction processor 562 is hosted by a host computer system other than the first host computer system 14. At 564, the third party transaction processor 562 broadcasts the transaction to the bitcoin network 12 and it is picked up by the blockchain.

The first host computer system 14 further includes a block chain checker 567 and a bit updater 568. The block chain checker 567, at 570, periodically checks the block chain. For purposes of this discussion, the block chain checker 567 checks the block chain to determine whether there are any new transactions for the bitcoin addresses 502 and 510 stored in association with the button ID 460. If the block chain checker 567 finds any further transactions, the block chain checker 567 notifies the bit updater 568. At 572, the bit updater 568 updates the bits 480 that are associated with the respective bitcoin address 502 or 510. The bits 480 are updated by adding bits for any new transactions that have been picked up by the block chain checker 567.

At 574, the bit updater 568 transmits a push update notification to the sender computer system 464. The listen code 524 receives the push update notification. Websocket technology may for example be used for the push update notification in order to open an interactive communication link. The listen code 524 is continuously active and therefore continuously listens for push update notifications. When the listen code 524 receives the push update notification, the listen code 524 initiates the pull code 528. The pull code 528, at 574, pulls the new bit count from the bits 480 in storage. At 566, the pull code 528 updates the bits 480 in the blog post 428 based on the bits that have been pulled by the pull code 528 in FIG. 70.

The QR code 546 may be scanned by an app on a mobile phone. The bitcoin address 510 is encoded in the QR code 546. The app can decode the QR code 546 to extract the bitcoin address 510 and transmit a transaction (of bitcoin to the bitcoin address 510) to a third party transaction processor such as the third party transaction processor 562.

The button 484 shown in FIG. 69 can be used as a Tip button. A user of the sender computer system 464 can use the button 484 to make a small discrete payment to the user of the receiver computer system 424. Such a payment may, for example, be as a reward for the content of the blog post 428.

Figure 72:
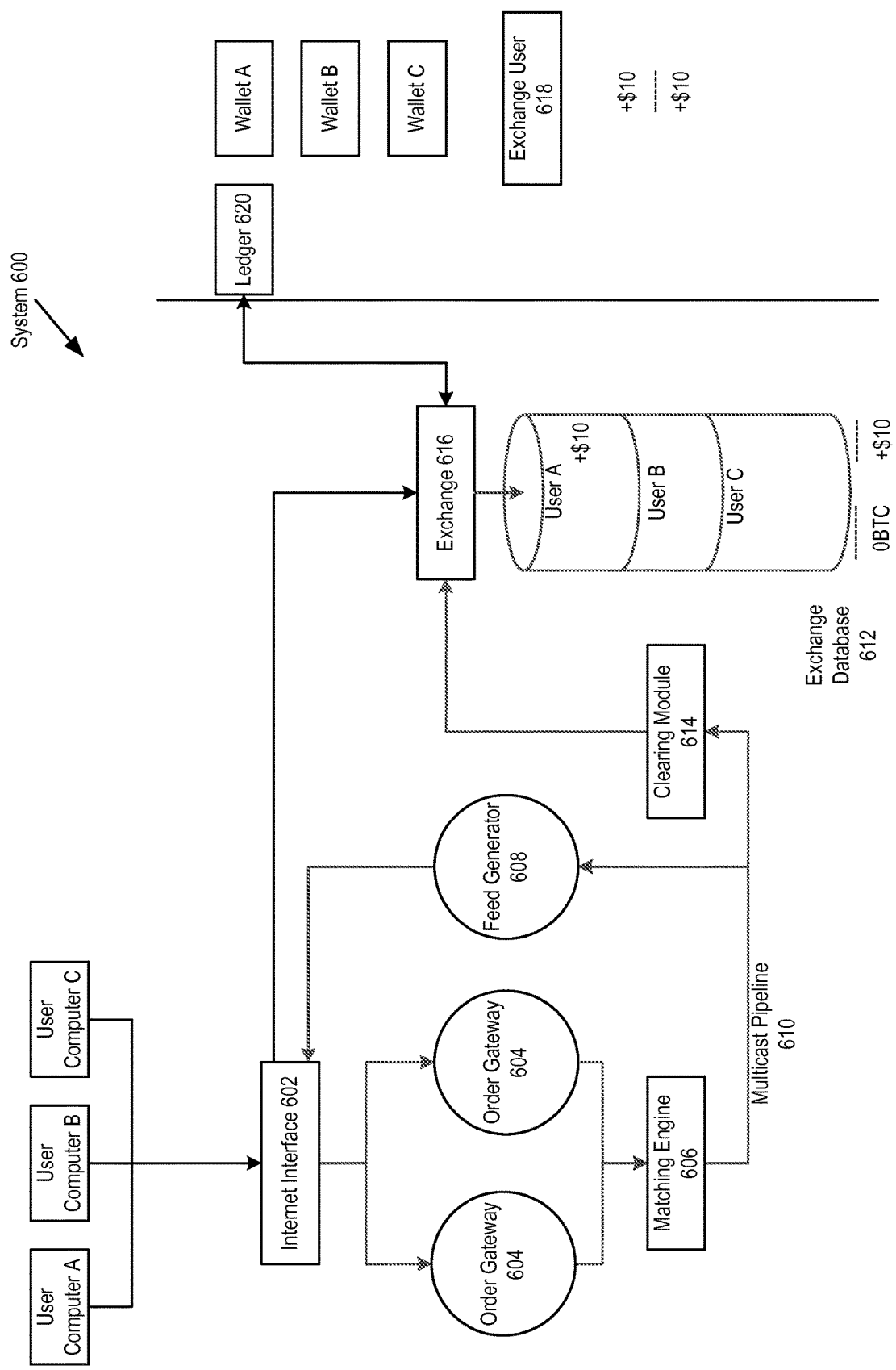
FIG. 72 is a block diagram of a system for transacting bitcoin according to an embodiment of the invention.

FIG. 72 shows a system 600 for transacting bitcoin. An Internet interface 602 allows for user computers (user computers A to C) to connect to the system 600 over the Internet. Order gateways 604 are connected to the Internet interface 602 to receive buy and sell offers via the Internet interface 602 from the user computers A to C. A matching engine 606 is connected to the order gateways 604. The matching engine 606 can receive the buy and sell offers from the order gateways 604.

A feed generator 608 is connected to the Internet interface 602. The matching engine 606 provides an output to a multicast pipeline 610. The feed generator 608 is connected to the multicast pipeline 610. The feed generator 608 receives the buy and sell offers from the multicast pipeline 610 and displays any buy and sell offers via the Internet interface 602 to the user computers A to C. Users can thus view any buy and sell offers already in the system before making their own buy and sell offers.

The matching engine 606 can match buy and sell offers and broadcast the matches to the multicast pipeline 610. The feed generator 608 displays the matches via the Internet interface 602 to the user computers A to C.

An exchange database 612 includes records of bitcoin and currency held by users A to C corresponding to the user computers A to C. A clearing module 614 is connected to the multicast pipeline 610 and receives matches from the multicast pipeline 610. An exchange 616 is connected to the clearing module 614. The exchange 616 is also connected to the Internet interface 602. Users at the user computers A to C can provide instructions via the Internet interface 602 to the exchange 616 to transfer bitcoin or currency. The exchange 616 has a number of functions, including calculating total amounts of bitcoin and currency as represented in the exchange database 612, cross checking bitcoin and currency totals between the exchange database 612 and an exchange user 618, transferring bitcoin and currency between wallets A to C that correspond respectively to the users A to C in the exchange database 612, updating bitcoin and currency amounts of the users A to C in the exchange database 612, and may receive and execute instructions from the clearing module 614 to transfer bitcoin and currency between the users A to C in the exchange database 612.

The exchange is connected to a ledger 620. The ledger 620 hold records of wallets A to C and further functions to cross-check balances between the exchange database 612 and exchange user 618.

Figure 73A:
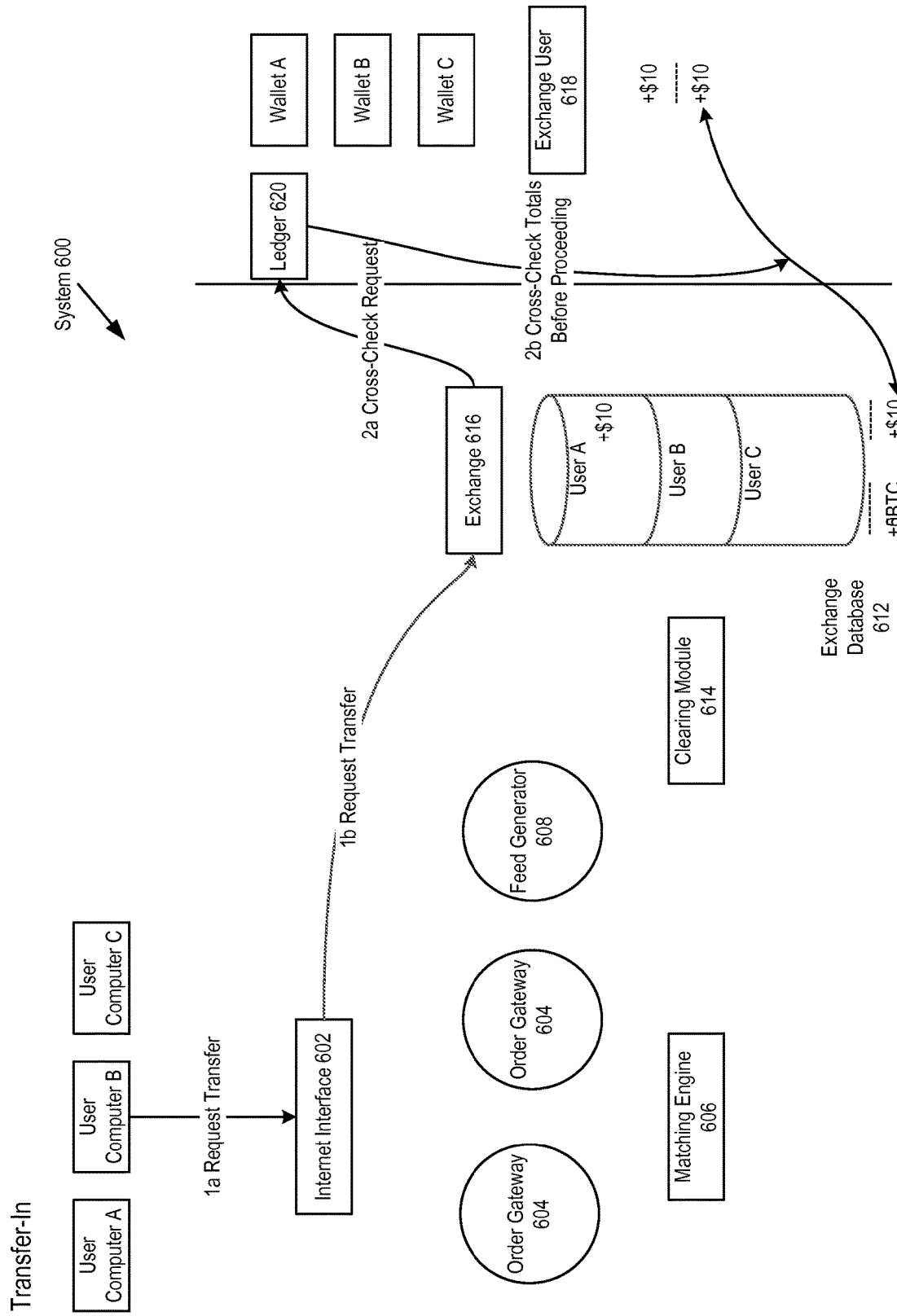
FIGS. 73a to 73f illustrate the use of the system of FIG. 72 for executing transfer-in, trading and withdrawal algorithms.

FIG. 73*a* shows the beginning of a transfer-in algorithm that is executed by the system 600. A user at user computer A has $10 of currency in the exchange database 612. For purposes of discussion, no other users have any bitcoin or currency. The exchange 616 calculates the total amount of currency and bitcoin within the exchange database 612 and records the total amount as $10 and 0 bitcoin. The exchange user 618 has $10, representing a previous transfer from wallet A to the exchange user 618.

At 1a, a user at user computer B requests a transfer via the Internet interface 602. The transfer may for example be to transfer $20 from wallet B to the exchange user 618. At 1b, the Internet interface 602 provides the transfer request to the exchange 616. At 2a, the exchange 616 sends a cross-check request to the ledger 620 and at 2b the ledger 620 cross checks the totals in the exchange database 612 and the exchange user 618 before proceeding with a transfer. In the present example, the exchange database 612 has $10 and 0 bitcoin and the exchange user 618 has $10 and 0 bitcoin. The totals therefore match. If either the currency or bitcoin totals do not match, the exchange 616 does not make any further transfers and provides an alert to an operator. The operator will then remedy any mismatches and then reactivate the exchange 616. Because the totals match, the exchange 616 proceeds with the transfer.

Figure 73B:
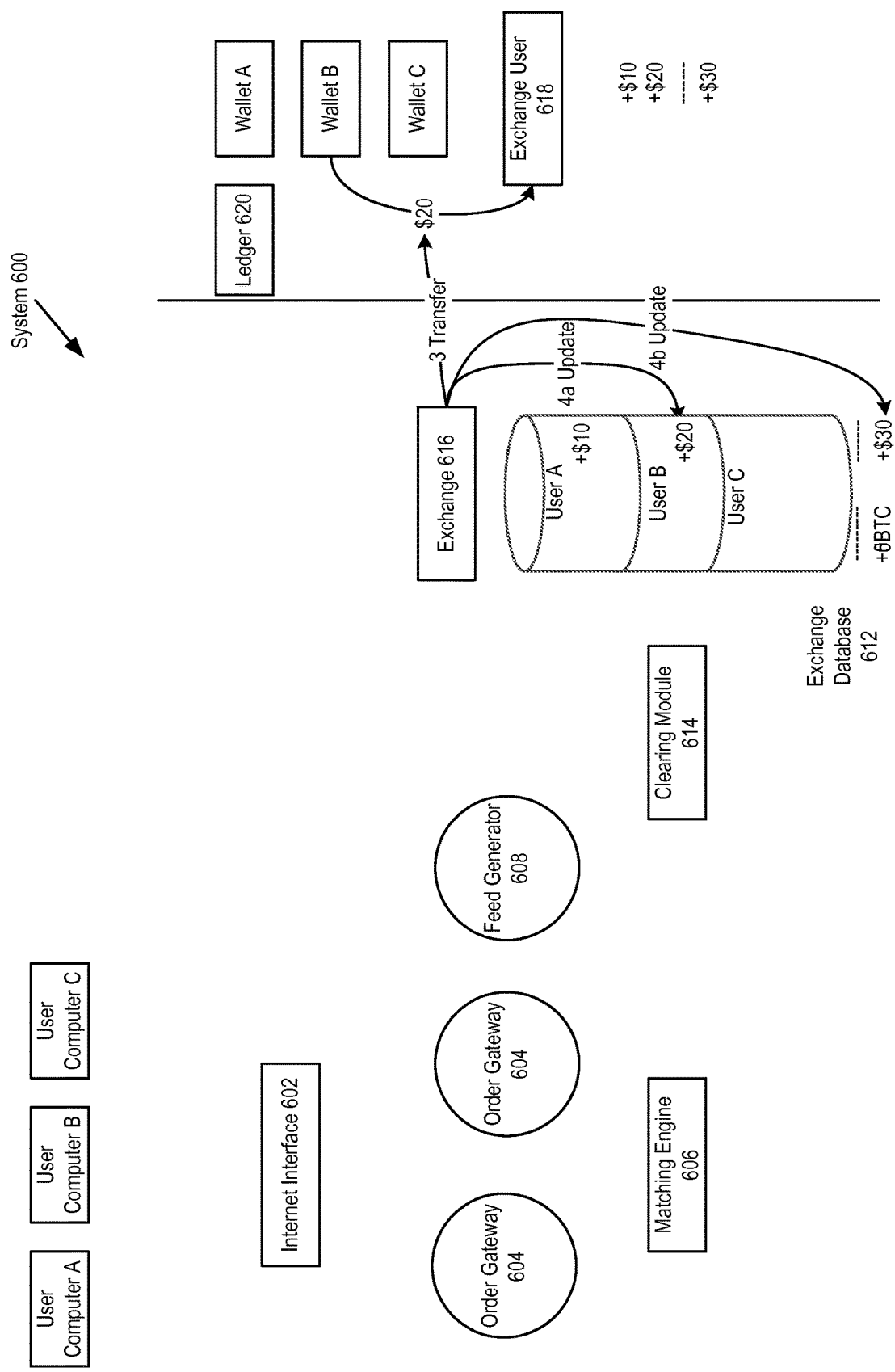

As shown in FIG. 73b, the exchange 616, at 3, transfers $20 from wallet B to the exchange user 618. The exchange user 618 calculates the total amount held by the exchange user 618 as $30, representing the $10 that was there before the transfer plus another $20 because of the transfer.

At 4a, the exchange 616 records $20 for user B in the exchange database 612. At 4b, the exchange 616 updates the totals and records a total amount of $30, representing the $10 held by user A and the $20 that has been added for user B.

Figure 73C:
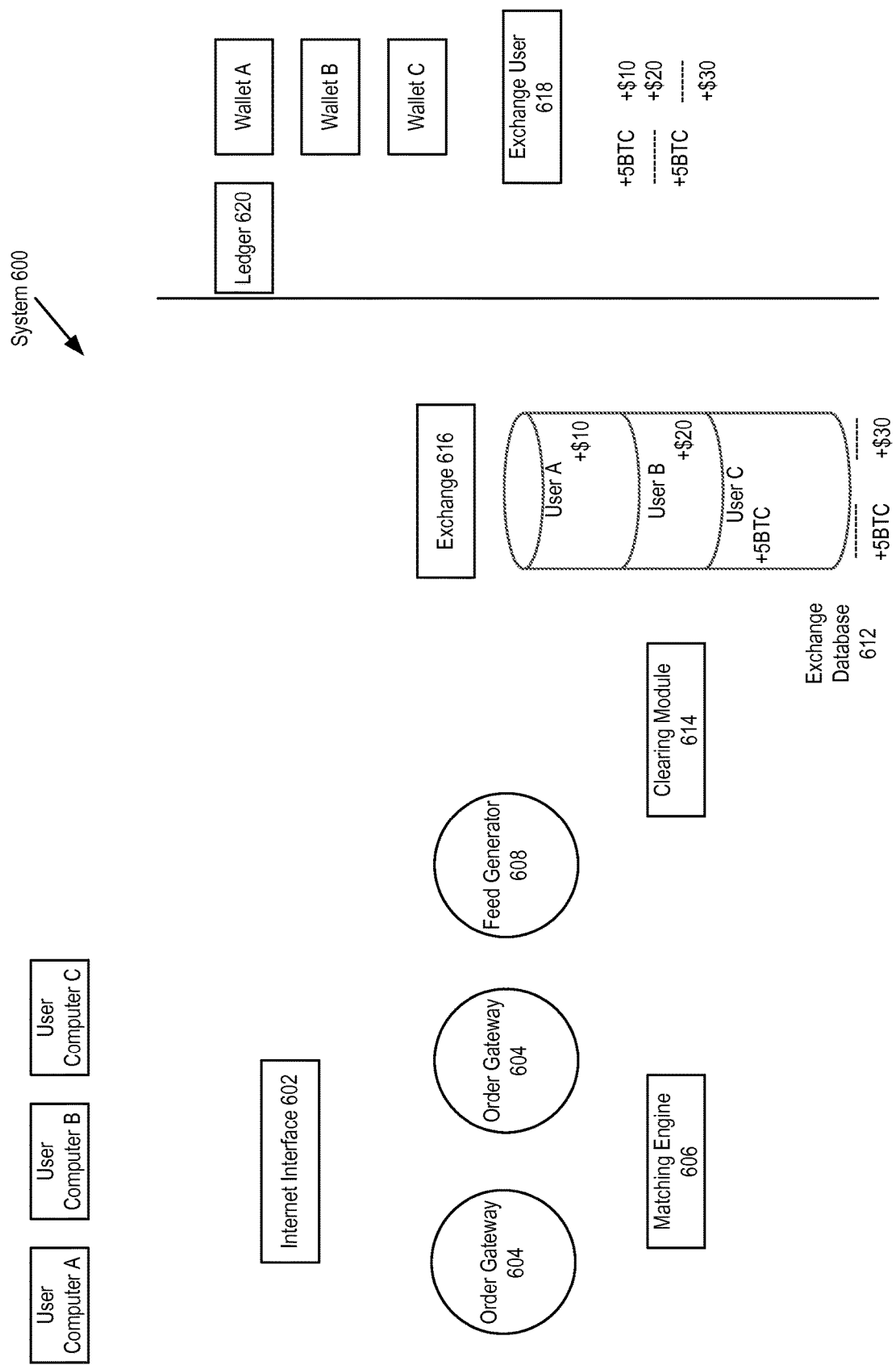

FIG. 73c illustrates the totals in the exchange database 612 and the exchange user 618 after a further transfer wherein a user at the user computer C has requested a transfer of 5 bitcoin from wallet C to the exchange user 618. The exchange user 618 now holds 5 bitcoin and $30. User C, within the exchange database 612, now holds 5 bitcoin. The totals held with the exchange database 612 are $30 and 5 bitcoin. For purposes of discussion, this ends the transfer-in algorithm that was started in FIG. 73a.

Figure 73D:
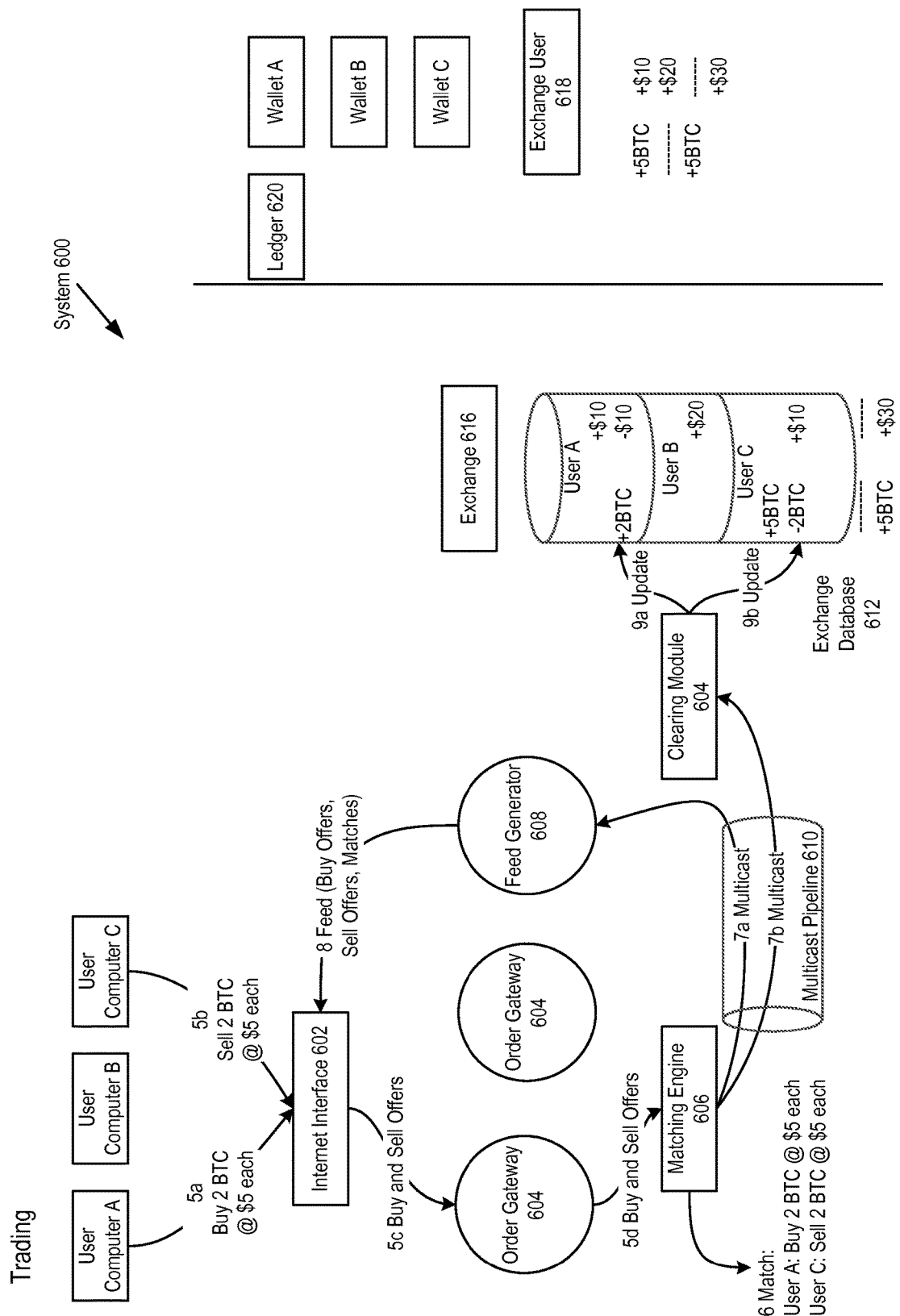

FIG. 73d shows a trading algorithm that is carried out after the transfer-in algorithm if FIGS. 73a to 73c. At 5a, a user (buyer) at user computer A submits a buy offer of 2 bitcoin at $5 each ($10 total). As noted previously, all offers are transmitted via the Internet interface 602, one of the order gateways 604, the matching engine 606 and the multicast pipeline 610 to the feed generator 608 which displays the offers on the Internet interface 602. A user at user computer C can thus see the buy offer submitted by the user at user computer A. At 5b, the user (seller) at user computer C submits a sell offer for 2 bitcoin at $5 each to the Internet interface 602. At 5c, the buy and sell offers are submitted by the Internet interface 602 to one of the order gateways 604. At 5d, the order gateway 604 provides the buy and sell offers sequentially to the matching engine 606.

As mentioned, the user at user computer C can see the buy offer of the user at user computer A before submitting the sell offer. In another example, the user at user computer C can first submit the sell offer and the sell offer can be seen by the user at user computer A. The buy and sell offers will typically be received by the matching engine 606 at different times.

Multiple users may submit one or more buy and sell offers. The matching engine 606 attempts to match the buy and sell offers to one another. At 6, the matching engine 606 has matched the buy and sell offers received from users at the user computers A and C.

The matching engine 606 then provides a broadcast of the match over the multicast pipeline 610 discussed with reference to FIG. 72. At 7a, the feed generator 608 receives a multicast that includes the match. At 7b, the clearing module 614 receives the same multicast that includes the match. At 8, the feed generator 608 provides a feed to the Internet interface 602 that includes the match. As previously mentioned, the feed generator 608 also provides a feed of buy and sell offers to the Internet interface 602.

At 9a, the clearing module 614 updates user A within the exchange database 612 by adding 2 bitcoin and subtracting $10 from user A. At 9b, the clearing module 614 updates user C by subtracting 2 bitcoin from and adding $100 to user C. The clearing module 614 makes the updates directly to the exchange database 612.

There is no need for recalculating the totals within the exchange database 612 at this stage. The same amount of currency or bitcoin that has been subtracted from one user has been added to another user. The exchange database 612 thus still indicates totals of $30 and 5 bitcoin.

Figure 73E:
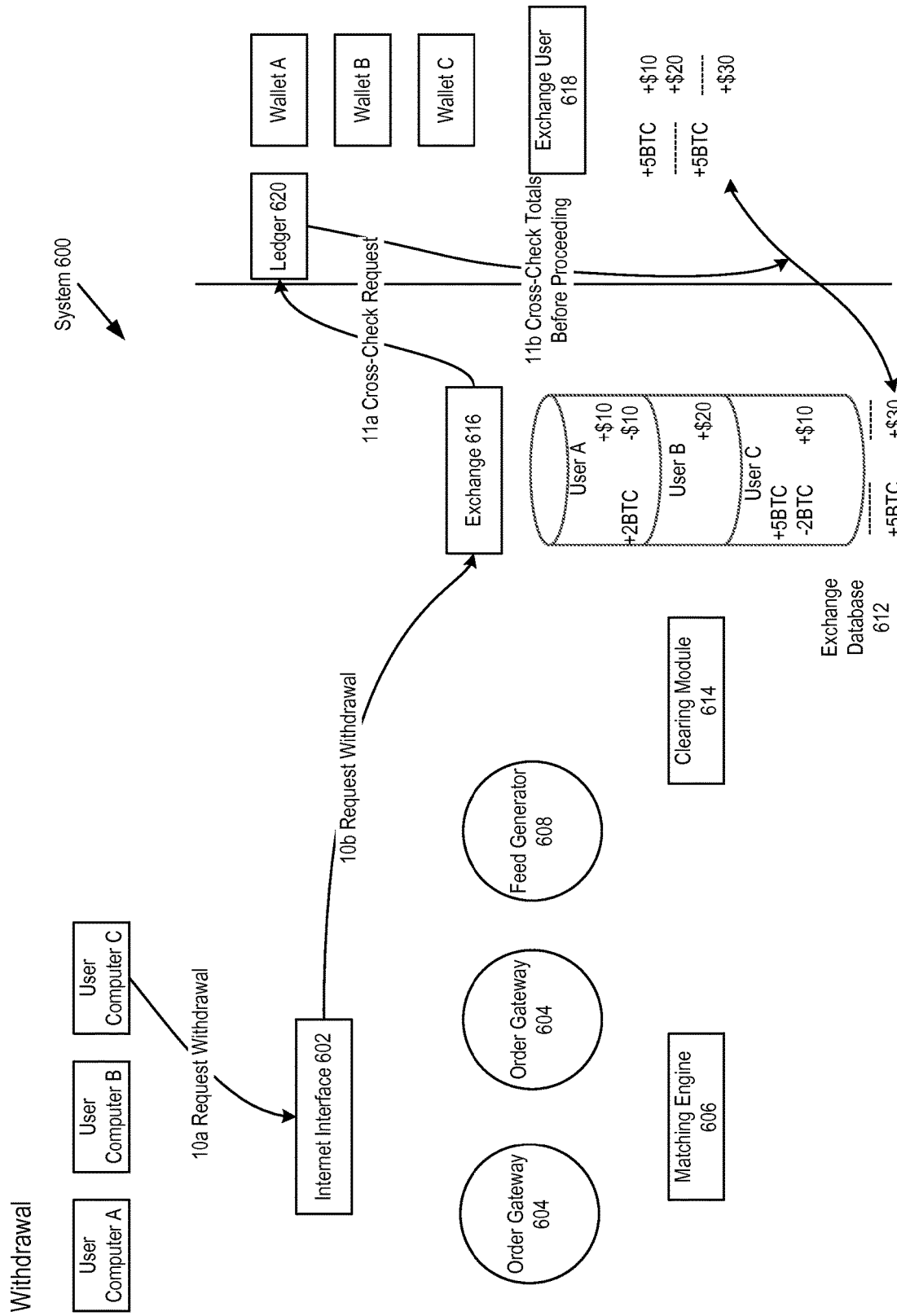

FIG. 73e shows a withdrawal algorithm that can be carried out after the trading algorithm in FIG. 73d. At 10a, a user at user computer C requests a withdrawal of, for example, $10. The request is received via the Internet interface 602 and is passed on to the exchange 616 at 10b.

At 11a, the exchange 616 sends a cross-check request to the ledger 620 and at 11b the ledger 620 cross checks the totals before proceeding. In the present example, the amount of bitcoin in the exchange user 618 and the total amount of bitcoin represented in the exchange database 612 are the same and the total currency amount in the exchange user 618 and in the exchange database 612 are the same. Should either of these two comparisons result in a mismatch, the exchange 616 will not make any withdrawal and create an alarm for an operator.

Figure 73F:
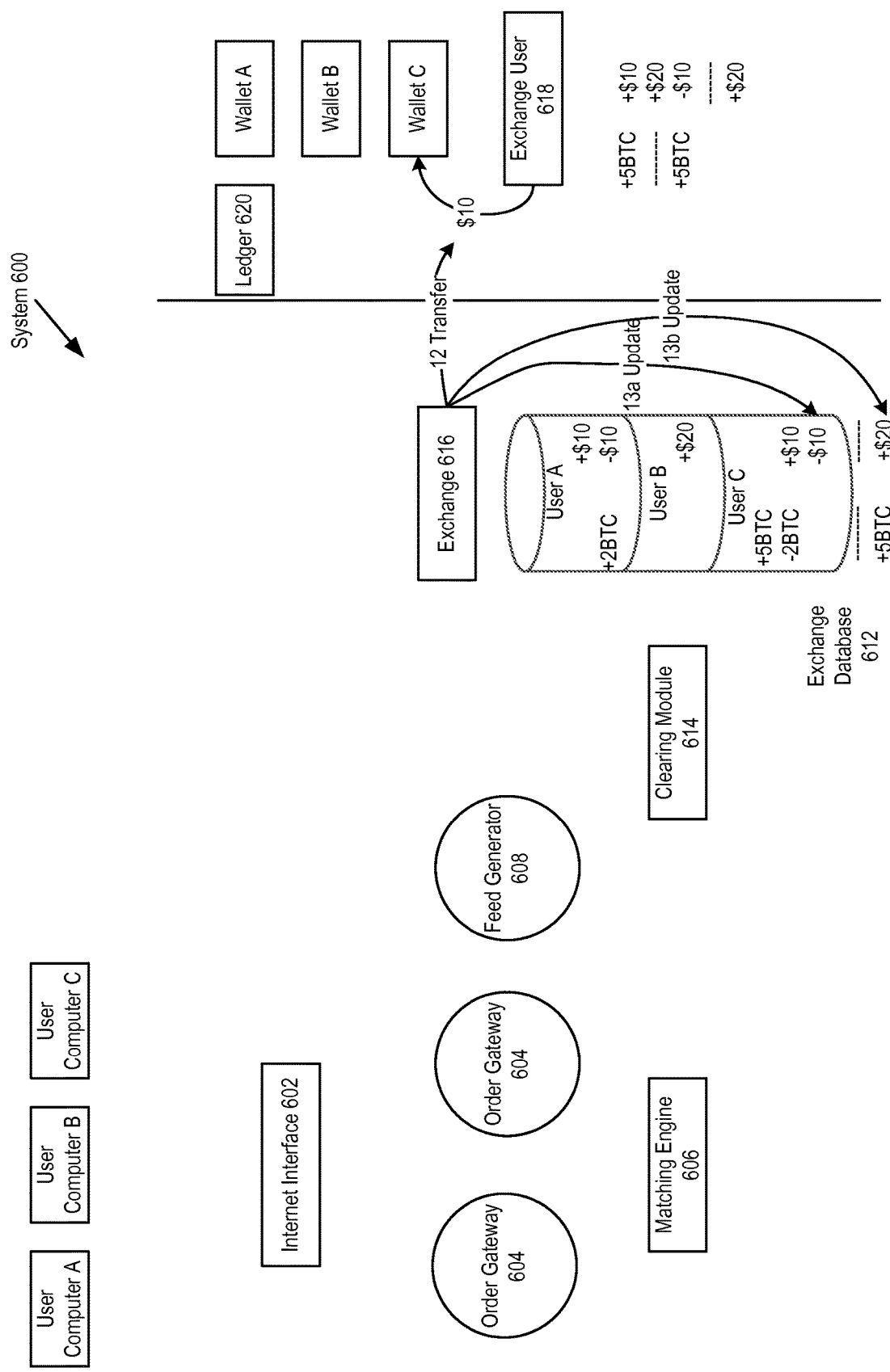

As shown in FIG. 73f, at 12, the exchange 616 transfers $10 from the exchange user 618 to the wallet C. The exchange user 618 now has $20, representing the $30 in FIG. 73e minus the $10 that has been transferred out. At 13a, the exchange 616 adds a representation for user C in the exchange database 612 showing a withdrawal of $10. At 13b, the exchange 616 updates the totals. Because user C has made a withdrawal of $10, the total currency amount within the exchange database 612 amounts to $20. The amount of bitcoin is still the same. The total amounts in the exchange user 618 and in the exchange database 612 are thus the same.

Other users may submit similar withdrawal requests. For example, a user at user computer A may request a withdrawal of 1 bitcoin. The exchange 616 then cross checks the total amounts, makes a transfer of 1 bitcoin from the exchange user 618 to wallet A and updates the exchange database 612 by deducting 1 bitcoin from user A and updates the total amount of bitcoin to 4 bitcoin.

Figure 74:
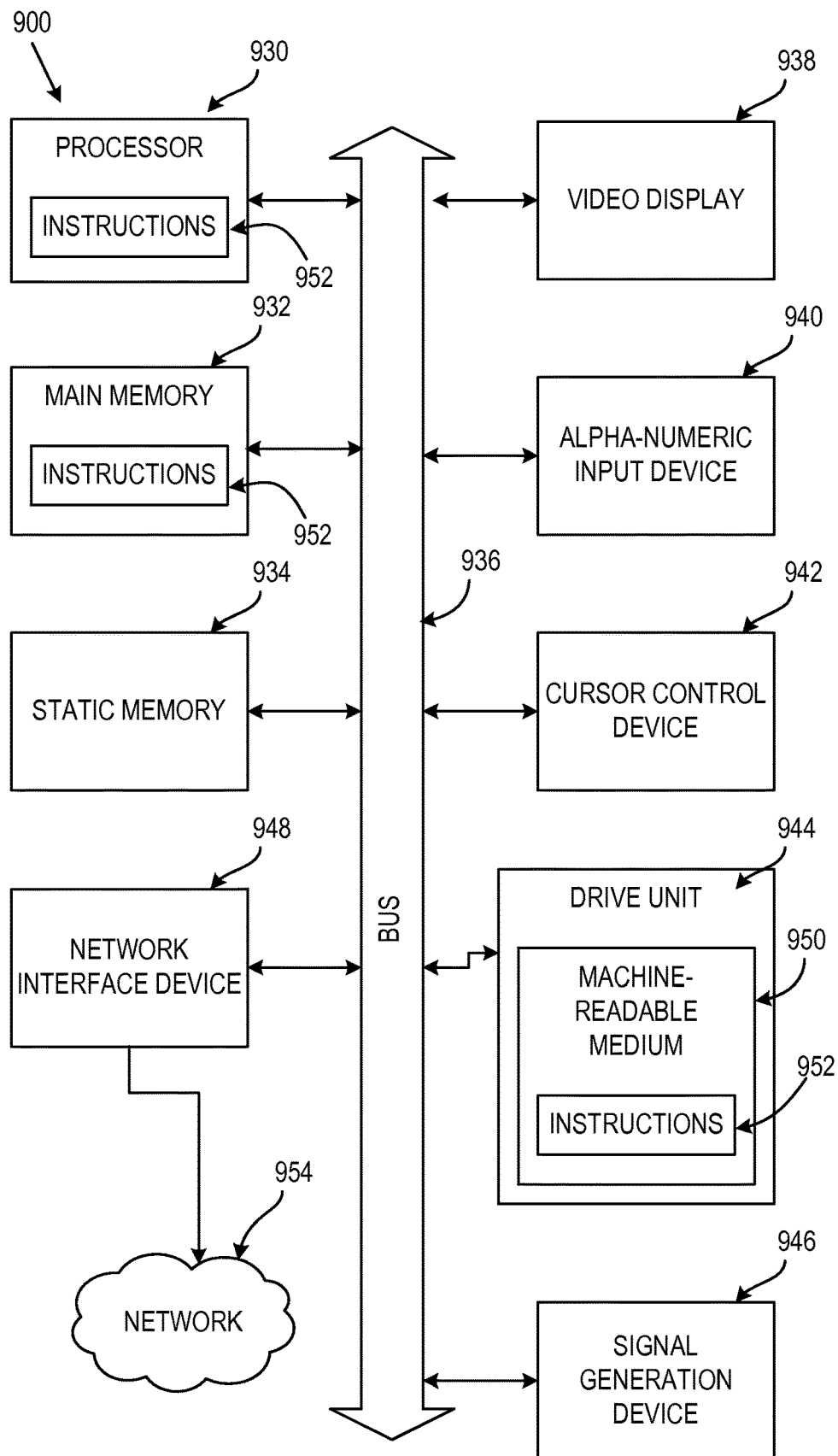
FIG. 74 is a block diagram of a machine in the form of a computer system forming part of the network environment.

FIG. 74 shows a diagrammatic representation of a machine in the exemplary form of a computer system 900 within which a set of instructions, for causing the machine to perform any one or more of the methodologies discussed herein, may be executed. In alternative embodiments, the machine operates as a standalone device or may be connected (e.g., networked) to other machines. In a network deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 900 includes a processor 930 (e.g., a central processing unit (CPU), a graphics processing unit (GPU), or both), a main memory 932 (e.g., read-only memory (ROM), flash memory, dynamic random access memory (DRAM) such as synchronous DRAM (SDRAM) or Rambus DRAM (RDRAM), etc.), and a static memory 934 (e.g., flash memory, static random access memory (SRAM, etc.), which communicate with each other via a bus 936.

The computer system 900 may further include a video display 938 (e.g., a liquid crystal displays (LCD) or a cathode ray tube (CRT)). The computer system 900 also includes an alpha-numeric input device 940 (e.g., a keyboard), a cursor control device 942 (e.g., a mouse), a disk drive unit 944, a signal generation device 946 (e.g., a speaker), and a network interface device 948.

The disk drive unit 944 includes a machine-readable medium 950 on which is stored one or more sets of instructions 952 (e.g., software) embodying any one or more of the methodologies or functions described herein. The software may also reside, completely or at least partially, within the main memory 932 and/or within the processor 930 during execution thereof by the computer system 900, the memory 932 and the processor 930 also constituting machine readable media. The software may further be transmitted or received over a network 954 via the network interface device 948.

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

We claim:

1. A method of transacting cryptographic currency at a host computer system, comprising:
    maintaining an exchange database associated with a plurality of buyers and a plurality of sellers;
    creating a match within the exchange database, wherein the match comprises a buy offer for the cryptographic currency from a buyer of the plurality of buyers and a sell offer for the cryptographic currency from a seller of the plurality of sellers;
    receiving a cryptographic currency withdrawal request from the buyer;
    in response to receiving the cryptographic currency withdrawal request:
        determining that a total amount of cryptographic currency represented in the exchange database matches a total amount of the cryptographic currency within an exchange wallet associated with the exchange database;
        facilitating transfer of the cryptographic currency from the exchange wallet to a buyer wallet associated with the buyer; and
        updating the exchange database by deducting a first value of the cryptographic currency that is transferred to the buyer wallet.

2. The method of claim 1, further comprising receiving cryptographic currency from one or more of the sellers at the exchange wallet associated with the exchange database.

3. The method of claim 2, further comprising:
    executing a transfer-in prior to receiving cryptographic currency from the one or more of the sellers at the exchange wallet, including:
        receiving a transfer request from the seller; and
        in response to receiving the transfer request:
            transferring a second value of the cryptographic currency from a seller wallet associated with the seller to the exchange wallet, and
            updating the exchange database by adding the second value of the cryptographic currency.

4. The method of claim 1, further comprising:
    executing a trade to clear the match prior to receiving the cryptographic currency withdrawal request from the buyer, including:
        transferring a representation of the cryptographic currency from the seller to the buyer;
        transferring a representation of currency from the buyer to the seller; and
        updating the exchange database to reflect the match and the transfers.

5. The method of claim 1, further comprising:
    executing a withdrawal from the exchange wallet at the host computer system, including:
        receiving a withdraw request from the seller; and
        in response to receiving the withdraw request:
            transferring the currency from the exchange wallet to the seller wallet, and
            updating the exchange database by deducting a fourth value of the currency that is transferred to the seller wallet.

6. The method of claim 1, wherein receiving the cryptographic currency from a seller at the exchange wallet comprises:
    restoring a seller cryptographic currency address from a vault associated with the exchange wallet to a seller wallet associated with the seller, wherein the seller wallet stores a private key associated with the seller cryptographic currency address; and
    broadcasting a transaction message to transfer the cryptographic currency from the seller cryptographic currency address to an exchange address stored within the exchange wallet, wherein the transaction message is signed by the private key and broadcasted to a cryptographic currency network associated with the cryptographic currency.

7. The method of claim 6, further comprising, after receiving the cryptographic currency at the exchange address:
    transferring the seller cryptographic currency address to the vault; and
    removing the seller cryptographic currency address from the seller wallet.

8. The method of claim 7, wherein the vault is associated with a vault cryptographic currency address and a vault private key, wherein the method further comprises, prior to restoring the seller cryptographic currency address to the seller wallet: restoring the vault private key to the vault from cold storage.

9. The method of claim 8, wherein restoring the vault private key to the vault from cold storage comprises:
    receiving a set of encrypted codes, generated from shards of the vault private key, from the seller;
    decrypting the encrypted codes; and
    reassembling the decrypted codes into the vault private key.

10. The method of claim 1, wherein transferring the cryptographic currency to the buyer wallet comprises broadcasting a transaction message to transfer the cryptographic currency from an exchange cryptographic currency address, associated with an exchange private key, to a seller cryptographic currency address stored within the buyer wallet, wherein the transaction message is signed by an exchange private key and broadcasted to a cryptographic currency network associated with the cryptographic currency.

11. A non-transitory host computer system for transacting cryptographic currency, comprising:
a processor;
a network interface device connected to the processor;
an exchange database associated with a plurality of buyers and a plurality of sellers, wherein the exchange database stores representations of cryptographic currency and representations of currency associated with the sellers and buyers;
an exchange wallet associated with the exchange database that receives cryptographic currency from a seller; and
an exchange that:
receives a cryptographic currency withdrawal request from a buyer,
in response to determination that a total amount of the cryptographic currency represented in the exchange database matches a total amount of the cryptographic currency within the exchange wallet: transfers the cryptographic currency from the exchange wallet to a buyer wallet associated with the buyer, and updates the exchange database by deducting a first value of the cryptographic currency that is transferred to the buyer wallet.

12. The non-transitory host computer system of claim 11, further comprising a matching engine creating respective matches, wherein each respective match includes one of the buy offers and one of the sell offers.

13. The non-transitory host computer system of claim 11, further comprising a multicast pipeline, wherein the matching engine broadcasts each respective match over the multicast pipeline.

14. The non-transitory host computer system of claim 11, further comprising:
a matching engine that generates a match between the buyer and the seller, wherein the match comprises a buy offer for cryptographic currency from the buyer and a sell offer for cryptographic currency from the seller.

15. The non-transitory host computer system of claim 14, further comprising:
a clearing module that executes a trade to clear the match prior to receiving the cryptographic currency withdrawal request from the buyer, including:
transferring a representation of the cryptographic currency from the seller to the buyer,
transferring a representation of currency from the buyer to the seller, and
updating the exchange database to reflect the match and the transfers.

16. The non-transitory host computer system of claim 11, further comprising:
a transfer module that executes a transfer-in prior to receiving cryptographic currency from the seller at the exchange wallet, including:
receiving a transfer request from the seller; and
in response to receiving the transfer request:
transferring a second value of the cryptographic currency from a seller wallet associated with the seller to the exchange wallet, and
updating the exchange database by adding the second value of the cryptographic currency.

17. The non-transitory host computer system of claim 11, further comprising:
a withdrawal module that executes a withdrawal from the exchange wallet, including:
receiving a withdraw request from the seller; and
in response to receiving the withdraw request:
transferring the currency from the exchange wallet to the seller wallet, and
updating the exchange database by deducting a fourth value of the currency that is transferred to the seller wallet.

18. The non-transitory host computer system of claim 11, wherein the exchange precludes withdrawal in response to a mismatch between the total amount of the cryptographic currency represented in the exchange database and the total amount of the cryptographic currency within the exchange wallet.

19. The non-transitory host computer system of claim 11, wherein the exchange wallet receiving cryptographic currency from the sellers comprises:
restoring a seller cryptographic currency address from a vault associated with the exchange wallet to a seller wallet associated with the seller, wherein the seller wallet stores a private key associated with the seller cryptographic currency address; and
broadcasting a transaction message to transfer the cryptographic currency from the seller cryptographic currency address to an exchange address stored within the exchange wallet, wherein the transaction message is signed by the private key and broadcasted to a cryptographic currency network associated with the cryptographic currency.

20. The non-transitory host computer system of claim 19, wherein the exchange wallet receiving cryptographic currency from the sellers further comprises:
transferring the seller cryptographic currency address to the vault; and
removing the seller cryptographic currency address from the seller wallet.

* * * * *